United States Patent
Watanabe et al.

(10) Patent No.: US 10,525,518 B2
(45) Date of Patent: Jan. 7, 2020

(54) PRESS-DIE-SHAPE AUTOMATIC CREATION SYSTEM AND PROGRAM, AND PRESS-MOLDING SIMULATION SYSTEM

(71) Applicant: JSOL Corporation, Tokyo (JP)

(72) Inventors: Yuko Watanabe, Ibaraki (JP); Yasuyoshi Umezu, Habikino (JP)

(73) Assignee: JSOL CORPORATION, Tokyo (JP)

( * ) Notice: Subject to any disclaimer, the term of this patent is extended or adjusted under 35 U.S.C. 154(b) by 108 days.

(21) Appl. No.: 15/511,689

(22) PCT Filed: Mar. 1, 2016

(86) PCT No.: PCT/JP2016/056229
§ 371 (c)(1),
(2) Date: Mar. 16, 2017

(87) PCT Pub. No.: WO2016/158163
PCT Pub. Date: Oct. 6, 2016

(65) Prior Publication Data
US 2017/0297076 A1    Oct. 19, 2017

(30) Foreign Application Priority Data

Mar. 31, 2015 (JP) ................................. 2015-072828

(51) Int. Cl.
*G06F 17/50* (2006.01)
*B21D 22/02* (2006.01)
(Continued)

(52) U.S. Cl.
CPC ............. *B21D 22/02* (2013.01); *B21D 22/00* (2013.01); *G06F 17/50* (2013.01);
(Continued)

(58) Field of Classification Search
CPC ................ G06F 2217/42; G06F 17/50; G05B 2219/35044; G05B 2219/45204
See application file for complete search history.

(56) References Cited

U.S. PATENT DOCUMENTS 6,021,270 A * 2/2000 Hanaki ............... B29C 33/3835
703/7
6,353,768 B1 * 3/2002 Karafillis ............ G06F 17/5018
700/145
(Continued)

FOREIGN PATENT DOCUMENTS

CN    104200054    12/2014
JP    H10-207933 A    8/1998
(Continued)

OTHER PUBLICATIONS

Lee SJ., Park KS., Kim JH., Lee SS. (2007) Development of a Design Supporting System for Press Die of Automobile Panels. In: Shen W., Luo J., Lin Z., Barthès JP.A., Hao Q. (eds) Computer Supported Cooperative Work in Design III. CSCWD 2006. Lecture Notes in Computer Science, vol. 4402. (Year: 2006).*
M. Firat, Computer aided analysis and design of sheet metal forming processes:: Part III: Stamping die-face design, Materials & Design, vol. 28, Issue 4, 2007, pp. 1311-1320, ISSN 0261-3069, https://doi.org/10.1016/j.matdes.2006.01.025. (Year: 2007).*
(Continued)

*Primary Examiner* — Omar F Fernandez Rivas
*Assistant Examiner* — David A Hopkins
(74) *Attorney, Agent, or Firm* — Harness, Dickey & Pierce, P.L.C.

(57) ABSTRACT

The present application automatically creates a press die shape corresponding to various kinds of pressing methods and product shapes using a part processing method data relating to press forming of ordinary parts. It includes a data storing device which stores a data relating to a shape of a part; a pressing method for press forming the part; a pressing direction setting and a press die shape type, with respect to each part; a part processing obtaining device which obtains a data relating to the pressing method of a referencing part,
(Continued)

the pressing direction setting and the press die shape type; and a creation device which creates the press die shape data relating to a shape of a product portion and a peripheral portion thereof in the press die, and the pressing method, the pressing direction setting and the press die shape type of the referencing part.

14 Claims, 69 Drawing Sheets

(51) Int. Cl.
    *B21D 22/00* (2006.01)
    *G06Q 50/04* (2012.01)
(52) U.S. Cl.
    CPC ......... *G06F 17/5009* (2013.01); *G06Q 50/04* (2013.01); *G06F 2217/42* (2013.01)

(56) References Cited

U.S. PATENT DOCUMENTS

| | | | | |
|---|---|---|---|---|
| 7,542,889 B2* | 6/2009 | Hillmann | ............ | G05B 19/4099 700/97 |
| 2003/0050765 A1* | 3/2003 | Sasahara | ................. | G06F 17/50 702/155 |
| 2007/0250205 A1* | 10/2007 | Hu | ..................... | G06F 17/5004 700/182 |
| 2013/0041635 A1 | 2/2013 | Zhu et al. | | |
| 2014/0228997 A1* | 8/2014 | Phillips | ................... | G06F 17/50 700/182 |

FOREIGN PATENT DOCUMENTS

| | | |
|---|---|---|
| JP | 2006/107414 A | 4/2008 |
| JP | 2009/064167 A | 3/2009 |
| JP | 2014/160417 A | 9/2014 |
| KR | 100664722 | 12/2006 |

OTHER PUBLICATIONS

Nasr, Emad S. Abouel, et al. "A feature—based approach to an integrated CAD/CAPP system in sheet metal blanking dies." International Journal of Rapid Manufacturing 4.2-4 (2014): 90-118. (Year: 2014).*

Lingbeek, R., et al. "The development of a finite elements based springback compensation tool for sheet metal products." Journal of Materials Processing Technology 169.1 (2005): 115-125. (Year: 2005).*

Lin, Bor-Tsuen, and Chun-Chih Kuo. "Application of an integrated CAD/CAE/CAM system for stamping dies for automobiles." The International Journal of Advanced Manufacturing Technology 35.9-10 (2008): 1000-1013. (Year: 2008).*

Thomas, William J. Product, tool, and process design methodology for deep drawing and stamping of sheet metal parts. Diss. The Ohio State University, 1999. (Year: 1999).*

Kim, Chul, B. M. Kim, and J. C. Choi. "Development of an integrated computer-aided process planning system for press working products." Journal of Materials Processing Technology 111.1-3 (2001): 188-192. (Year: 2001).*

Choi, J. C., B. M. Kim, and Chul Kim. "An automated progressive process planning and die design and working system for blanking or piercing and bending of a sheet metal product." The International Journal of Advanced Manufacturing Technology 15.7 (1999): 485-497. (Year: 1999).*

International Search Report PCT/ISA/210 for International Application No. PCT/JP2016/056229 dated May 17, 2016.

Partial European Supplementary Search Report dated May 15, 2018.

Lee, Sang-Jun, et al., "Development of a Design Supporting System for Press Die of Automobile Panels," Computer Supported Cooperative Work in Design III, pp. 207-216, May 3, 2006.

Kumar, G.R. et al., "Classification representation, and automatic extraction of deormation features in sheet metal parts," Computer Auded Design, vol. 45, No. 11, pp. 1469-1484, Jun. 25, 2013.

Hussein, H. M. A. , "Computer Aided Blanking Die Design Using CATIA," Procedia Cirp., vol. 18, pp. 96-101, Aug. 25, 2014.

* cited by examiner

FIG.9

Product Shape Outline Data

| Nodal Point Number | XYZ Coordination (Total Coordinate System) | | | Feature Point flag (Fold Angle Judgement) |
|---|---|---|---|---|
| | X | Y | Z | |
| N2001 | ... | ... | ... | 1 |
| N2002 | ... | ... | ... | |
| N2003 | ... | ... | ... | |

FIG. 10

Part Processing Method Data Table

| Product Data Number | Registered Key | | | | Pressing Direction Set | | | | | | Feature Shape Identifying Judgement | | | | Pressing Method | |
|---|---|---|---|---|---|---|---|---|---|---|---|---|---|---|---|---|
| | Part Name | Size | Material | Plate Thickness | ... | Designated Direction | | | | Determined Type | Reference Portion Type | Punch Shoulder R Judging Allowance | Die R Judging Allowance | Emboss Depth Judging Value | Type (Forming/ Drawing) | with/without Pad |
| | | | | | | Original Point Moving Distance | X Axis Vector | Y Axis Vector | Z Axis Vector | | | | | | | |
| ... | ... | ... | ... | ... | ... | ... | ... | ... | ... | ... | ... | ... | ... | ... | ... | ... |

| Press Forming Condition | | | Draw Bead Information | | | | Press Die Shape Creation Parameter | | Blank Holder Surface Parameter | | | | |
|---|---|---|---|---|---|---|---|---|---|---|---|---|---|
| Total Holder Load | Pad Load | ... | with/without Draw Bead | Offset Distance from Punching Opening Line | Minimum Draw Bead Length | Number of Draw Bead Designation Group | Press Die Shape Type | ... | Whrinkle Holding Surface Type | Position Difference Designation Value | Forming Position Difference Designation Value | Curved Surface Type | Curved Surface Definition Parameter 1 | Curved Surface Definition Parameter 2 | ... |
| ... | ... | ... | ... | ... | ... | ... | ... | ... | ... | ... | ... | ... | ... | ... | ... |

| Press Die Shape Creation Parameter | | | | Blank Line Creation Parameter | | | | |
|---|---|---|---|---|---|---|---|---|
| Addendum Shape Parameter | | | | | | | | |
| Two Dimensional Punch Opening Line Offset Distance | Addendum Cross-sectional Shape Parameter (Pad Portion) | Addendum Cross-sectional Shape Parameter (Flange Portion) | Addendum Parameter (Vertical Wall Portion) | ... | Blank Type | Offset Amount | Rectangular Shape Size Reduced Value | Cut Point Moving Allowance | Cut Line Moving Allowance | ... |
| ... | ... | ... | ... | ... | ... | ... | ... | ... | ... |

FIG. 11

| Each Draw Bead Designation Group Information | | | | | | | | | | | | |
|---|---|---|---|---|---|---|---|---|---|---|---|---|
| | Group Information | | | Draw Bead Arrangement Position Information | | Draw Bead Arranging Method (On/Off) | Draw Bead Type (circular/ Rectangular/ tapezoidal) | Cross-sectional Shape Parameter | | | | Draw Bead Maximum Load | Total Bead Length |
| Group Number | Group Name | Group Judgement Type | Group Judgement Allowance | Average Direction Vector | Center Position Coordination | | | Basic Position | Edge Radius | Center Radius | Depth | | |
| ... | Straight Line Portion | 1 | ... | ... | ... | ... | Circular | ... | ... | ... | ... | ... | ... |
| ... | Convex Circular Portion | 2 | ... | ... | ... | ... | Circular | ... | ... | ... | ... | ... | ... |
| ... | Concave Circular Portion | 3 | ... | ... | ... | ... | Circular | ... | ... | ... | ... | ... | ... |
| ... | ... | ... | ... | ... | ... | ... | ... | ... | ... | ... | ... | ... | ... |

FIG. 12

Pressing Direction Data

| Basic Point Coordinate | | | Coordinate Conversion Matrix | | | | | | | | |
|---|---|---|---|---|---|---|---|---|---|---|---|
| X | Y | Z | $m_{11}$ | $m_{12}$ | $m_{13}$ | $m_{21}$ | $m_{22}$ | $m_{23}$ | $m_{31}$ | $m_{32}$ | $m_{33}$ |
| ... | ... | ... | ... | ... | ... | ... | ... | ... | ... | ... | ... |

FIG. 13

Two Dimensional Punch Opening Line Data

| Line Number | Line Type | First End Coordinate | | Second End Coordinate | |
|---|---|---|---|---|---|
| | | X | Y | X | Y |
| L1 | Fillet | ... | ... | ... | ... |
| L2 | Circular Arc | ... | ... | ... | ... |
| L3 | Fillet | ... | ... | ... | ... |
| ... | | | | | |
| ... | | | | | |

| Center Coordinate | | Radius | Start Angle | End Angle |
|---|---|---|---|---|
| X | Y | R | $\alpha$ | $\beta$ |
| ... | ... | ... | ... | ... |
| ... | ... | ... | ... | ... |
| ... | ... | ... | ... | ... |
| | | | | |
| | | | | |

FIG. 14

Three Dimensional Punch Opening Line Data

| Nodal Point Number | XYZ Coordinate (Total Coordinate System) | | | Feature Point flag (Fillet End) |
|---|---|---|---|---|
| | X | Y | Z | |
| N1001 | ... | ... | ... | 1 |
| N1002 | ... | ... | ... | |
| N1003 | ... | ... | ... | |

FIG. 15

Feature Point Data

| Feature Point Number | Nodal Point Number |
|---|---|
| A1 | N1001 |
| A2 | N1003 |
| A3 | N2001 |

FIG. 16

Addendum Cross-sectional Plane Data

| Cross-sectional Plane Number | Nodal Point Number of Product Outline | Nodal Point Number of Three Dimensional Punch Opening Line | Cross-sectional Shape Type | Parameter 1 (Shoulder R) | Parameter 2 (Wall Angle) |
|---|---|---|---|---|---|
| P1 | N2001 | N1005 | 1 | 5 | 20 |
| P2 | N2005 | N1011 | 3 | 5 | 20 |
| P3 | N2010 | N1020 | 1 | 10 | 15 |

FIG.17

Draw Bead Data (a) Draw Bead Shape Parameter

| Draw Bead Number | Draw Bead Type | Start Point (X) | Start Point (Y) | End Point (X) | End Point (Y) | Cross-sectional Plane Edge Radius | Cross-sectional Plane Center Radius | Depth |
|---|---|---|---|---|---|---|---|---|
| 1 | Circular | X1 | Y1 | X2 | Y2 | 3 | 5 | 3 |
| 2 | Circular | ... | ... | ... | ... | 3 | 3 | 5 |
| 3 | Trapezoidal | ... | ... | ... | ... | ... | ... | ... |

(b) Draw Bead Line Data

| Nodal Point Number | X Coordinate | Y Coordinate |
|---|---|---|
| N001 | ... | ... |
| N002 | ... | ... |
| N003 | ... | ... |

FIG.18

Blank Line Data

| Nodal Point Number | X Coordinate | Y Coordinate |
|---|---|---|
| N001 | ... | ... |
| N002 | ... | ... |
| N003 | ... | ... |

FIG.20
(a)
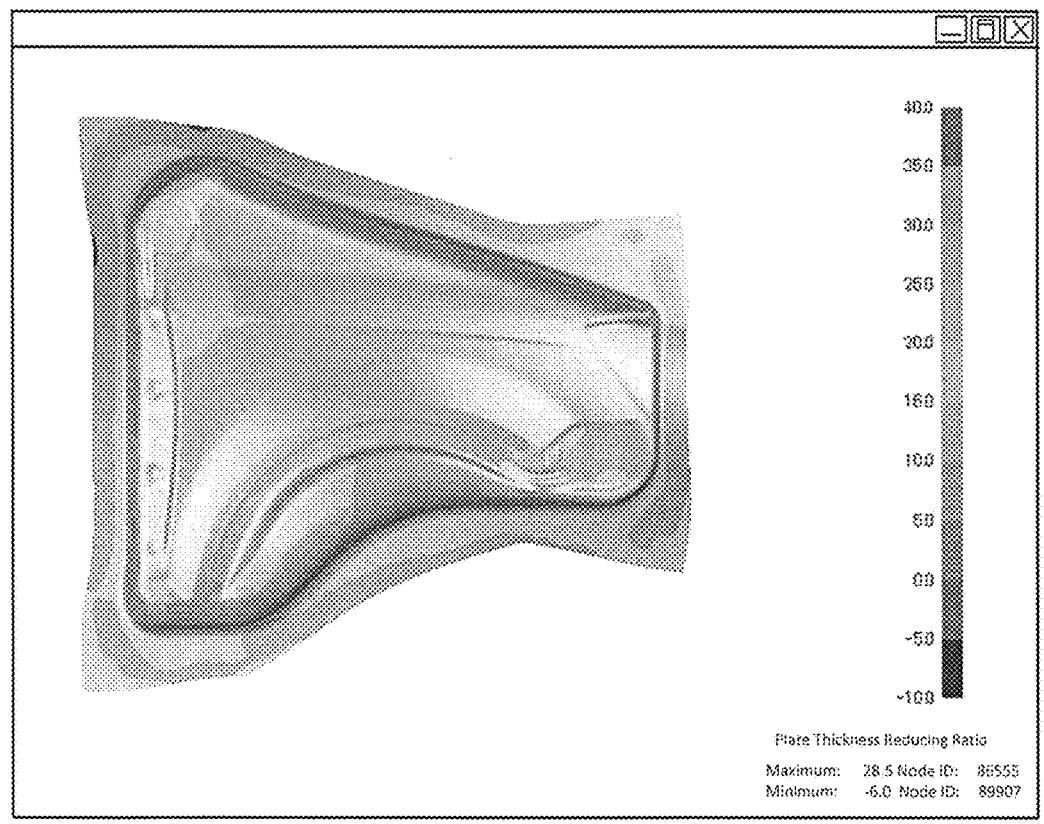
(b)
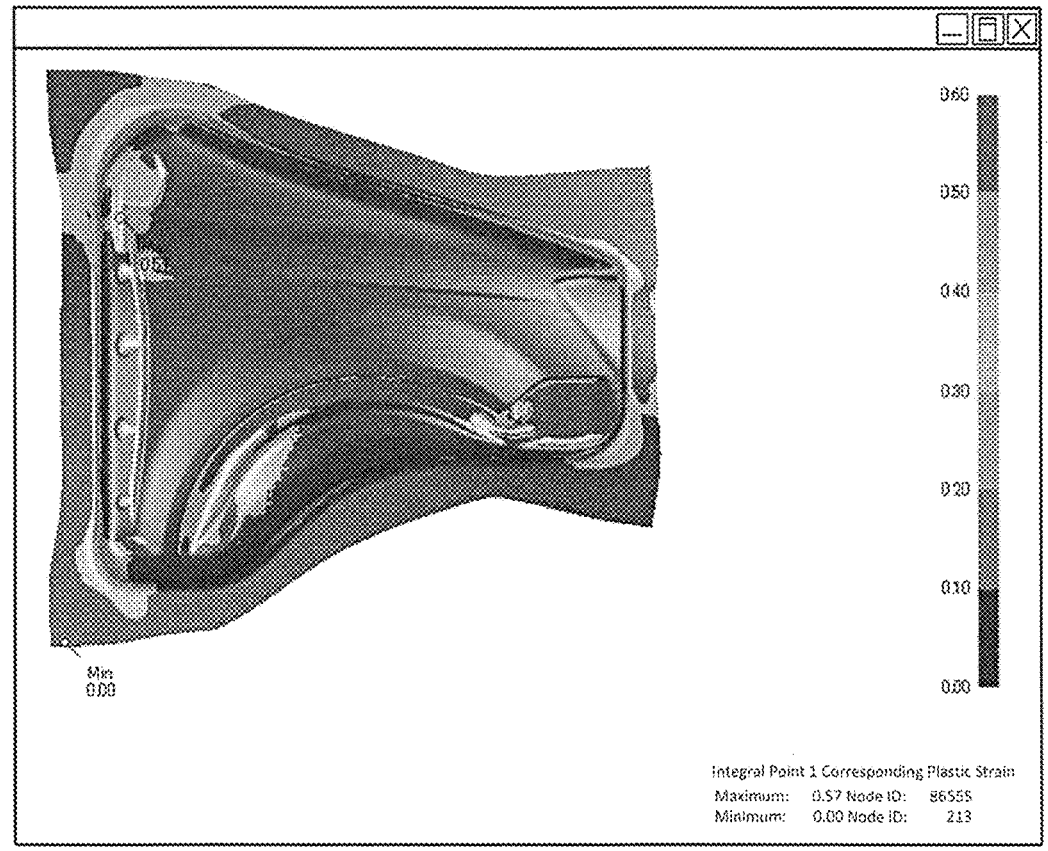

FIG.21
(a)
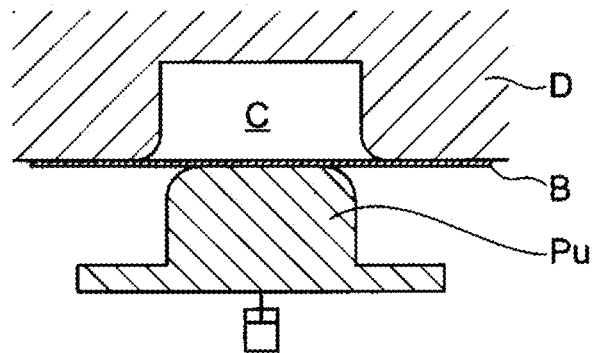
(b)
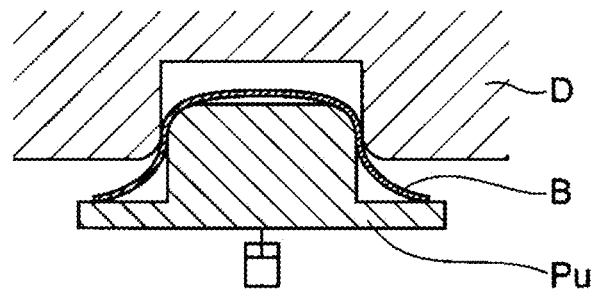
(c)
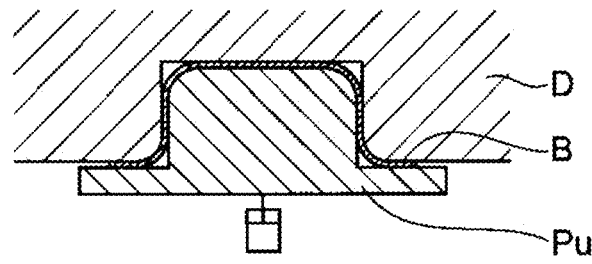

FIG.22
(a)
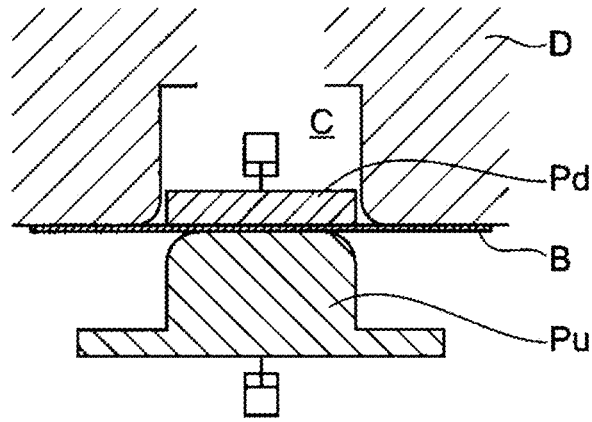
(b)
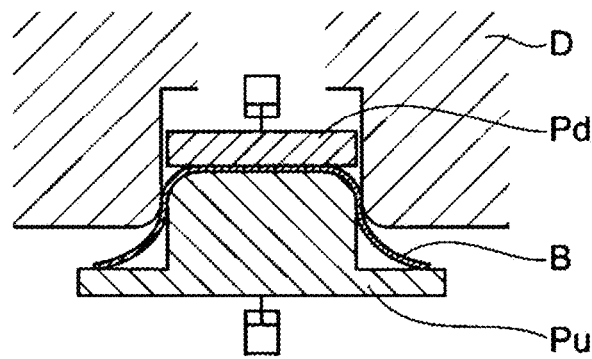
(c)
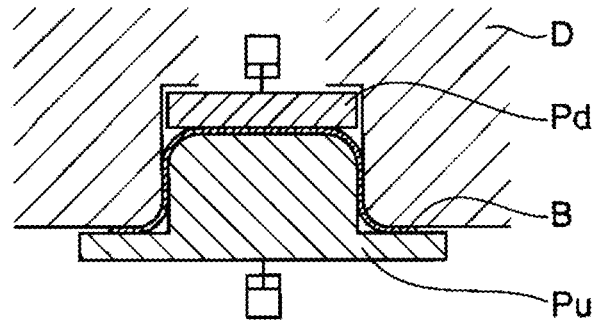

FIG.23
(a)
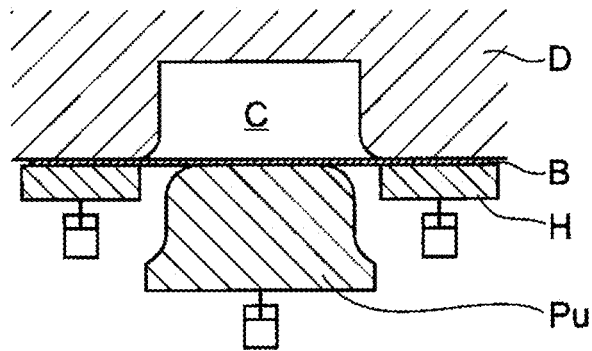
(b)
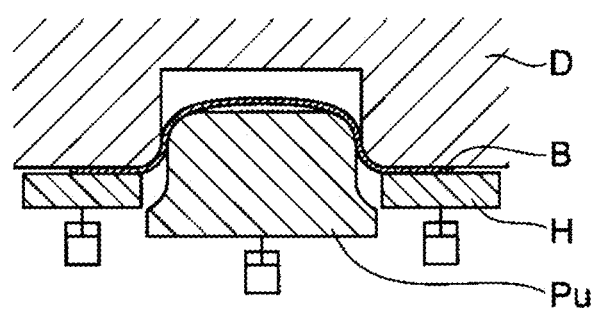
(c)
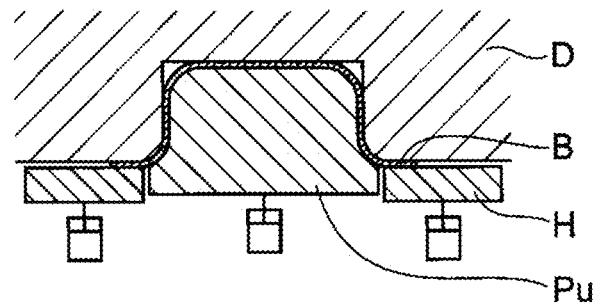

FIG.24
(a)
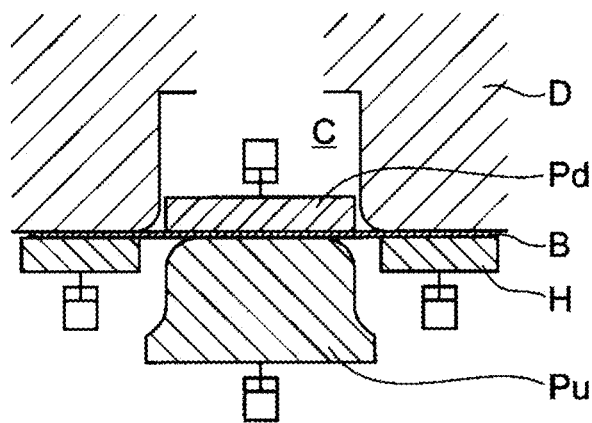
(b)
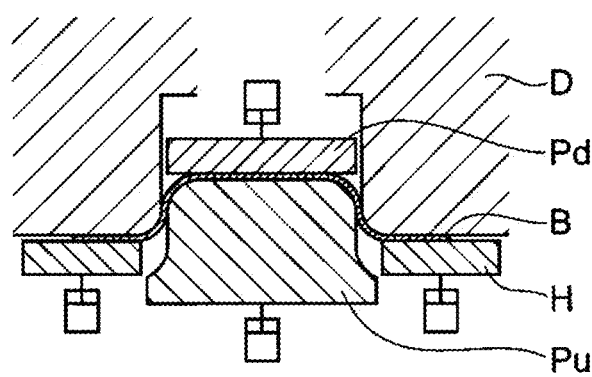
(c)
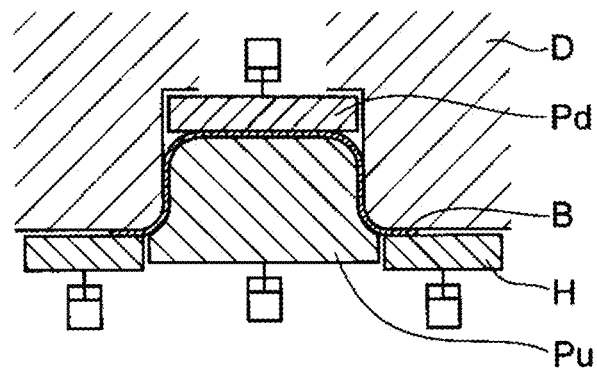

FIG.44
(a)
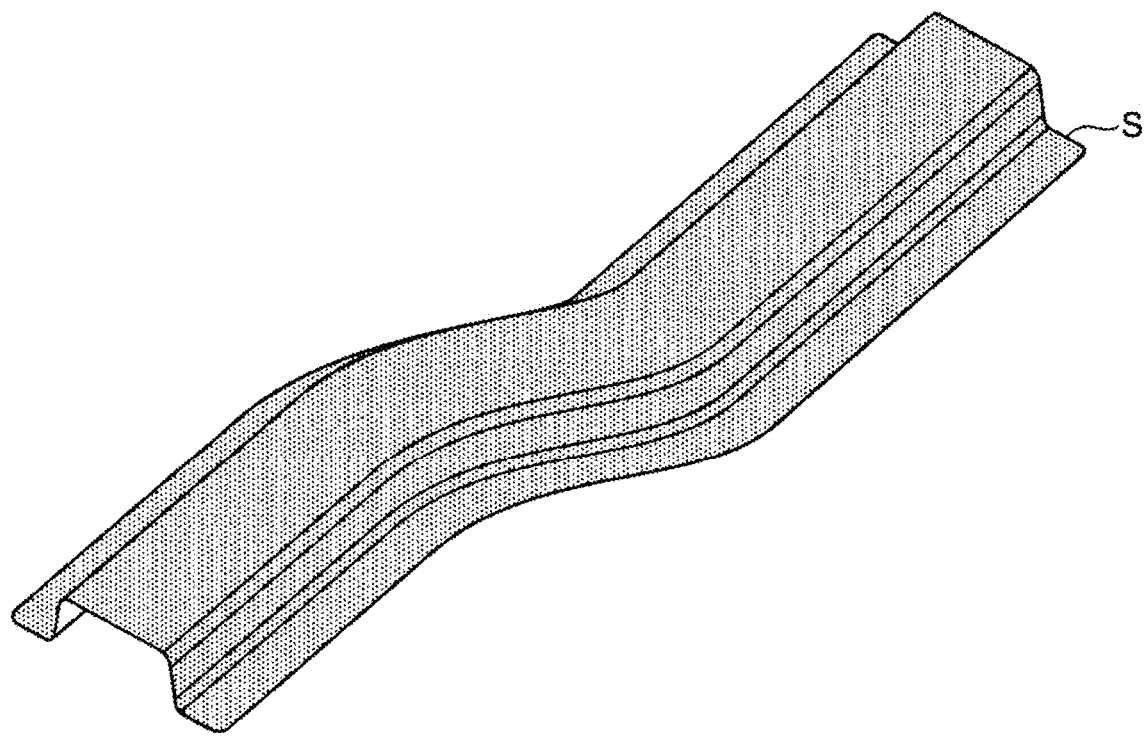
(b)
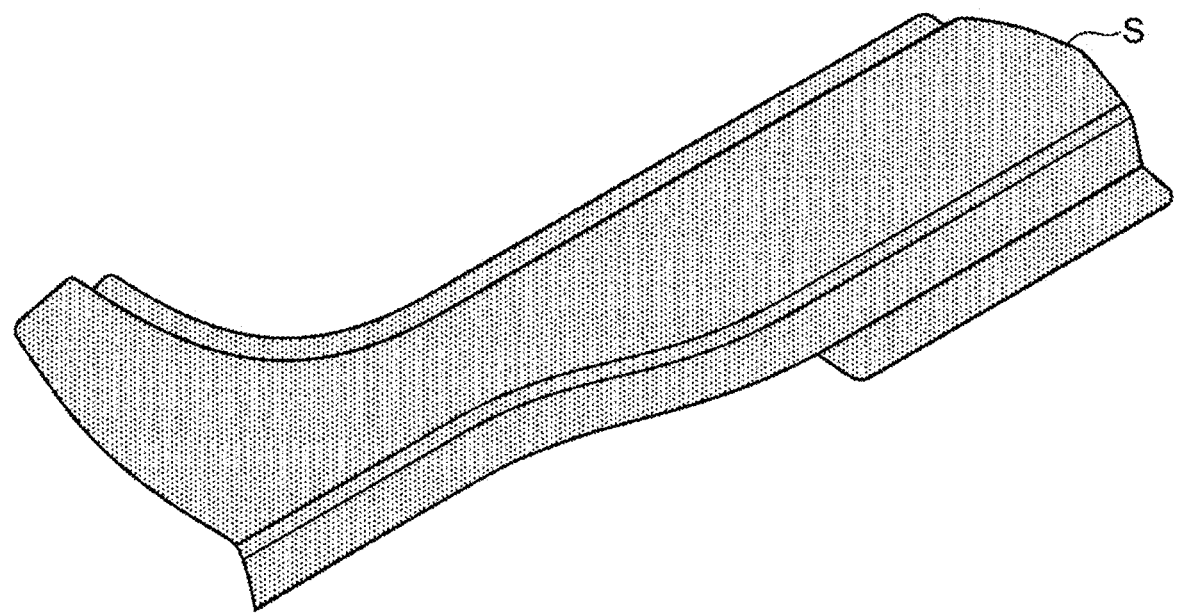

FIG.46
(a)
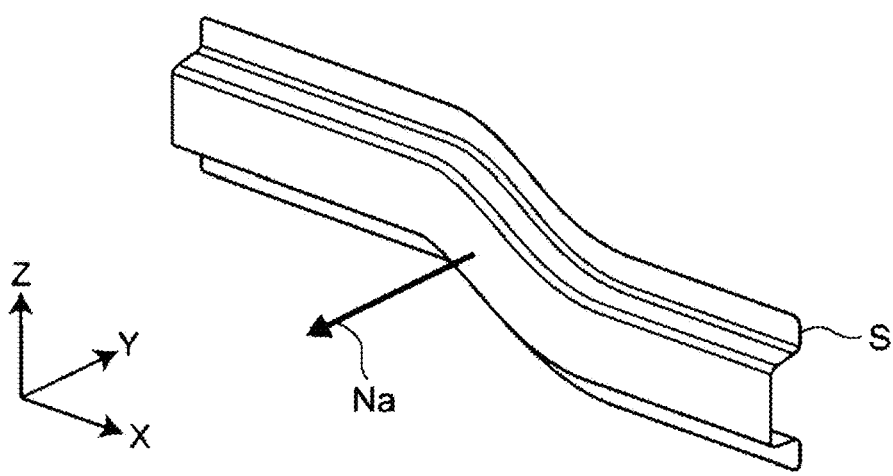
(b)
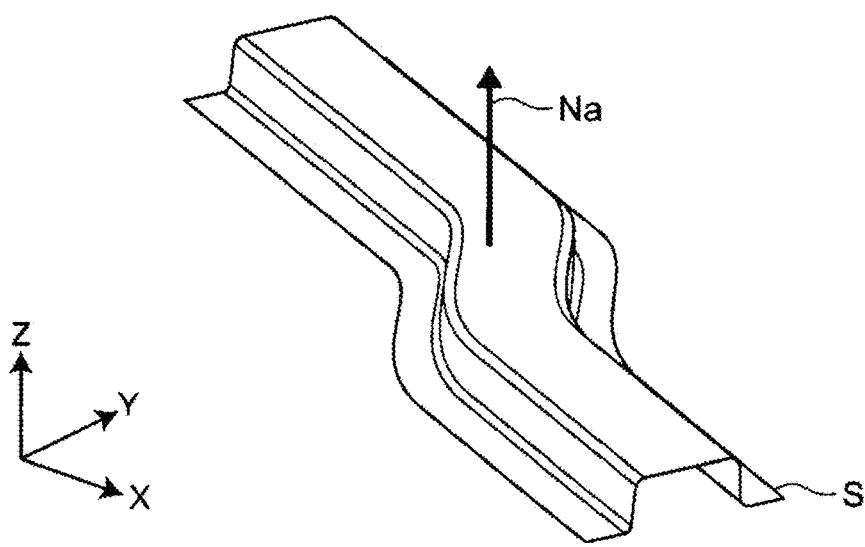
(c)
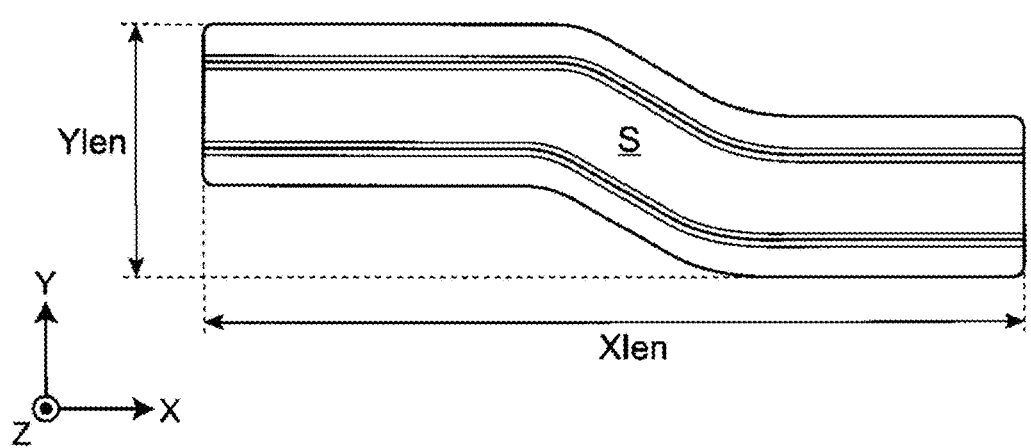

FIG. 66
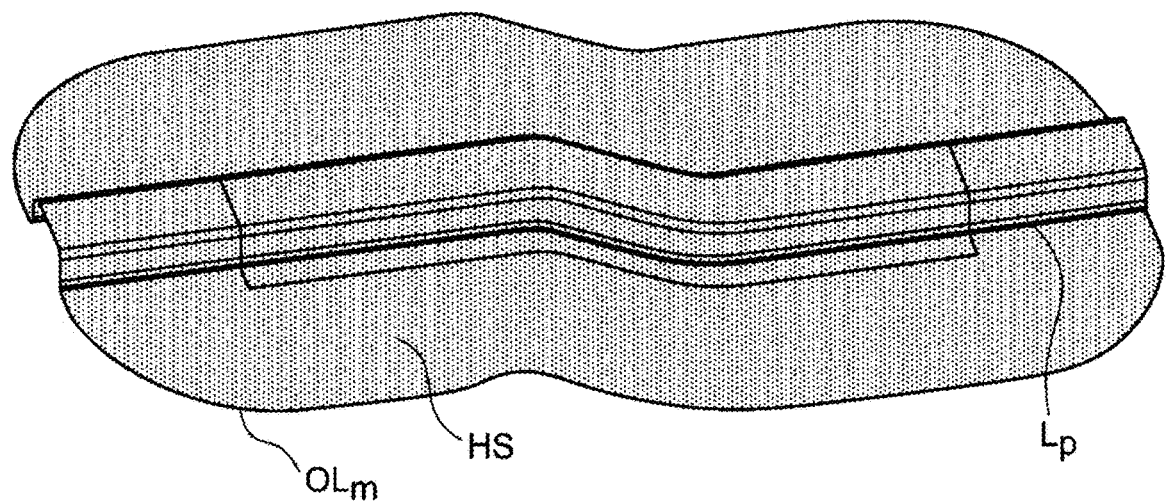
FIG. 67
(a)
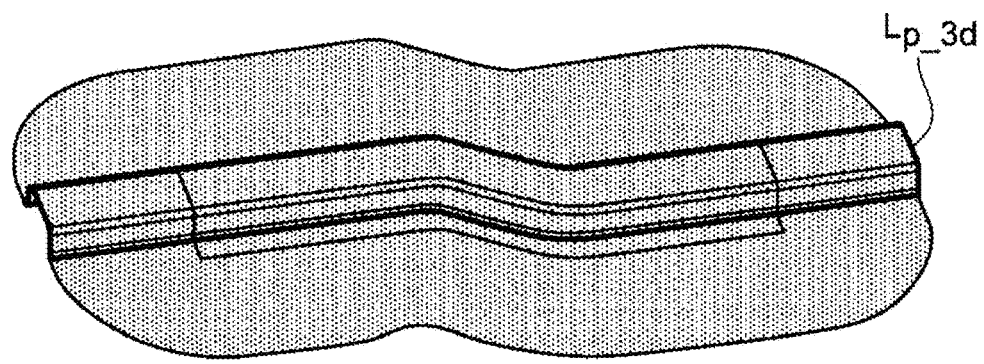
(b)
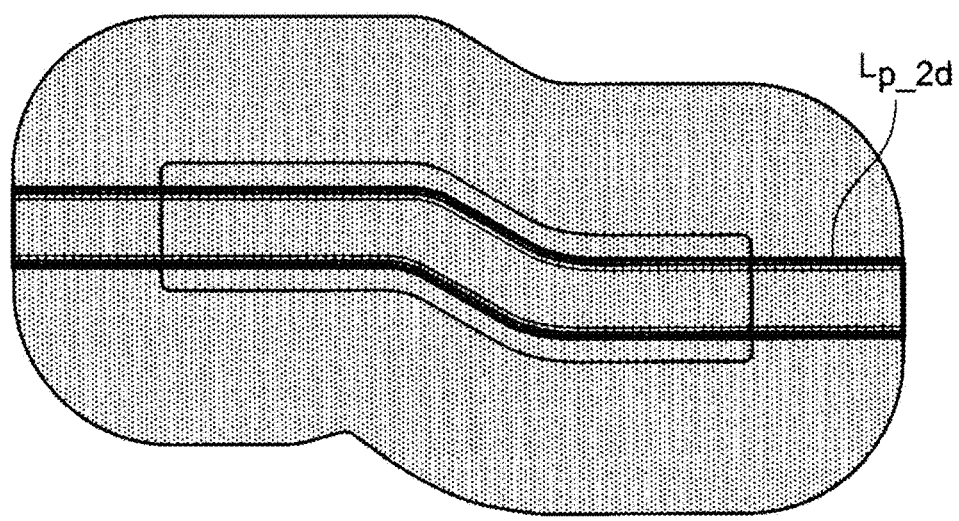

FIG.78
(a)
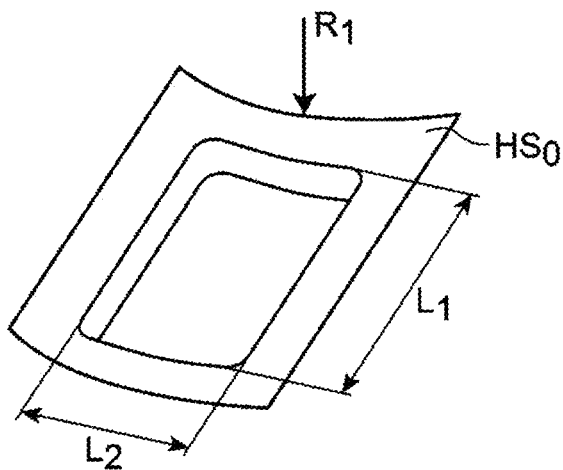
(b)
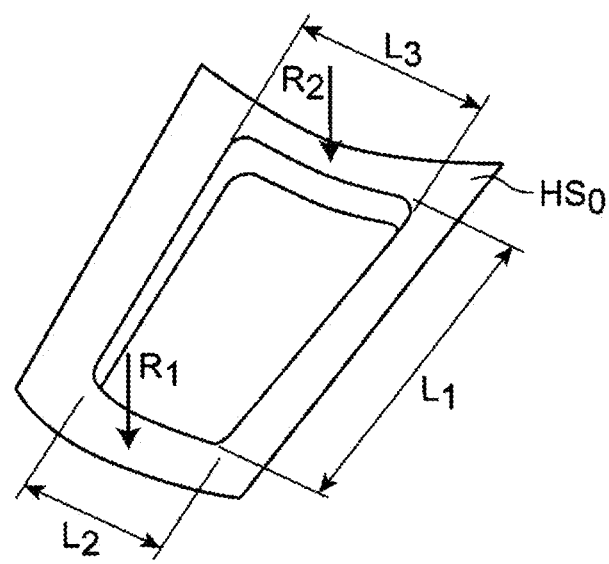

FIG.81
(a)
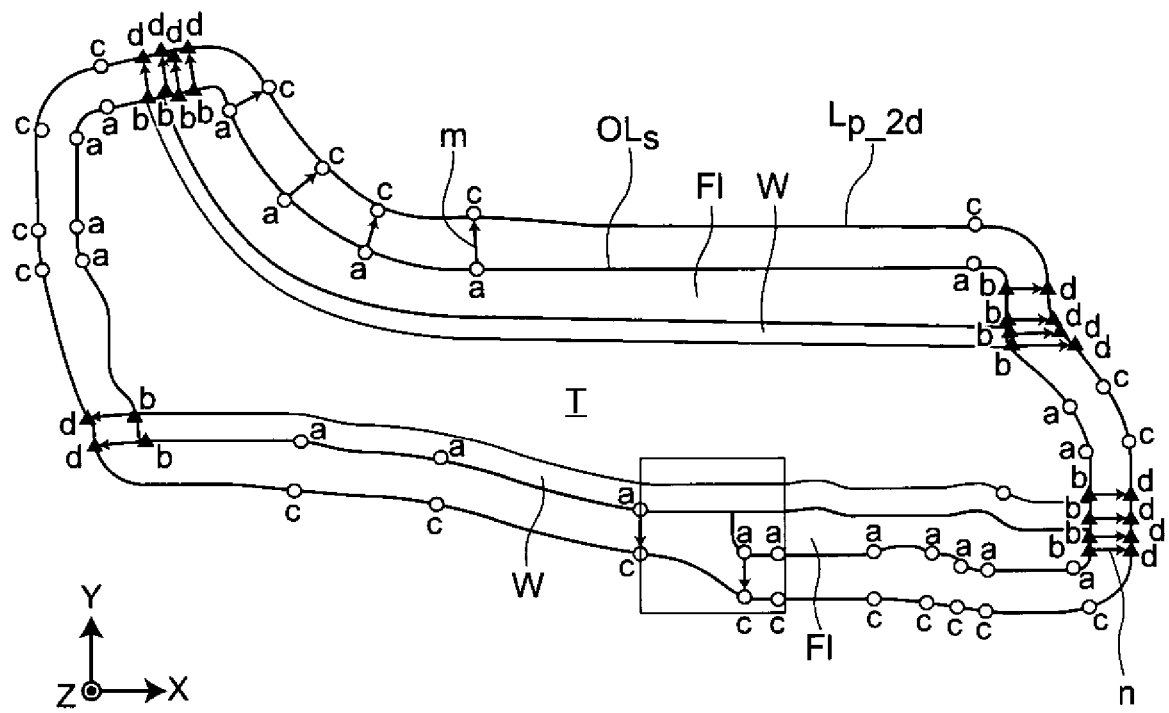
(b)
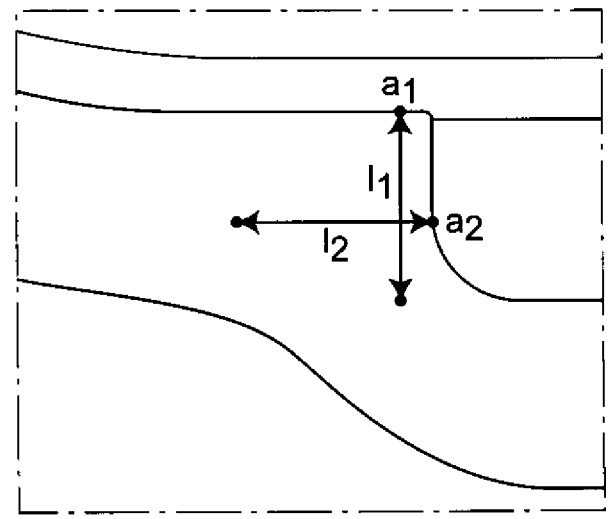

FIG. 83
(a)
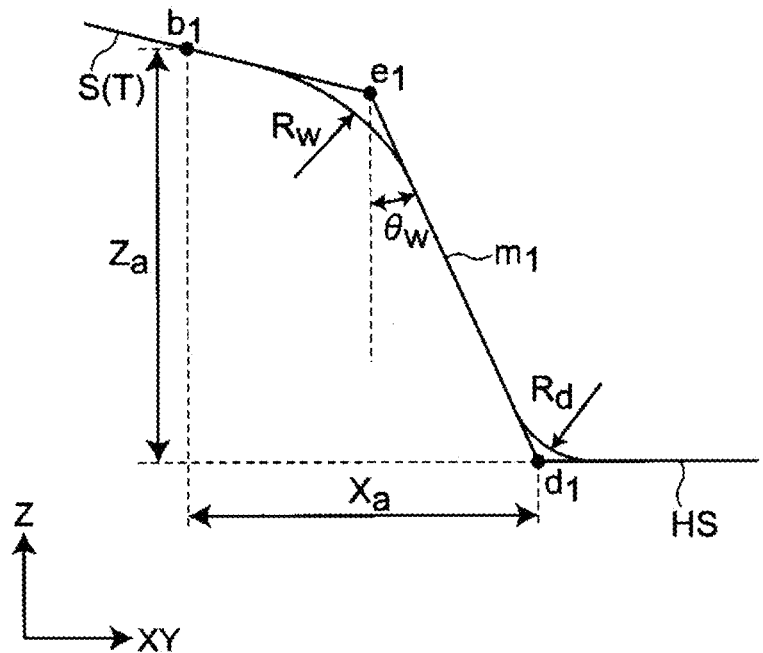
(b)
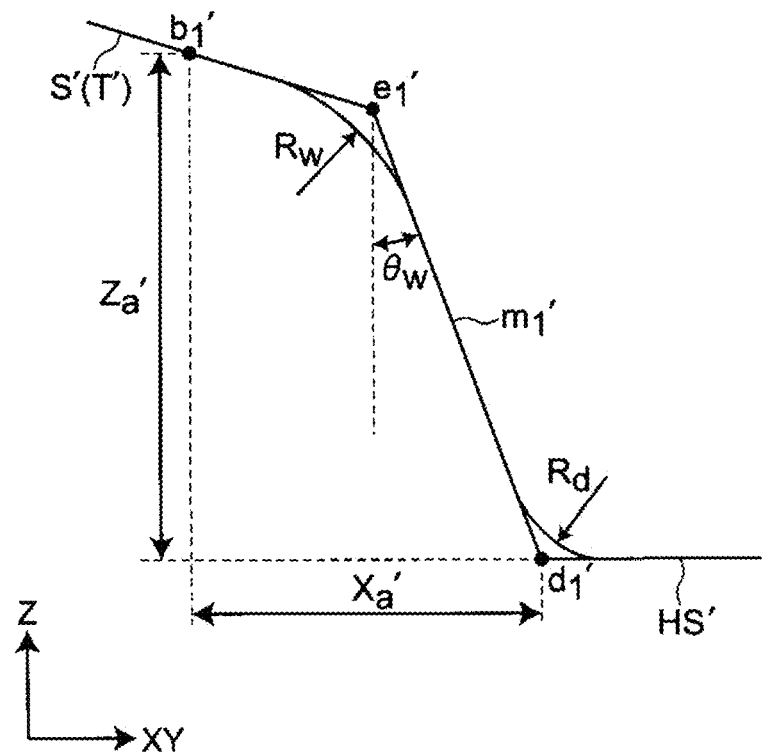

PRESS-DIE-SHAPE AUTOMATIC CREATION SYSTEM AND PROGRAM, AND PRESS-MOLDING SIMULATION SYSTEM

TECHNICAL FIELD

The present invention relates to a PRESS-DIE-SHAPE AUTOMATIC CREATION SYSTEM AND PROGRAM for forming a pressed part, and a PRESS-FORMING SIMULATION SYSTEM, which are included in the technical filed of a design support system by a computer.

BACKGROUND

For example, panel parts for forming various kinds of bodies of cars or the like are press formed parts manufactured by pressing metal plates using press dies. In order to efficiently produce formed parts having a good quality in which cracks, wrinkles or the like are not generated, a simulation of press forming is performed with creating a model of the press die at designing the press formed parts.

Generally, methods for press forming (hereinafter called "pressing method") are categorized into a forming (bending) and a drawing.

The forming (bending) is a process to press a center portion of a blank material using a die and a punch under the condition such that an outer periphery of the blank material is free. Therefore, it is used for forming a frame part having a hat-type cross-sectional shape or the like. Since this forming (bending) is basically bending process, a compact pressing machine having a rather low load can be used. Consequently, it is easy to save energy and a cost for manufacturing the press die is relatively low. A spring back, however, is easily occurred and it is difficult to retain a shape and secure a dimensional accuracy.

The drawing is a process to press down a blank material together with a die and a blank holder towards a punch under the condition such that an outer periphery of the blank material is held by the die and the blank holder. Therefore, the drawing is used for most of the formation of the deep drawn vessels or the like. The drawing is good at shape freezability, and capable of enhancing strength of formed products. Further, it is possible to restrain generation of wrinkles or cracks on the formed products by controlling a blank holding force. A manufacturing cost of the press die, however, is increased because the blank holder as a die and a drive mechanism thereof are required. Further, since the drawing is a process to use elongation of materials, it is difficult to secure a pressing capability to a high tensile steel plate which recently attracts an attention.

Additionally, in the pressing process, there is a case of press forming under the condition such that a central portion of a blank material is pressed onto a punch by using a spring pad (hereinafter simply called "pad"). In the case of using the pad, a lift or a displacement of the blank material relative to the punch during press forming may be suppressed, which may secure a dimensional accuracy of the formed product. A manufacturing cost of the press die becomes, however, high because the pad and the drive mechanism thereof are required.

Accordingly, it is necessary to apply suitable pressing process with considering the above mentioned features thereof at designing formed products.

Conventionally, in order to manufacture a shape model of the press die for pressing process as mentioned above, an engineer uses CAD data specifying a product shape to design a shape of the formed product configured by a product portion and its peripheral portions which are comprised of an addendum portion and a blank holder portion before trimming, and then designs a die, a punch and the like, which compose a press die so as to follow the shape of the formed product.

At this moment, in order to design a press die which can produce a formed product having a good quality and a high yield rate, specifically to design an addendum surface or a blank holder surface efficiently, knowhow of an experienced engineer for designing a press die is required. If an engineer who does not have such enough knowhow for designing a press die designs a press die, a correction of a shape of the press die must be repeated based on the simulation result, and thereby requiring many works and man hours.

Further, as the above mentioned method, in order to deign a press die shape from scratch by using CAD data specifying a product shape, many operations such as creating an adequate surface and adding a fillet on the CAD are required. Therefore, it takes a lot of time and effort until the engineer becomes familiar with the CAD operation.

Relating to this issue, there is used recently a system to create a press die shape automatically from a product shape with using a computer.

For example, the patent document 1 describes a system for creating an addendum shape which generates an addendum shape of the press die from a product shape automatically. According to the system for creating an addendum shape, an addendum surface may be created by setting a plurality of feature points positioning along the circumference of an outline of the product shape and/or along the circumference of a two or three dimensional punch opening line, placing a plurality of addendum cross-sectional planes which connect the outline of the product shape and the two or three dimensional punch opening line with using the feature points as at least one end point thereof, and setting the shape of the addendum cross-sectional planes to be arranged respectively, and connecting the adjacent addendum cross-sectional planes sequentially.

PRIOR ARTS

Patent Document

Patent Document 1: JP5331260B

SUMMARY OF INVENTION

Problems to be Soled by Invention

While the product itself related to the prior art has a U-type cross-sectional shape without a blank holder portion (flange portion) therearound, an actual product has the blank holder portion (flange portion) along the periphery and, for example, has a hat-type cross-sectional shape. In this case, a press die shape may not be created automatically according to the prior art.

While a press die for a drawing without a pad may be created automatically, it is not clear if it may be applied to another pressing process, that is, it is not clear that a press die for a forming (bending) or a drawing with a pad will be created automatically.

Further, in the ordinary technology, since a press die shape is generated from a product shape on a case-by-case basis, it requires a certain working times, and a knowhow of the press die design is required to select adequate pressing process. In order to save time and utilize existing knowhow, it could be considered to find an similar ordinary parts and use the press processing method data of it. But, it is not clear if such data is usable by the prior art.

Accordingly, a purpose of the present invention is to automatically create a press die shape corresponding to various kinds of pressing process and a product shape with using a part processing method data relating to the press forming of the ordinary parts.

Means for Solving Problems

In order to solve the above mentioned problems, a system and a program for automatically creating a press die shape, and a simulation system for press forming are configured as follows.

At first, the invention according to claim 1 is a system for automatically creating a press die shape which includes a product shape data obtaining device to obtain a product shape data of a product, and automatically creates a press die shape data of the press die for press forming the product by using the product shape data obtained by the product shape data obtaining device, comprising:

a part processing method data storing device which stores a data relating to a shape of a part, a pressing method for press forming the part, a pressing direction setting and a press die shape type, with respect to each part, a part processing method obtaining device which obtains a data from the part processing method data storing device, relating to the pressing method, the pressing direction setting and the press die shape type of a referencing part which are selected from the data stored in the part processing method data storing device, and a press die shape data creation device which creates the press die shape data relating to a shape of a product portion and a peripheral portion thereof in the press die based on the product shape data of the product, and the pressing method, the pressing direction setting and the press die shape type of the referencing part which are obtained by the part processing method obtaining device.

Terms used in the specification and the claims are herein defined. The above mentioned "press die shape type" means types generally categorizing methods of creating press die shapes from the product shapes. The press die shape types are generally categorized into a "product extension type" and a "blank holder and addendum surface creation type" as described below. The "product extension type" is, for example, a press die for forming a product having a hat-type cross-sectional shape, in which a blank holder surface of the press die is created by extending a flange portion of the product. The "blank holder and addendum surface creation type" is, for example, a press die for forming a product having a U-type cross-sectional shape, in which an addendum surface and a blank holder surface are created based on a shape of a vertical wall portion of the product not having a flange portion.

The invention according to claim 2 is the system for automatically creating a press die shape according to claim 1, further comprising a feature shape identifying device which calculates a main curvature of each element which configures the obtained product shape data, and identifies a fillet portion of the product based on the main curvature, and identifies a top plate portion, a vertical wall portion or a flange portion based on a positional relationship with the identified fillet portion, wherein the press die shape creation device creates the press die shape data based on the top plate portion, the vertical wall portion, or the flange portion identified by the feature shape identifying device.

The invention according to claim 3 is the system for automatically creating a press die shape according to claim 2, wherein, in the case that the press die shape type of the referencing part is a product extension type, the press die shape creation device comprises a press die outline creation device which creates a press die outline by extending a product shape outline of the product to a normal direction thereof by a predetermined distance, a blank holder surface creation device which determines an area surrounded by a fillet portion, an extended portion thereof which is created by extending a fillet portion adjacent to the flange portion and the press die outline as a blank holder surface, a punch opening line creation device which, in the case that a press die having a blank holder is used in the pressing method, determines a border line between the blank holder surface and the fillet portion and the extended portion thereof as a punch opening line which divides into the blank holder and the punch, and a pad dividing line creation device which, in the case that a die having a pad is used in the pressing method, extends the top plate portion up to the press die outline, and determines an outer periphery line of the portion including the top plate portion and the extended portion thereof as a pad dividing line which divides into the pad and the die.

The invention according to claim 4 is the system for automatically creating a press die shape according to claim 2, wherein, in the case that the press die shape type of the referencing part is a blank holder and addendum surface creation type, an addendum shape parameter of the referencing part is stored in the part processing method data storing device, the part processing method data storing device also obtains the addendum shape parameter, and wherein the press die shape creation device comprises;

a blank holder surface creation device which creates the blank holder surface based on a part processing method of the referencing part of the product, a feature point extracting device which extracts feature points which are apexes of corners having a bending angle of a predetermined angle or less on the product shape outline based on the product shape data, a two dimensional punch opening line creation device which creates a two dimensional punch opening line which is a spline closed curved line passing points outwardly offset from the extracted feature points by a predetermined distance, an addendum shape creation device which determines an addendum cross-sectional plane position using the feature points for allocating the addendum cross-sectional plane, and creates the addendum cross-sectional shape by referring to the addendum cross-sectional shape parameter with respect to each addendum cross-sectional plane position which is set from the addendum shape parameter of the referencing part obtained by the part processing method obtaining device, a three dimensional punch opening line creation device which, in the case that a die having a blank holder is used in the pressing method, maps the two dimensional punch opening line over the blank holder surface in the pressing direction, and creates a three dimensional punch opening line which divides into the blank holder and the punch, and a pad dividing line creation device which, in the case that a die having a pad is used in the pressing method, determines an outer periphery line of the top plate surface as a pad dividing line which divides into the pad and the die.

The invention according to claim 5 is the system for automatically creating a press die shape according to any one of claims 2 to 4, further comprising a pressing direction determining device which judges if a pressing direction determining type is automatic type or not, based on the data relating to the pressing direction setting of the referencing parts obtained by the part processing method obtaining device, and, when the pressing direction determining type is not automatic type, refers to the pressing direction setting in the part processing method data of the referencing part as a pressing direction of the press die of the product, and when the pressing direction determining type is automatic type, creates a mesh model from the obtained product shape data, calculates an average normal direction of all elements which configure the mesh model, preliminarily determines the average normal direction as a pressing direction of the press die of the product, identifies a feature shape of the product based on the preliminarily determined pressing direction using the feature shape identifying device, and determines a pressing direction of the press die of the product based on the identified feature shape.

The invention according to claim 6 is the system for automatically creating a press die shape according to any one of claims 1 to 5, further comprising wherein the part processing method data storing device stores draw bead arrangement position information of each draw bead portion of the press die, and a draw bead shape type, and a cross-sectional shape parameter, a draw bead setting device which allocates the draw bead arrangement line in the periphery portion of the press die shape created from the obtained product shape data, and sets the draw bead shape type and the cross-sectional shape parameter to each of the allocated draw bead arrangement line by referring to the corresponding draw bead designation of the part processing method data of the referencing part.

The invention according to claim 7 is the system for automatically creating a press die shape according to any one of claims 1 to 6, further comprising a press die shape data registering device which registers the press die shape data of the product created by the press shape creation device as a new part processing method data of a new part.

The invention according to claim 8 is a simulation system for press forming, comprising a simulation device which performs a press forming simulation of the product with using the press die shape data created by the system for automatically creating a press die shape according to any one of claims 1 to 7.

The invention according to claim 9 is the simulation system for press forming according to claim 8, wherein the part processing method data storing device includes data relating to a blank line type for determining a blank line from the part, and comprises a blank line creation device which creates the blank line of the product based on the pressing method and the blank line type of the referencing part.

The invention according to claim 10 is the simulation system for press forming according to claim 8 or 9, further comprising a holder load setting device which reads a total holder load of the referencing part from the part processing method data storing device, calculates a draw bead portion holder load applied to the draw bead portion of the referencing part, and calculates and sets a total holder load of the product based on the draw bead portion holder load.

The invention according to claim 11 is a program for automatically creating a press die shape data of a press die for press forming a product according to the product shape data of the product, said program makes a computer work as the following devices:

a part processing method data storing device which stores a data relating to a shape of a part, a pressing method for press forming the part, a pressing direction setting and a press die shape type, with respect to each part, a part processing method obtaining device which obtains a data from the part processing method data storing device, relating to the pressing method, the pressing direction setting and the press die shape type of a referencing part which are selected from the data stored in the part processing method data storing device, and a press die shape data creation device which creates the press die shape data relating to a shape of a product portion and a peripheral portion thereof in the press die based on the product shape data of the product, and the pressing method, the pressing direction setting and the press die shape type of the referencing part which are obtained by the part processing method obtaining device.

Effect of Invention

In the invention according to the claims, the following effects may be obtained by the above mentioned constituent elements, In the invention according to claim 1, if the part processing method data storing portion stores data relating to a pressing method and a product shape in advance, by selecting a part which is similar to the product as a referencing part, press die shapes corresponding to various pressing methods and product shapes may be created automatically with using the part processing method data of the ordinary parts effectively.

Actually, while the blank holder and addendum surface creation type is used in a drawing and the product extension type is used in a forming (bending) in many cases, the pressing method and the press die shape type are not limited to these combinations. Therefore, it is necessary to select suitable pressing method and the press die type, and create a press die shape corresponding to the selected pressing method and the selected shape type of the press die.

According to the invention, by using data relating to the press forming of the ordinary parts with various kinds of knowhow for a press die design, an appropriate pressing method and an appropriate press die shape type may be selected, not relying on the experience of a press die design of an engineer or degrees of the experience of CAD operation, and a press die shape corresponding to the selected pressing method and the selected press die shape type may be created in a short time.

In the invention according to claim 2, since the ceiling plate portion, the vertical wall portion or the flange portion may be identified by the feature shape identifying portion, a press die shape corresponding to the feature shape of the product may be created automatically.

In the invention according to claim 3, if a press die shape type is the product extension type, a press die shape such as a die D, a punch and a pad may be created automatically.

In the invention according to claim 4, if a press die shape type is the blank holder and addendum surface creation type, a press die shape such as a die D, a punch a blank holder and a pad may be created automatically.

In the invention according to claim 5, since after preliminarily determining a pressing direction, the feature shape of the product is identified, and the pressing direction is adjusted based on the identified feature shape, a more appropriate pressing direction corresponding to the feature shape of the actual product may be set.

In the invention according to claim 6, since a draw bead type and a cross-sectional shape parameter of the draw bead portion of the referencing part are set corresponding to each of the created draw bead arrangement lines is set, the draw bead may be created with using data of the ordinary parts effectively.

In the invention according to claim 7, since the created press die shape data of the product may be registered as a part processing method data of a new product, the part processing method data may be increased.

In the invention according to claim 8, since a press forming simulation of the product is performed with using the press die shape data created by the above mentioned system for automatically creating a press die shape, a result of the simulation may also be obtained.

In the invention according to claim 9, since a blank line of the product is created based on the pressing method and the blank line type of the referencing part, the blank line may be created with using data of the ordinary parts efficiently.

In the invention according to claim 10, since a total holder load of the product is calculated and set from the total holder load of the referencing part, a press forming condition may be set with using the data of ordinary parts efficiently at the press forming simulation.

In the invention according to claim 11, the effects to be similar to those of the invention of the system according to claim 1 may be obtained.

BRIEF EXPLANATION OF THE DRAWINGS

FIG. 9 is a drawing for illustrating a data configuration of a product shape outline data.

FIG. 10 is a drawing for illustrating a data configuration of a part processing method data table.

FIG. 11 is a drawing for illustrating each of the draw bead designation group information.

FIG. 12 is a drawing for illustrating a data configuration of a pressing direction data.

FIG. 13 is a drawing for illustrating a data configuration of a two dimensional punch opening line data.

FIG. 14 is a drawing for illustrating a data configuration of a three dimensional punch opening line data.

FIG. 15 is a drawing for illustrating a data configuration of a feature point data.

FIG. 16 is a drawing for illustrating a data configuration of an addendum cross-sectional plane data.

FIG. 17 is a drawing for illustrating a data configuration of a draw bead data.

FIG. 18 is a drawing for illustrating a data configuration of a blank line data.

FIG. 20 is a drawing for illustrating an example of a result showing window displayed in an output apparatus of the system.

FIG. 21 is a perspective view for schematically illustrating a configuration of a press die for a forming (bending) (without a pad) and a movement thereof.

FIG. 22 is a perspective view for schematically illustrating a configuration of a press die for a forming (bending) (with a pad) and a performance thereof.

FIG. 23 is a perspective view for schematically illustrating a configuration of a press die for a drawing (without a pad) and a performance thereof.

FIG. 24 is a perspective view for schematically illustrating a configuration of a press die for a drawing (with a pad) and a performance thereof.

FIG. 44 is a perspective view for illustrating pressed products as a first application sample and a second application sample.

FIG. 46 is a drawing for describing a determination of a pressing direction of a first application sample.

FIG. 66 is a drawing for describing a creation of a press die shape of a first application sample (9).

FIG. 67 is a drawing for describing a creation of a press die shape of a first application sample (10).

FIG. 78 is a drawing for describing a creation of a press die shape of a second application sample (3).

FIG. 81 is a drawing for describing a creation of a press die shape of a second application sample (6).

FIG. 83 is a drawing for describing a creation of a press die shape of a second application sample (8).

DETAILED DESCRIPTION OF THE EMBODIMENTS

A system and a program for automatically creating a press die shape according to the present invention will hereinafter be described.

(1) Outline of System for Automatically Creating Press Die Shape

Figure 1:
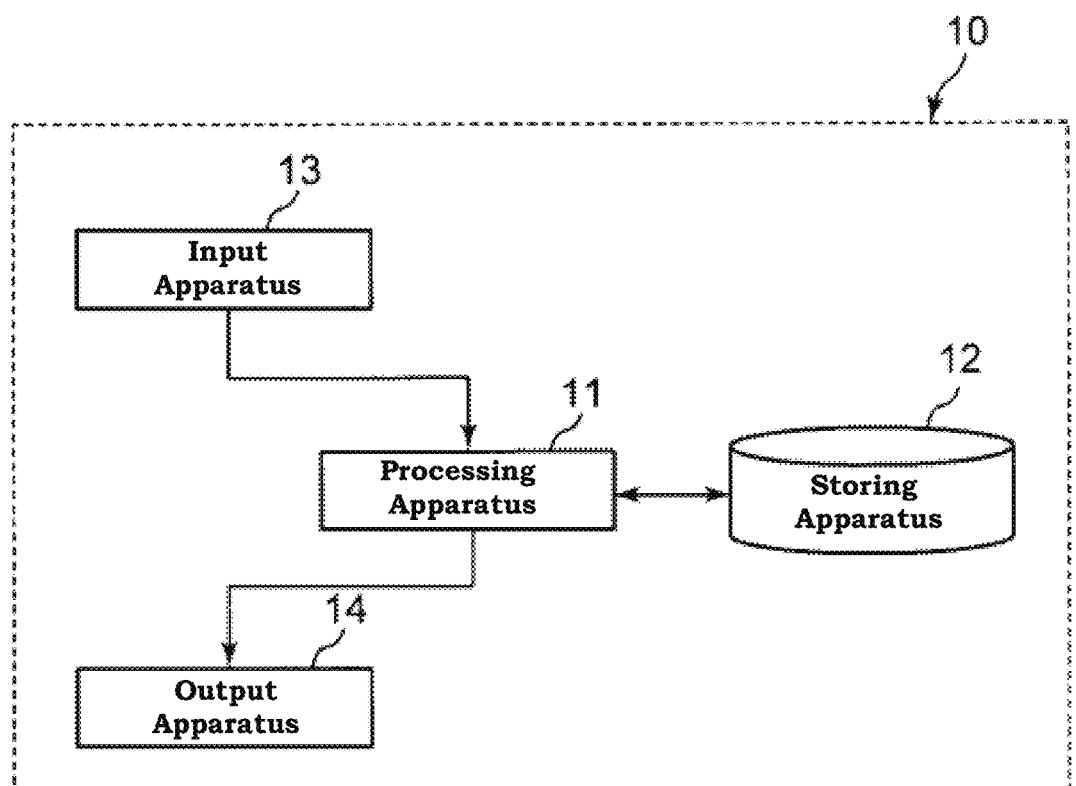
FIG. 1 is a block diagram for illustrating a total configuration of a system for automatically creating a press die shape.

FIG. 1 illustrates a configuration of a computer which is a main device of the system for automatically creating a press die shape. The computer 100 includes a processing apparatus 11 such as a CPU, a storing apparatus 12 such as a memory and a hard disk, a input apparatus 13 such as a keyboard, a mouse and a CD ROM drive, and an output apparatus 14 such as a crystalline liquid display and a printer.

(1-1) Processing Apparatus

Figure 2:
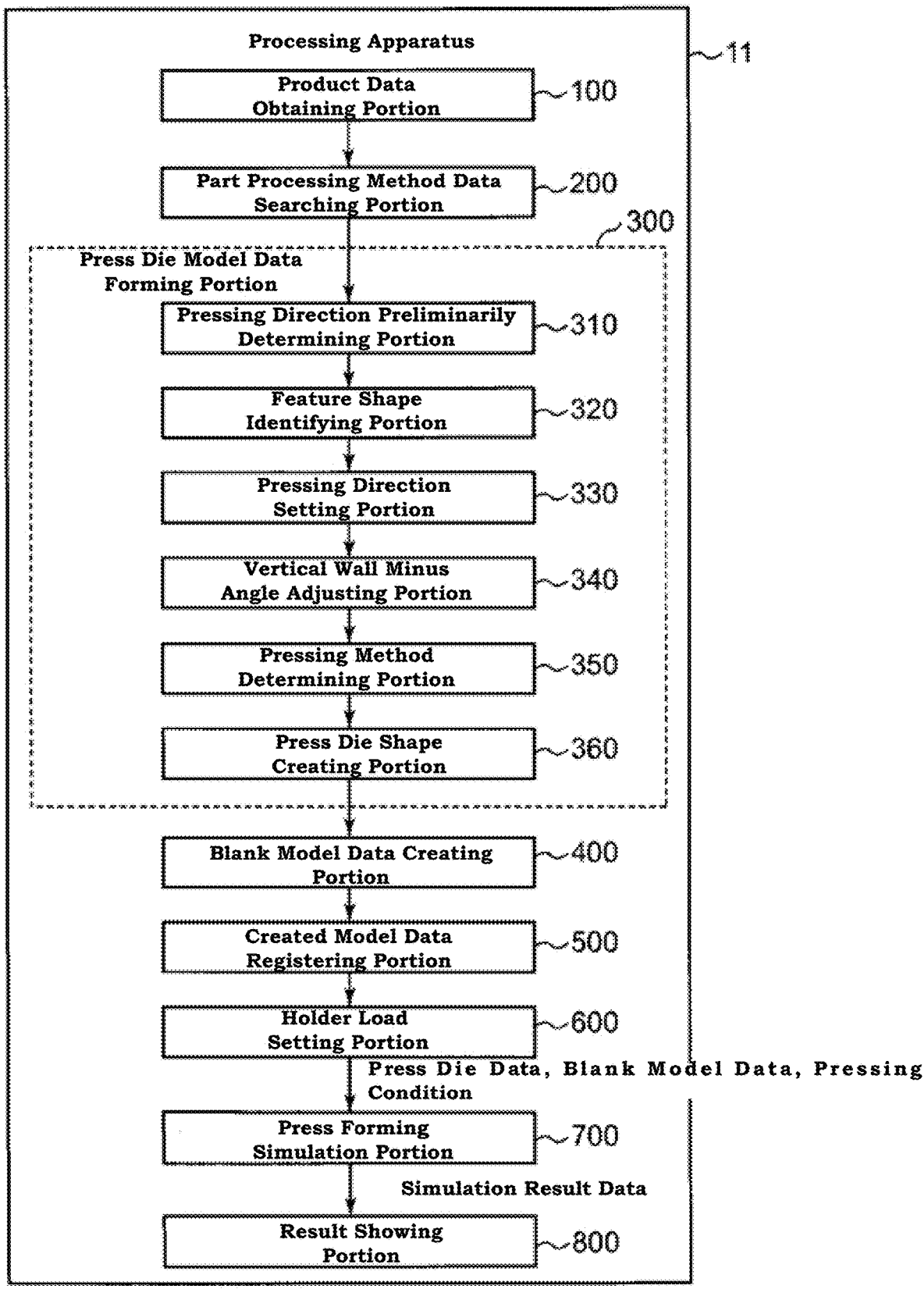
FIG. 2 is a block diagram for illustrating a configuration of a processing apparatus of the system.

FIG. 2 is a block diagram for illustrating a configuration of the processing apparatus 11 of FIG. 1.

The processing apparatus 11 includes a product data obtaining portion 100 which obtains a product data relating to a product that is subject to a press forming simulation from the input apparatus 13 (or the storing apparatus 12), a part processing method data searching portion 200 which searches a part processing method data of a referencing part R that is similar to a product S, a press die model data creating portion 300 which creates a press die model data for analysis which is used in the press forming simulation, a blank data creating portion 400 which creates a blank model data for analysis based on the above mentioned data, a created model data registering portion 500 which makes the storing apparatus 12 store the created press die model data and the created blank model data, and registers them as a part processing method data of a new part, a holder load setting portion 600 which sets a holder load as a pressing condition, a press forming simulation portion 700 which performs a press forming simulation based on the created press die model data, the created blank model data, and the set pressing condition, a result showing portion 800 which shows a result of the simulation using the output apparatus 14.

(1-2) Storing Apparatus

Figure 3:
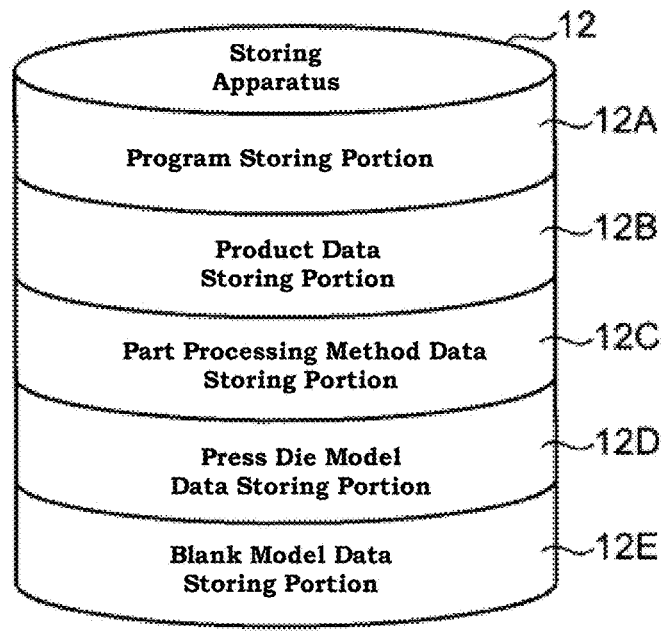
FIG. 3 is a block diagram for illustrating a configuration of a storage device of the system.

FIG. 3 is a block diagram schematically illustrating a configuration of the storing apparatus 12 in FIG. 1. The storing apparatus 12 is mainly configured with a program storing portion 12A, a product data storing portion 12B, a part processing method data storing portion 12C, a press die model data storing portion 12D and a blank model data storing portion 12E.

Figure 4:
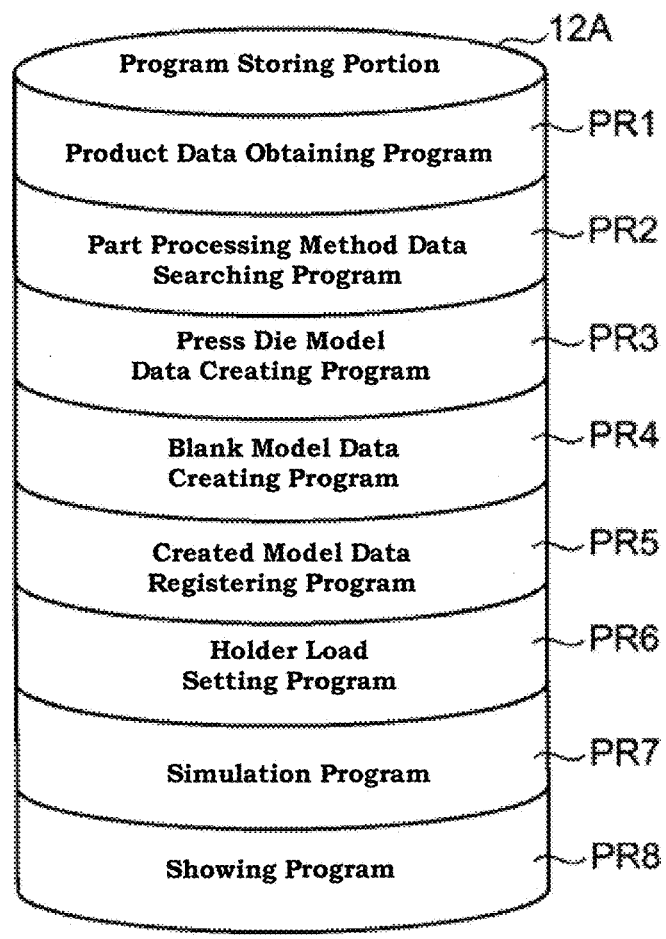
FIG. 4 is a block diagram for illustrating a configuration of a program storing portion of the storage device.

As illustrated in FIG. 4, the program storing portion 12A includes program storing portions 12A1 to 12A8 which respectively store a product data obtaining program PR1, a part processing method data searching program PR2, a press die model data creation program PR3, a blank model data creation program PR4, a created model data registering program PR5, a holder load setting program PR6, a simulation program PR7 and a showing program PR8. Each of the programs PR1 to PR8 is performed according to the product data obtaining portion 100, the part processing method data searching portion 200, the press die data creating portion 300, the blank model data creating portion 400, the created model data registering portion 500 and the holder load setting portion 600, and the press forming simulation portion 700 and the result showing portion 800 in the above mentioned processing apparatus 11 respectively.

Figure 5:
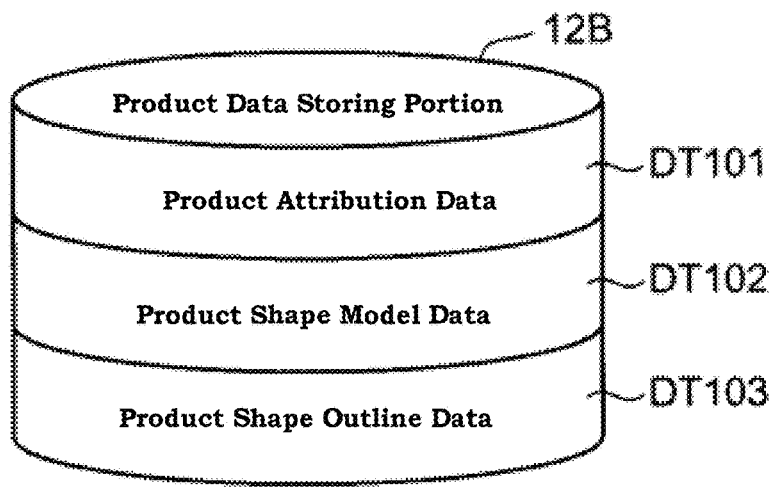
FIG. 5 is a block diagram for illustrating a configuration of a product data storing portion of the storage device.

As illustrated in FIG. 5, the product data storing portion 12B includes data string portions 12B1 to 12B3 which respectively store a product attribution data DT101, a product shape model data DT102 and a product shape outline data DT103, which configure a product data DT100.

Figure 6:
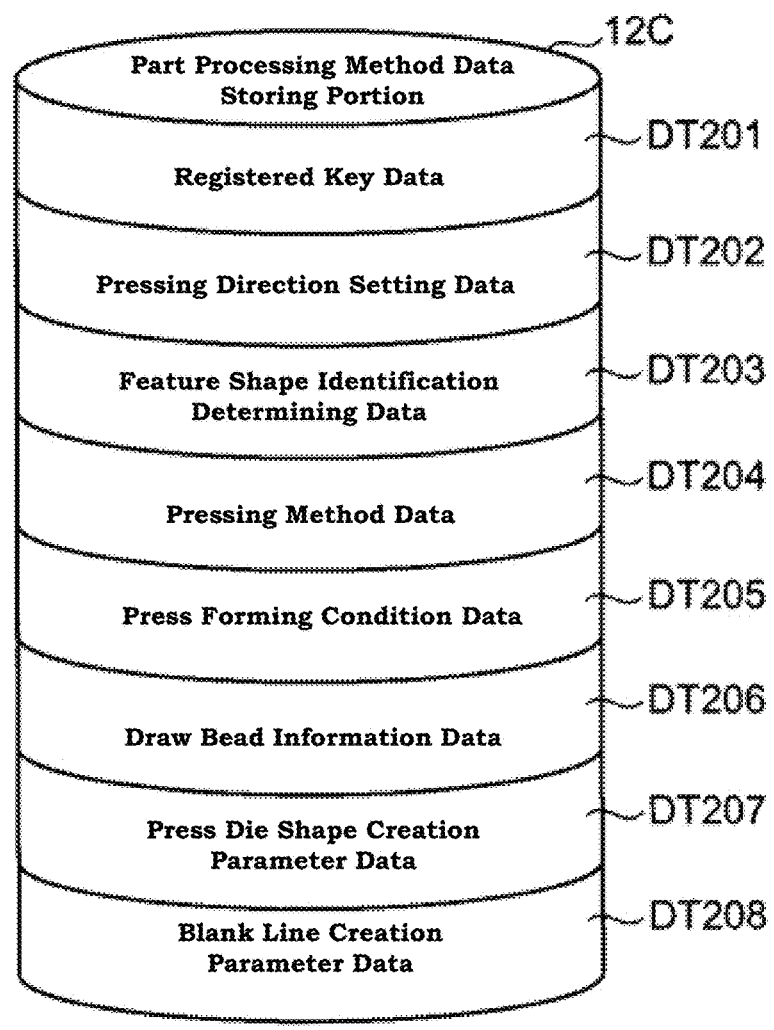
FIG. 6 is a block diagram for illustrating a configuration of a part processing method data storing portion of the storage device.

As illustrated in FIG. 6, the part processing method data storing portion 12C includes data storing portions 12C1 to 12C8 which respectively store a registered key data DT201, a pressing direction setting data DT202, a feature shape identification determining data DT203, a pressing method data DT204, a press forming condition data DT205, a draw bead information data DT206, a press die shape creation parameter data DT207 and a blank line creation parameter data DT208, which configure a part processing method data DT200.

Figure 7:
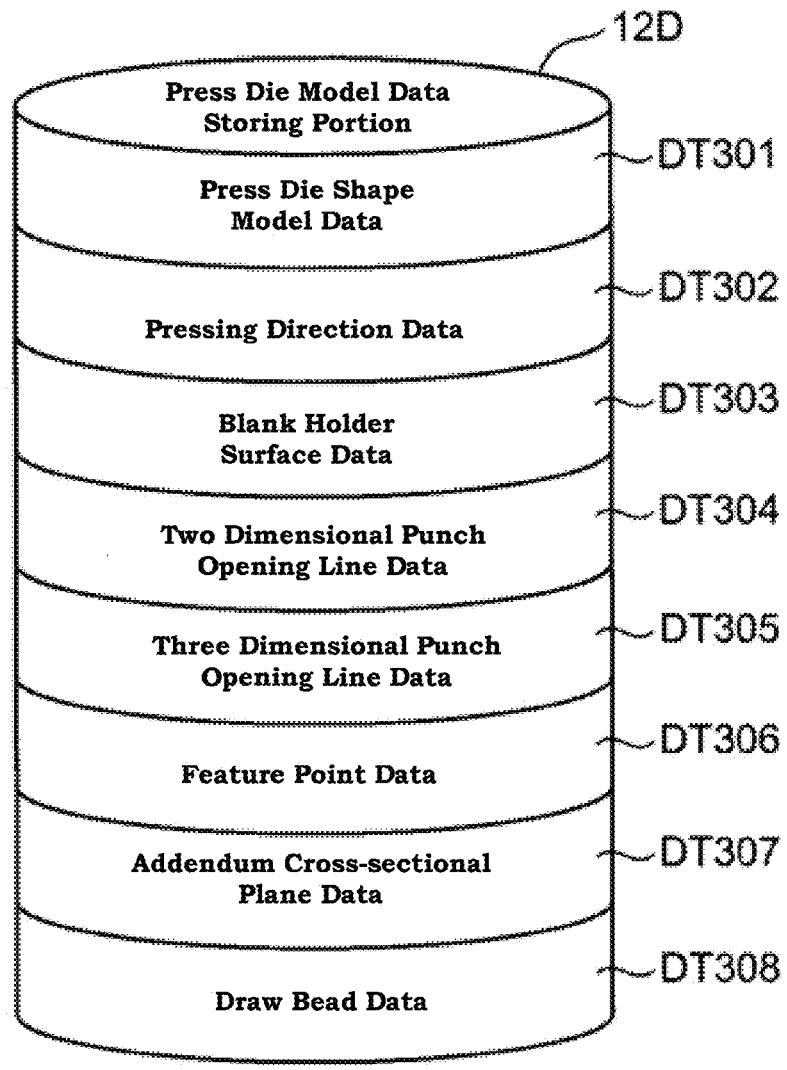
FIG. 7 is a block diagram for illustrating a configuration of a press die model data storing portion of the storage device.

As illustrated in FIG. 7, the press die model data storing portion 12D includes data storing portions 12D1 to 12D8 which respectively store a press die shape model data DT301, a pressing direction data DT302, a blank holder surface data DT303, a two dimensional punch opening line data DT304, a three dimensional punch opening line data DT305, a feature point data DT306, an addendum cross-sectional plane data DT307 and a draw bead data DT308, which configure a press die data DT300.

Figure 8:
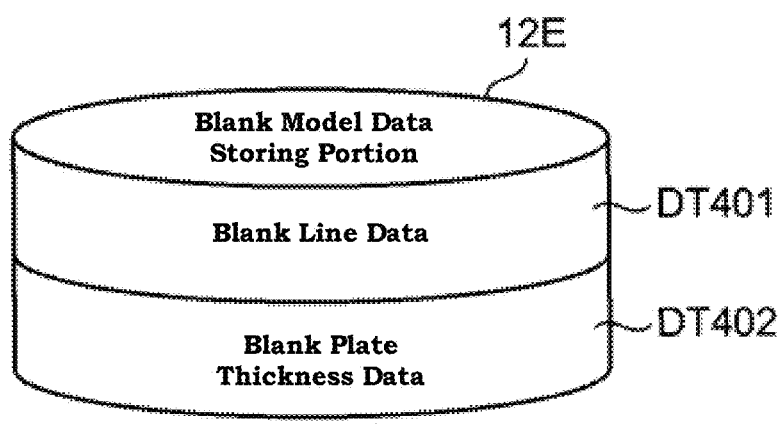
FIG. 8 is a block diagram for illustrating a configuration of a blank model data storing portion of the storage device.

As illustrated in FIG. 8, the blank model data storing portion 12E includes data storing portions 12E1 to 12E2 which respectively store a blank line data DT401, a blank plate thickness data DT402, which configure a blank model data DT400

The data DT101 to DT402 will be hereinafter described in this order. At first, the product data 100 will be described in details.

(1-2-1) Product Attribution Data

The product attribution data DT101 is a data in which attribution relating to products is categorized. For example, if the product is a pressed part which configures a car body, the product attribution data is specifically configured with the attribution such as a production data number, a name of a car type, a manufactured year, a name of the part, a size, a material, a thickness and the like. The product attribution data DT101 is input into the processing apparatus 11 via the input apparatus 13 such as a crystalline liquid display, a keyboard or the like.

(1-2-2) Product Shape Model Data

The product shape model data DT102 is a data showing a shape of the product that is subject to analysis. Specifically, the product shape model data DT102 is a three dimensional CAD data in file format of IGES, DXF, DWG or the like, which is created with using a three dimensional CAD software, or a mesh data in which an object is dispersed into finite elements according to a CAD data, or the like. The product shape model data DT102 is stored in a storage media such as a CD Rom, and input into the processing apparatus 11 via the input apparatus 13 such as a CD ROM drive.

(1-2-3) Product Shape Outline Data

An overlapped portion of the product shape model and the press die shape model is determined as a product surface portion. All of an outline of the product surface portion is discomposed into a three dimensional dotted line. The product shape outline data DT103 is a data indicating a position of each nodal point configuring the dotted line or the like. Specifically, as illustrated in FIG. 9, the product shape outline data DT103 is configured with nodal point numbers N . . . , XYZ coordinates of each nodal point in the total coordinate system, a feature point flag for judging a fold angle.

The feature point flag is used for judging if the fold angle between two lines created by connecting one nodal point and two adjacent nodal points positioned on both sides thereof is a predetermined angle or less, or not. If the fold angle is the predetermined angle or less, "1" is set as the flag. According to FIG. 9, for example, the feature point flag is set "1" in the nodal point N2001, which means that an angle of two lines created by connecting the nodal point N2001 and adjacent two nodal points, that is, the nodal point N2002 and the nodal point of the last nodal point number is the predetermined angle or less.

Next, with referring to FIGS. 10 and 11, the part processing method data DT200 will hereinafter be described in detail.

(1-3-1) Registered Key Data

The registered key data DT201 is configured with a parameter such as a part name of each part, a size, a material and a plate thickness.

(1-3-2) Pressing Direction Setting Data

The pressing direction setting data DT202 is used for setting a pressing direction of the press die. Specifically, as illustrated in FIG. 10, the pressing direction setting data DT202 is configured with a parameter such as a determined type, a moving distance of an original point of a press swing angle and a vector in X, Y, Z axis.

(1-3-3) Feature Shape Identification Determining Data

The feature shape identification determining data DT203 is used for identifying a feature shape. Specifically, the feature shape identification determining data DT203 is configured with a parameter such as a referencing part, an allowance value for judging punch shoulder R, an allowance value for judging die R and a value for judging emboss depth.

(1-3-4) Pressing Method Data

The pressing method data DT204 is configured with a type of a parameter such as a type of a forming (bending) or a drawing, with/without a pad.

(1-3-5) Press Forming Condition Data

The a press forming condition data DT205 is configured with a parameter which is a press condition at a press forming such as a holder load and a pad load.

(1-3-6) Draw Bead Information Data

The draw bead information data DT206 is configured with a parameter such as with/without a draw bead, an offset distance from the punch opening line, a minimum draw bead length and the number of draw bead designation group.

With referring to FIG. 11, the draw bead designation group information will herein be described.

As illustrated in FIG. 11, the draw bead designation group information is configured with a parameter such as a group information (a group number, a group name, a group judging type, a group judging allowance value), a draw bead arrangement position information (an average direction vector, a center position coordinate), a draw bead arrangement method (ON or OFF), a draw bead shape type (circular, rectangular or step), a cross-sectional shape parameter (a basic position, an edge radius, a center radius, a depth), a draw bead maximum load and a total draw bead length.

(1-3-7) Press Die Shape Creation Parameter Data

The press die shape creation parameter data DT207 is configured with a parameter such as a press die shape type, a blank holder surface parameter (a blank holder surface type (a plat surface, a curved surface or a referencing part (a ceiling plate portion or a flange portion)), a forming position difference designation value, a curved surface type (a column or a cone), a curved surface defining parameter and an addendum shape parameter (a two dimensional punch opening line offset distance, an addendum cross-sectional shape parameter of a pad portion, a flange portion and a vertical wall portion).

(1-3-8) Blank Line Creation Parameter Data

The blank line creation parameter data DT208 is configured with a parameter such as a blank type, an offset amount, a rectangular size minimum value, a cut point moving allowance value, a cut line forming allowance value.

Next, with referring to FIGS. 12 to 17, the press die model data DT300 will be described in detail.

(1-4-1) Press Die Shape Model Data

The press die shape model data DT301 is a mesh data for structural analysis which is created by normal meshes based on the known press die shape data obtained by various systems, which includes, for example, a press die shape data of various data type that has already been created such as a CAD data designed by an ordinary CAD system, a STL (Standard Triangulated Language) data that is obtained with measurement by a three dimensional measurement system relating to actual press dies. This mesh data shows a model shape of each part that configures the press die (a die, a punch, a blank holder or a pad).

(1-4-2) Pressing Direction Data

The pressing direction data DT302 is a data showing a press swing angle of the press die. Specifically, as illustrated in FIG. 12, the pressing direction data DT302 is configured with a parameter such as a data point coordinate (XYZ coordinate) of the press die, elements $m_{11}, \ldots, m_{33}$ of a coordinate conversion matrix for converting from the XYZ coordinate system to the press die coordinate system including the pressing direction as one axis, based on the press swing angle.

(1-4-3) Blank Holder Surface Data

The blank holder surface data DT303 is a data showing a shape and a height of the blank holder surface which holds a peripheral part of the blank for holding a wrinkle at press forming. A shape of the blank holder surface is determined according to the product shape, and it is not limited to a flat surface.

(1-4-4) Two Dimensional Punch Opening Line Data

The two dimensional punch opening line data DT304 is a data showing a two dimensional shape created by mapping the three dimensional punch opening line which is an outline of the addendum portion of the press die over a surface which is perpendicular to the pressing direction. Specifically, as illustrated in FIG. 13, the two dimensional punch opening line data DT304 is configured with a parameter such as a line number L . . . , a line type (fillet, circle, straight line), a first end coordinate (XY coordinate), a second end coordinate (XY coordinate), a center coordinate (XY coordinate), a radius R, a stating angle $\alpha$ and an ending angle $\beta$.

Since the two dimensional punch opening line is considered as to be a closed curved line configured with a plurality of lines, the two dimensional punch opening line data DT304 has, relating to each line, a fillet, a line type showing if a fillet, a circular arc or a straight line, and first and second end point coordinates showing XY coordinates of both ends of line, as well as if the line is a circular arc or a fillet, a center coordinate and a radius R thereof, and a staring angle $\alpha$ and an ending angle $\beta$ showing phases of the both ends of the line.

(1-4-5) Three Dimensional Punch Opening Line Data

Whole outer periphery of the three dimensional punch opening line is discomposed into a three dimensional dotted line, and the three dimensional punch opening line data DT305 is a data indicating a position of each nodal point configuring the dotted line. Specifically, as illustrated in FIG. 14, the three dimensional punch opening line data DT305 is configured with a nodal point numbers N . . . , a XYZ coordinate of each nodal point in a total XYZ coordinate system and a feature point flag showing ends of the fillet.

The feature point flag is a flag for judging if the nodal point is positioned at the end of the fillet or not. If the nodal point is positioned at the end of the fillet, "1" is set as the feature point flag.

(1-4-6) Feature Point Data

As illustrated in FIG. 15, the feature point data DT306 is a data showing the feature point on the product shape outline as a nodal point number. This feature point is the nodal point in which "1" is set as the feature point flag in the above mentioned product shape outline data DT103.

(1-4-7) Addendum Cross-Sectional Plane Data

The addendum cross-sectional plane data DT307 is a data showing a cross-sectional shape of the addendum cross-sectional plane including each feature point as the end points. Specifically, as illustrated in FIG. 16, the addendum cross-sectional plane data DT307 is configured with a parameter 1 such as a cross-sectional plane number P . . . , a nodal point number of the product shape outline N . . . , a nodal point number of the three dimensional punch opening line N . . . , a cross-sectional shape type, a fillet radius of the shoulder portion, a parameter 2 such as a wall angle showing the shoulder portion, or the like. According to FIG. 16, for example, it is understood that the addendum cross-sectional plane of the cross-sectional plane number P1 is located between the nodal point N2001 and the nodal point N1005, the type of the cross-sectional shape is "1", the fillet radius of the shoulder portion of the addendum cross-sectional plane is R5, and an angle of the shoulder portion to the vertical direction is 20 degrees.

The cross-sectional shape type shows which type is used in a plurality of types of the cross-sectional shape. For example, the addendum cross-sectional plane having one shoulder is registered as type 1, the addendum cross-sectional plane having two shoulders is registered as type 2, the addendum cross-sectional plane having three shoulders is registered as type 3, and the addendum cross-sectional plane having no shoulder is registered as type 1, and so on. Although only the parameters 1 and 2 are described in FIG. 16, the number of parameters is different according to the cross-sectional shape type, and therefore the addendum cross-sectional plane data DT has the numbers of the parameters necessary for uniquely defining the cross-sectional shape of each cross-sectional plane.

(1-4-8) Draw Bead Data

The draw bead data DT308 is a data showing a beat shape and a position thereof. Specifically, as illustrated in FIG. 17, the draw bead data DT308 is configured with a parameter such as a draw bead shape parameter (a draw bead number, a draw bead shape type (circle, rectangular, step), XY coordinate of starting and ending points, a cross-sectional plane edge radius, a cross-sectional plane center radius, a depth and a draw bead line data (a nodal point number, a XY coordinate of each nodal point).

Next, with referring to FIG. 18, the blank model data DT400 will be described in detail.

(1-5-1) Blank Line Data

As illustrated in FIG. 18, the blank line data DT401 is configured with a nodal numbers N . . . , a XY coordinate of each nodal point in the total coordinate system.

(1-5-2) Blank Plate Thickness Data

The blank plate thickness data DT402 has a plate thickness of the blank material as a parameter.

(1-6) Input Apparatus

The input apparatus 13 is used for input of a data relating to product category of the product data, for example, input of a data relating to the product shape such as a CAD data and a mesh data, setting of various kinds of conditions at data conversion and a system control, or the like.

(1-7) Output Apparatus

Figure 19:
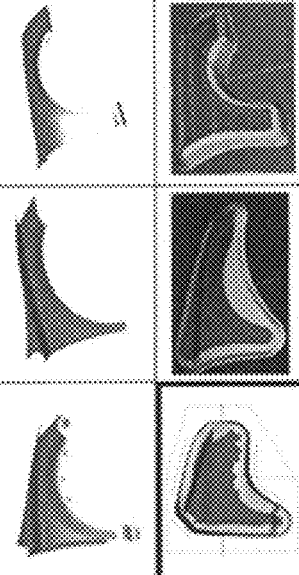
FIG. 19 is a drawing for illustrating an example of a search window displayed in an output apparatus of the system.

A searching window, an input window, an edit window, an analysis result or the like is shown in the output apparatus 14. For example, as illustrated in FIG. 19, a searching condition and a searching result are shown in the searching window, and as illustrated in FIG. 20, a three dimensional shape of the pressed product is graphically shown as classified in color according to a reducing rate of the plate thickness, or a corresponding plastic strain as a result of a press forming simulation in the searching result.

(2) Pressing Method and Press Die Construction

With referring to FIGS. 21 to 24, there are described four kinds of pressing methods to which the above mentioned system for automatically creating a press die shape is applied.

FIG. 21 illustrates the press die construction for the forming (bending) and a movement thereof. This press die has a die D and a punch Pn.

In this example, the die D which becomes an upper die has a cavity C which corresponds to a shape of the press formed product on the lower surface thereof. The punch Pn which becomes a lower die has a convex shape which corresponds to the shape of the cavity C on the upper surface thereof.

In this forming (bending), a blank material B is placed between the die D and the punch Pn on the condition such that a periphery portion of the blank material B is free (refer to FIG. 21 (*a*)). Then, the die D moves down to press the blank material B onto the punch Pn, and thereby compressing a center portion of the blank material B into the cavity C (refer to FIG. 21(*b*)). Accordingly, in this example, the press formed product having a hat-type cross-sectional shape may be obtained (refer to FIG. 21(*c*)).

FIG. 22 illustrates the press die construction for the forming (bending) and a movement thereof. This press die has a die D, a punch Pn and pad Pd.

In this example, the die D which becomes an upper die has, on the lower surface thereof, a cavity C to which the pad Pd that has a shape corresponding to a shape of the press formed product is slidably fitted up and down. The punch Pn which becomes a lower die has, on the upper surface thereof, a convex shape which corresponds to the shape of the lower surface of the pad Pd and the shape of the cavity C of the die D.

In this forming (bending), a blank material B is placed between the die D and the punch Pn on the condition such that a periphery portion of the blank material B is free, and further a center portion of the blank material B is pressed onto the punch Pn with using the pad Pd (refer to FIG. 22 (*a*)). Then, keeping this condition, the die D moves down to press the blank material B onto the punch Pn, and thereby compressing a center portion of the blank material B into the cavity C (refer to FIG. 22(*b*)). Accordingly, in this example, the press formed product having a hat-type cross-sectional shape may be obtained (refer to FIG. 22(*c*)).

FIG. 23 illustrates the press die construction for the drawing and a movement thereof. This press die has a die D, a punch Pn and a blank holder H.

In this example of the drawing, being similar to the above mentioned forming (bending), the die D which becomes an upper die has a cavity C which corresponds to a shape of the press formed product on the lower surface thereof. The punch Pn which becomes a lower die has a convex shape corresponding to a shape of the cavity C on the upper surface thereof.

In the drawing, the blank holder H which becomes a lower press die in this example, has an opening having a shape almost corresponding to a profile of the cavity C of the die D, and has a blank holder surface HS having a shape corresponding to a surface around the cavity C of the die D around the opening on the upper surface. The punch Pn which becomes a lower press die, has a outer shape corresponding to the shape of the opening of the blank holder H and formed a little bit smaller.

In the drawing, on the condition that the die D and blank holder H hold a periphery portion of the blank material B with a predetermined blank holder force (refer to FIG. 23 (a)). Then, the die D together with the blank holder H move down to press the blank material B onto the punch Pn, and thereby compressing a center portion of the blank material B into the cavity C (refer to FIG. 23 (b)). Accordingly, the press formed product like a container having a bottom surface (refer to FIG. 23(c)).

FIG. 24 illustrates the press die construction for the drawing and a movement thereof. This press die has a die D, a punch Pn, a blank holder H and pad Pd.

In this example, the die D which becomes an upper die has, on the lower surface, a cavity C to which the pad Pd that has a shape corresponding to a shape of the press formed product is slidably fitted up and down. The punch Pn which becomes a lower die has, on the upper surface, a convex shape corresponding to the shape of the lower surface of the pad Pd and the shape of the cavity C of the die D.

In the drawing, on the condition such that the die D and blank holder H hold a periphery portion of the blank material B with a predetermined blank holder force, together with pressing a center portion of the blank material B to the punch Pn with using the pad Pd (refer to FIG. 24 (a)). Then, the die D together with the blank holder H move down to press the blank material B onto the punch Pn, and thereby compressing the center portion of the blank material B into the cavity C (refer to FIG. 24 (b)). Accordingly, the press formed product like a vessel having a bottom surface may be obtained (refer to FIG. 24(c)).

Since the above mentioned forming (bending) (refer to FIG. 21, FIG. 22) is basically a bending process, press forming may be performed with a relatively low load. Accordingly, energy save may easily be achieved and a manufacturing cost of the press die is relatively low. On the contrary, the forming (bending) has a feature such that since a spring back will easily be generated, it is difficult to retain a shape and secure a dimensional accuracy.

Since the above mentioned drawing (refer to FIG. 23, FIG. 24) is good at retaining a shape of the press formed product. Further it may enhance strength of the press formed product, and suppress generation of wrinkles or cracks by controlling a blank holder force of the blank holder H. On the contrary, since the drawing needs the blank holder H and a drive mechanism thereof as a press die, a manufacturing cost of the press die becomes high. Further, since the drawing is a forming method using elongation of the material, it has a feature such that it is difficult to obtain enough forming performance when applied to a high tensile steel plate that recently attracts an attention.

Additionally, in the case of using the pad in the forming (bending) or the drawing (refer to FIG. 22, FIG. 24), since there may be suppressed floating or shifting of the blank material B from the punch Pn during press forming, and generation of wrinkles on the press formed product, a dimensional accuracy may be secured. On the contrary, since the pad Pd and a drive mechanism thereof are required, it has a feature such that a manufacturing cost of the press die becomes high.

The blank material B having a plate like shape which becomes a base material of the product is a thin steel plate. In order to reduce weight of the press formed product, an aluminum alloy plate may also be used as the blank material B. Further, in order to achieve both weight saving and enhancement of collision safety, a high tensile steel plate may be used.

According to the necessity, the blank holder H which becomes a lower press die may have a drawing draw bead convex portion (not illustrated) on the upper surface thereof, and the die D which becomes a lower press die may have a drawing draw bead concave portion (not illustrated) corresponding to the drawing convex portion on the lower surface thereof.

During the press forming, it is possible to hold the die D and the blank holder H, and move the punch Pn upward. Further, the press die may be configured with the die as a lower press die, and the punch Pn and the blank holder H as an upper press die. Additionally, the press forming may be subject to either a cold press process or a hot press process.

(3) Method for Creating Press Die Shape by System for Automatically Creating Press Die Shape A method for creating a press die shape by the system 1 for automatically creating a press die shape will be described.

In the following description, a specific description is made with referring to the case of applying to two application examples as illustrated in FIG. 44. FIG. 44 (*a*) and FIG. 44(*b*) illustrate a product shape according to a first application example, whose press die shape type is a product extension type, and a product shape according to a second application example, whose press die shape type is a blank holder and addendum surface creation type, respectively. As shown in each drawing, the product according to the first application example has a hat-type cross-sectional shape and flange portions along the both sides in the longitudinal direction thereof, and the product according to the second application example has a boot type shape in the planar view and a vertical wall portion without a flange portion along one side in the longitudinal direction thereof.

Figure 25:
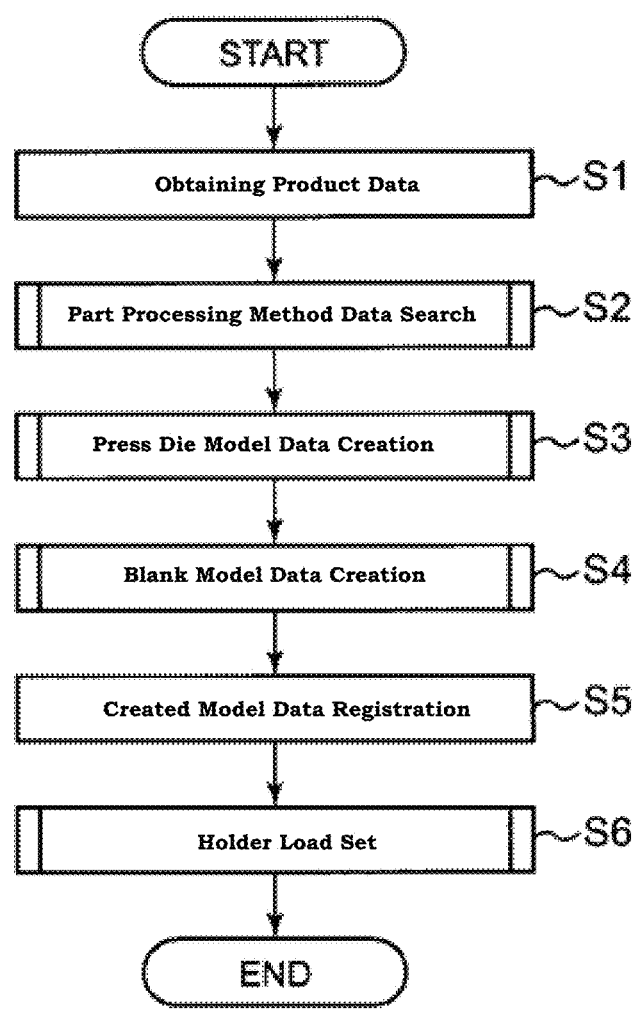
FIG. 25 is a flowchart for illustrating a method for automatically creating a press die shape.

At first, according to the process shown in the flowchart of FIG. 25, a general flow of the method for creating a press die shape will be described.

For performing the method for creating a press die shape, the product data DT100 and the part processing method data DT200 are stored in the data storing portion 12B, 12C in advance.

At first, the product data obtaining portion 100 obtains the product attribution data DT101, the product shape model data DT102 and the product shape outline data DT103 from the product data storing portion 12B (Step S1).

Next, the part processing method data searching portion 200 searches the part processing method data registered in the database using the attribution of the product attribution data DT101 as a key (Step S2).

Next, the press die model data creating portion 300 creates the press die data DT300 (Step S).

Next, the blank data creating portion 400 creates the blank model data DT400 (Step S4).

Next, the created model data registering portion 500 registers the press die model data DT300 and the blank die data D400 in the part processing method data storing portion 12C as the part processing method data DT 200 of anew part (Step S5). At this moment, in order that the converted data registered in the database may be searched using the attribution of the product attribution data DT101 as a key, the product attribution data DT101 is registered in the database together with the conversion data.

Finally, the holder load setting portion 600 sets the holder load as a pressing condition (Step 6).

Figure 45:
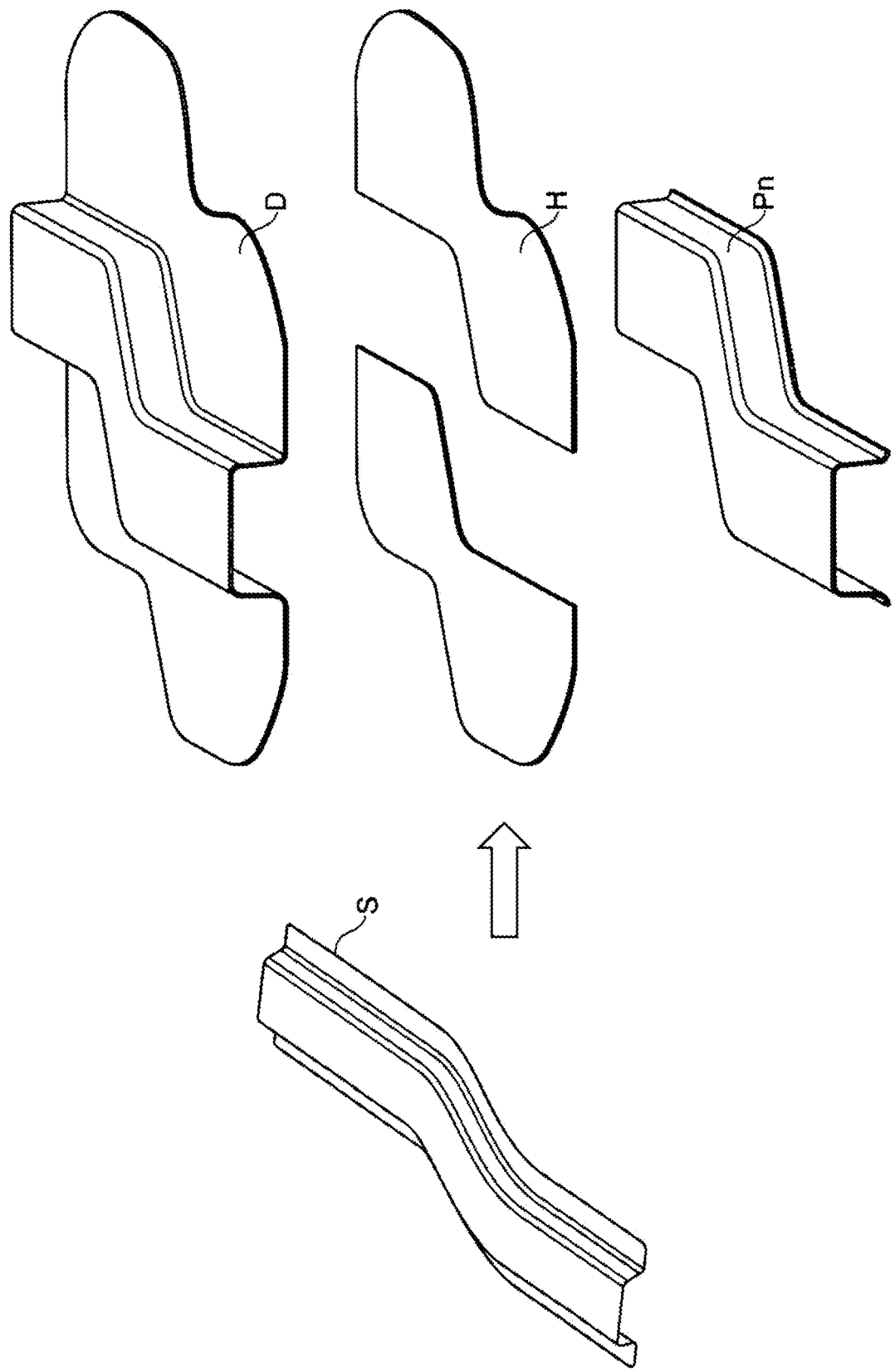
FIG. 45 is a drawing for describing an example of a press die shape created from a pressed product as a first application sample.
Figure 75:
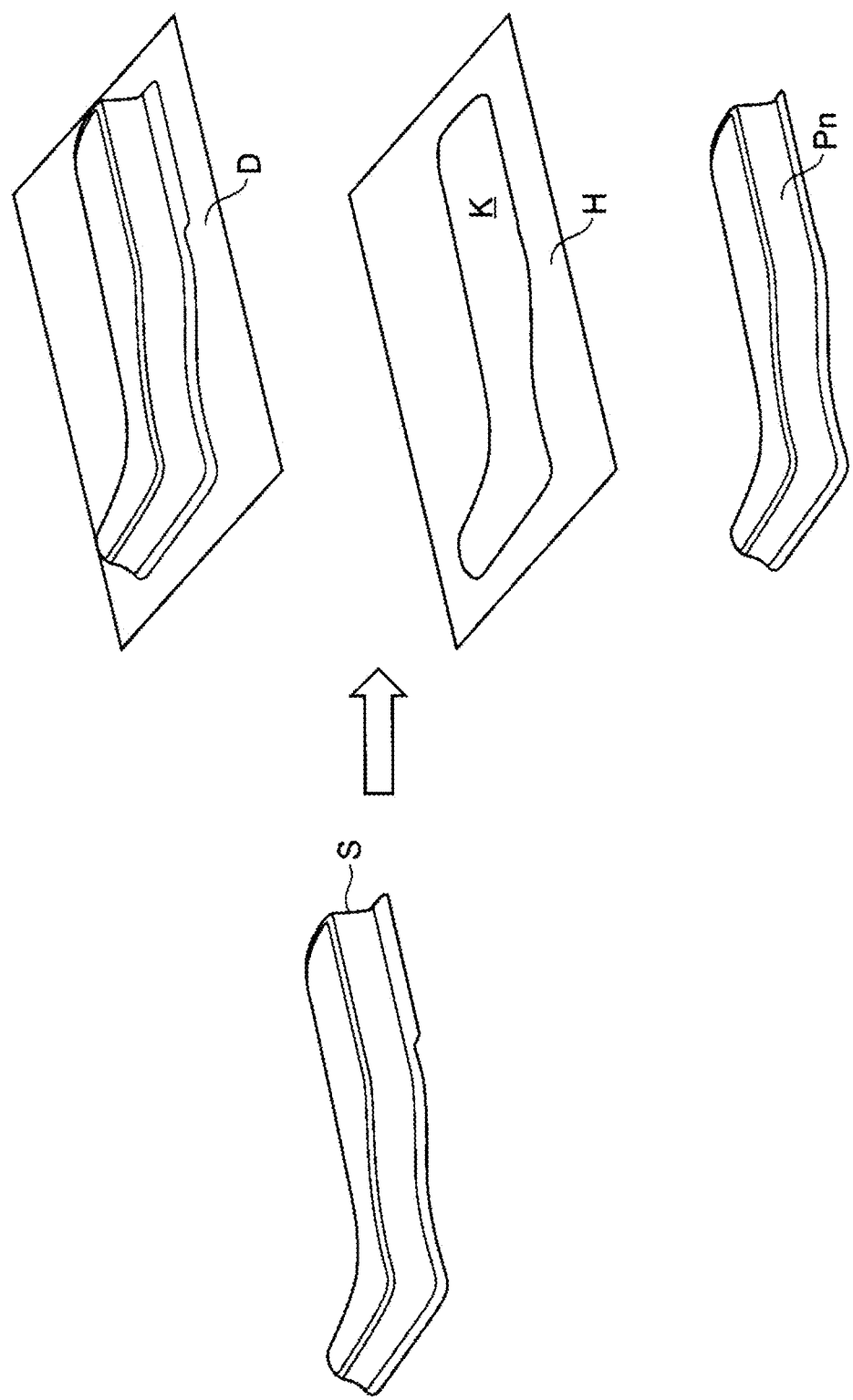
FIG. 75 is a drawing for describing an example of a press die shape created from a pressed product as a second application sample.

Accordingly, the press die model data DT300, the press model data DT400 and the pressing condition, which are used for a press forming simulation of the intended product S may have been created automatically. In the case of the first or the second application example, as illustrated in FIG. 45, FIG. 75, it is possible to create the die D, the blank holder H and the Punch Pn which configure the press die, from the product S.

With referring to FIG. 26 to FIG. 43, each of the above mentioned Step S2 to S4 and S6 will be hereinafter described.

(3-1) Searching Method of Part Processing Method Data

Figure 26:
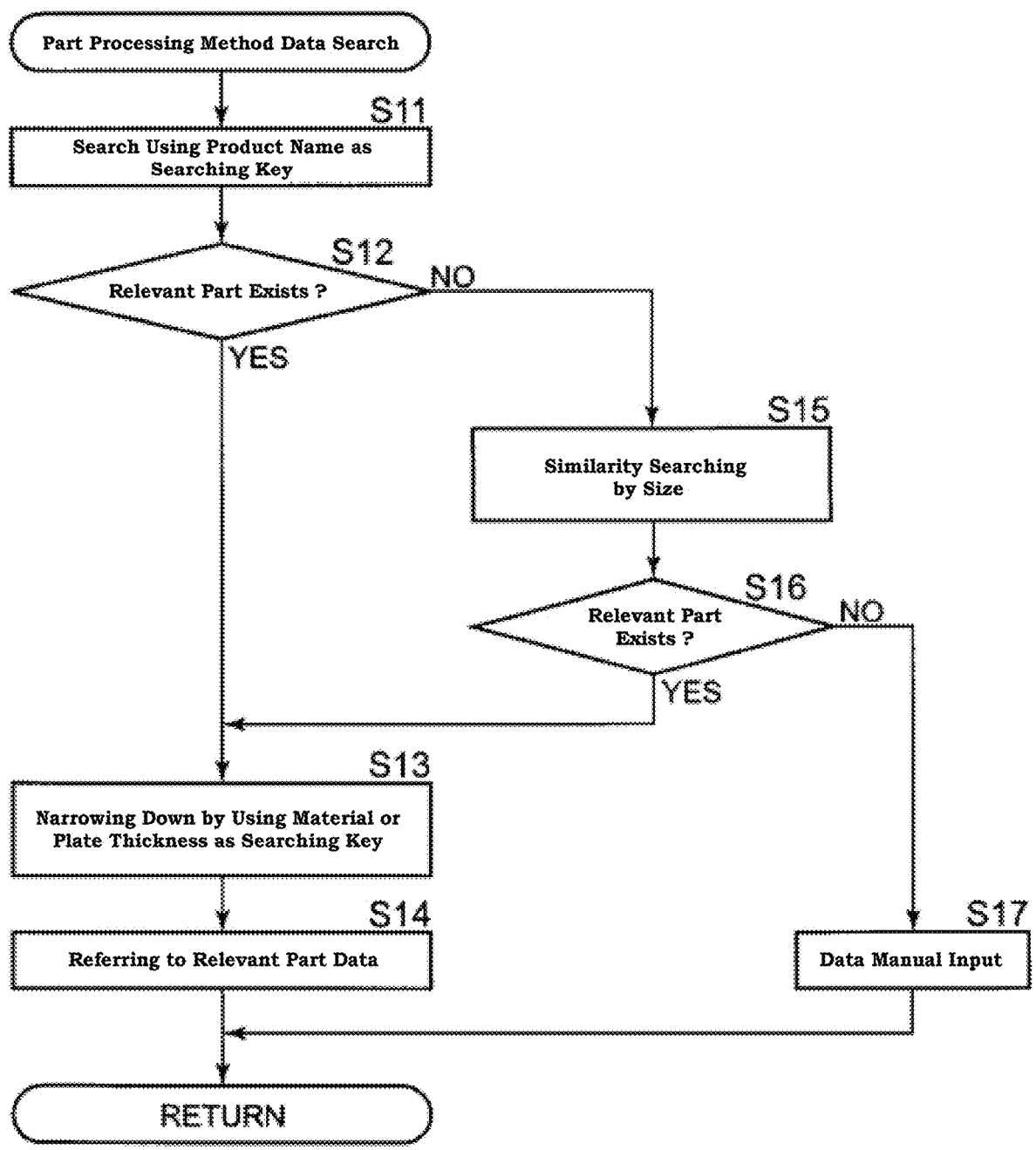
FIG. 26 is a flowchart for illustrating a method for searching a part processing method data.

Next, according to a flowchart of the FIG. 26, the search of the part processing method data (Step S2) which is a subroutine of the above mentioned flowchart will be described.

At first, the search is performed with using a part name which is the same as the product or a part name relating to the product as a searching key in the registered key of the part processing method data DT200.

Next, it is judged if a relevant part exists or not (Step S12).

In Step S12, if it is judged such that a relevant part exists, narrowing down from the relevant part is performed with using a material or a thickness which is the same as or similar to that of the product as a searching key in the registered key of the part processing method data DT200.

Finally, using the narrowed down relevant part as a referencing part, and the part processing method data DT200 relating to the referencing part are referred to (Step S14), and then, this subroutine is finished.

On the contrary, in Step S12, if it is judged such that a relevant part does not exist, a similarity searching by a size of the product is performed (Step S15).

Next, it is judged if a relevant part exists or not (Step S16).

In Step S16, if it is judged such that a relevant part exists, it moves to the above mentioned Step 13. On the contrary, in Step S16, if it is judged such that a relevant part does not exist, a predetermined part processing method data DT200 is manually input with using the input apparatus 13, and then this subroutine is finished.

Accordingly, the part processing method data DT200 which is necessary at creating the press model data DT300 of the product at the next Step S3 may have been obtained.

(3-2) Process Model Data Creation Method

Figure 27:
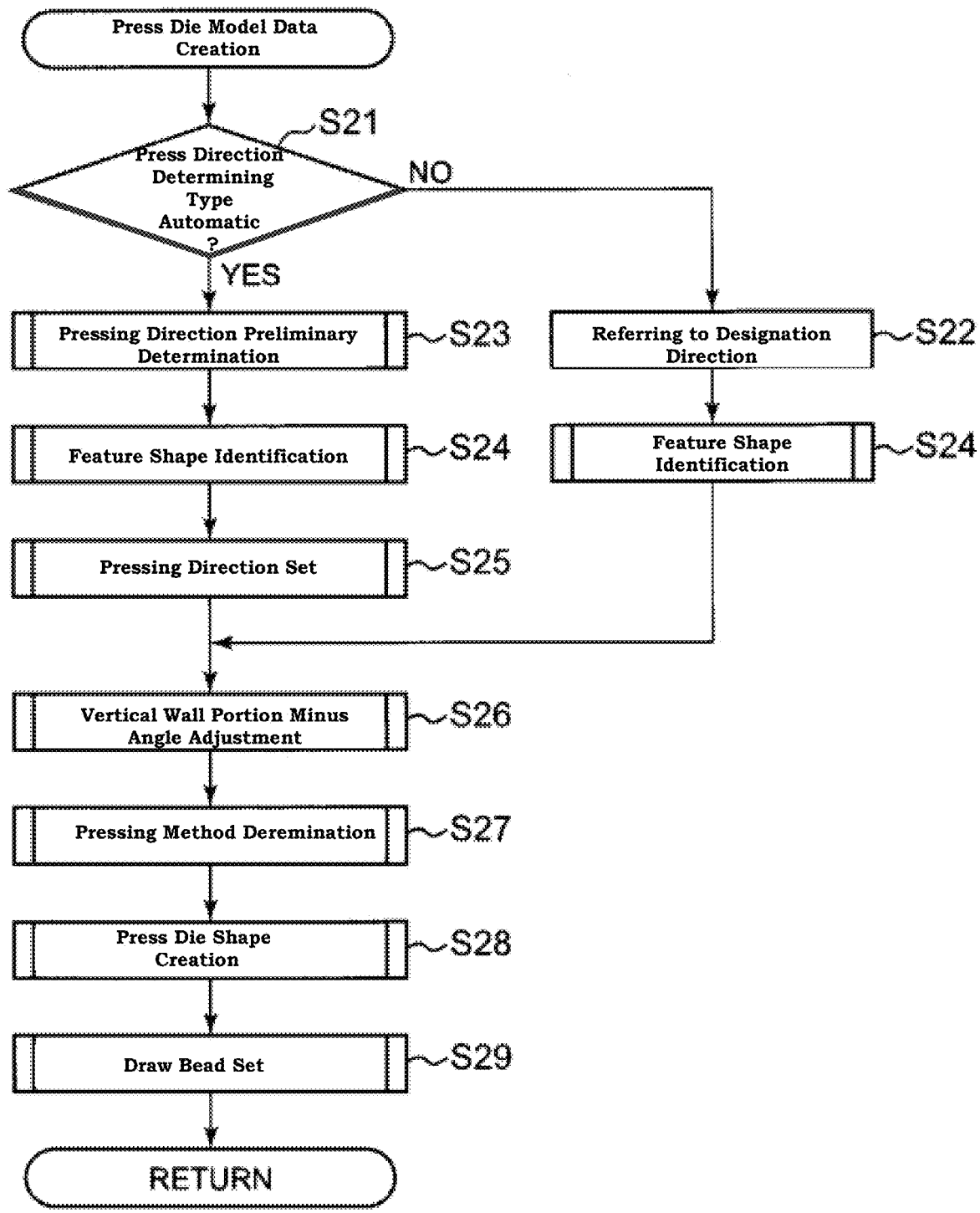
FIG. 27 is a flowchart for illustrating a method for creating a press die model data.

Next, according to a flow char of the FIG. 27, the process model data creation method (Step S3) which is a subroutine of the flowchart of FIG. 27 will be described.

At first, relating to the part processing method data DT200 to which is referred, it is judged if the press direction determining type is an automatic type or not (Step S21).

In Step S21, if it is judged such that the press direction determining type is not the automatic type, a pressing direction setting in the part processing method data is referred to (Step S22).

Next, the feature shape of the product S is identified based on the press direction (Step S24), and then it moves to Step 26 which will be described later.

On the contrary, in Step S21, if it is judged such that the press direction determining type is the automatic type, the pressing direction is preliminarily determined (Step S23).

Next, the feature shape of the product is identified based on the pressing direction determined preliminarily (Step S25).

Next, the pressing direction is set based on the identified feature shape of the product (Step S5).

Next, if the direction of the vertical wall portion becomes a minus angle, the pressing direction is adjusted to prevent the direction of the vertical wall portion from being a minus angle (Step S26).

Next, the pressing method of the product is determined based on the pressing method of the referencing part (Step S27).

Next, the press die shape for forming the product is created according to the determined pressing method and the press die shape type of the referencing part (Step S28).

Finally, the draw bead is set to created press die shape (Step S29).

Accordingly, the press die model data DT300 of the product may have been created automatically.

(3-2-1) Pressing Direction Preliminarily Determining Method

Figure 28:
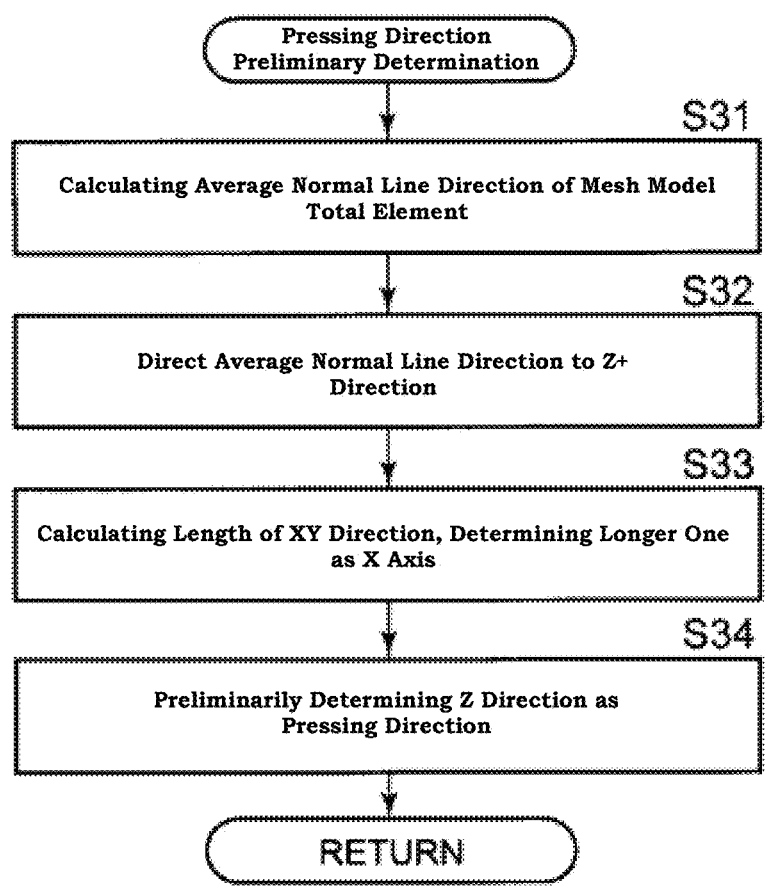
FIG. 28 is a flowchart for illustrating a method for preliminarily determining a pressing direction.

Next, with referring to FIG. 46 relating to the first application sample, the pressing direction preliminary determination (Step S23) which is a subroutine of the flowchart of FIG. 27 will be described according to the flowchart of FIG. 28.

At first, as illustrated in FIG. 46 (*a*), the mesh model is created from the product shape data, and then the average normal line direction Na of all of the elements which configure the mesh model is calculated (Step S31).

Next, as illustrated in FIG. 46 (*b*), the calculated average normal line direction Na is directed to the Z+ direction of the XYZ coordinate system by coordinate conversion (Step S32).

Next, as illustrated in FIG. 46 (*c*), the length of the product in the X,Y directions $X_{Len}$, $Y_{Len}$ are calculated, and the longer one is directed to the x axis direction (Step S32).

Finally, the Z− direction is preliminarily determined as the pressing direction (Step S34).

Accordingly, the pressing direction may have been preliminarily determined from the product shape data.

(3-2-2) Feature Shape Identifying Method

Figure 29:
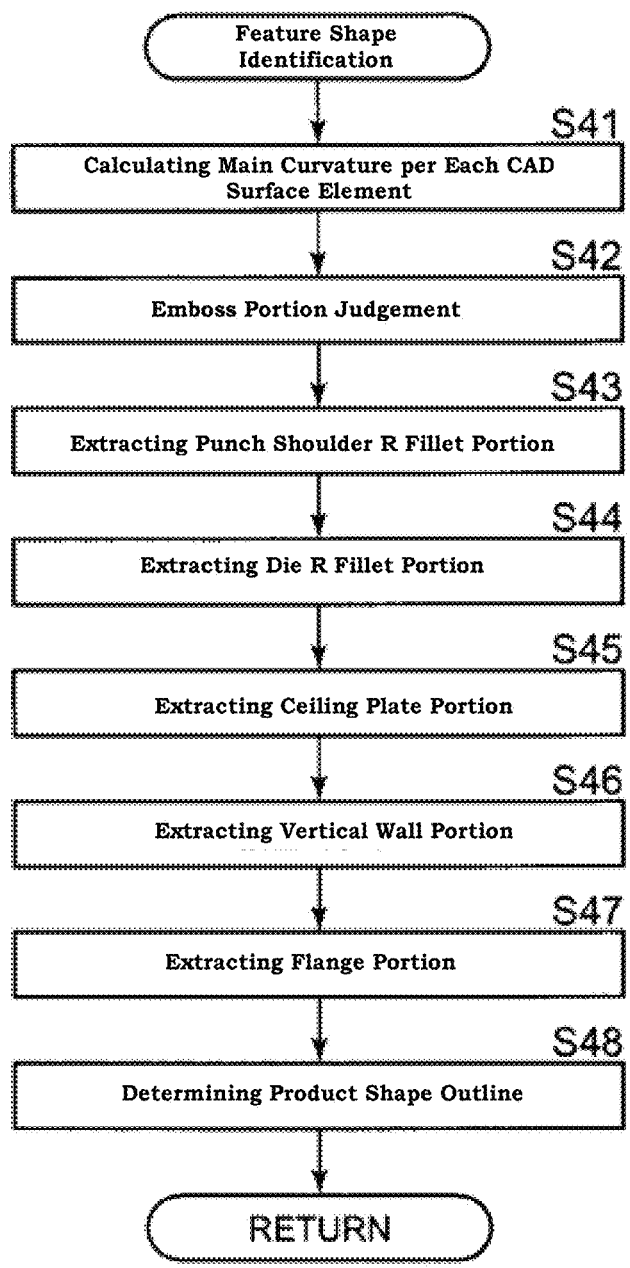
FIG. 29 is a flowchart for illustrating a method for identifying a feature shape.

Next, with referring to FIG. 47 to FIG. 54 relating to the first application sample, the feature shape identification (Step S5) which is a subroutine of the flowchart of FIG. 27 will be described according to the flowchart of FIG. 29.

Figure 47:
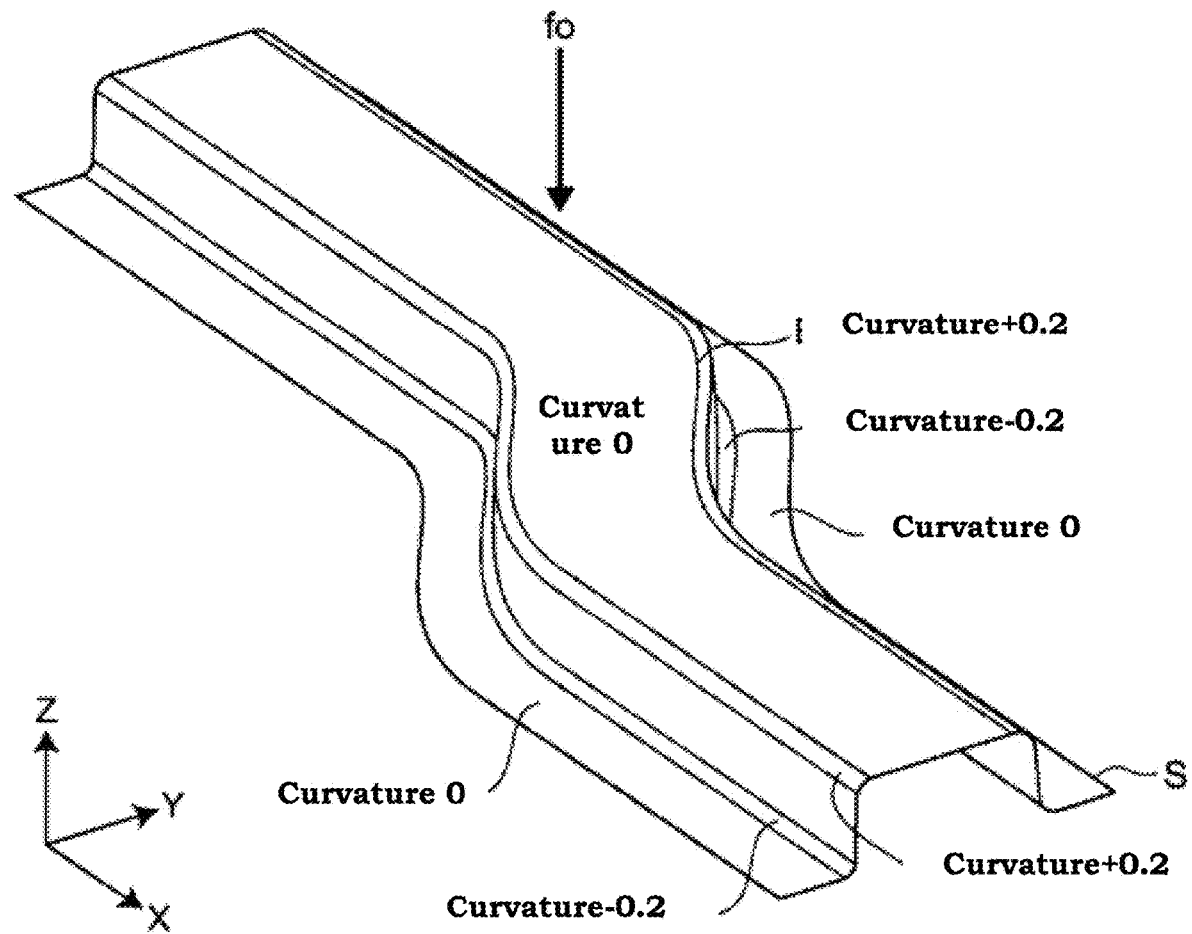
FIG. 47 is a drawing for describing an identification of a feature point of a first application sample (1).
Figure 49:
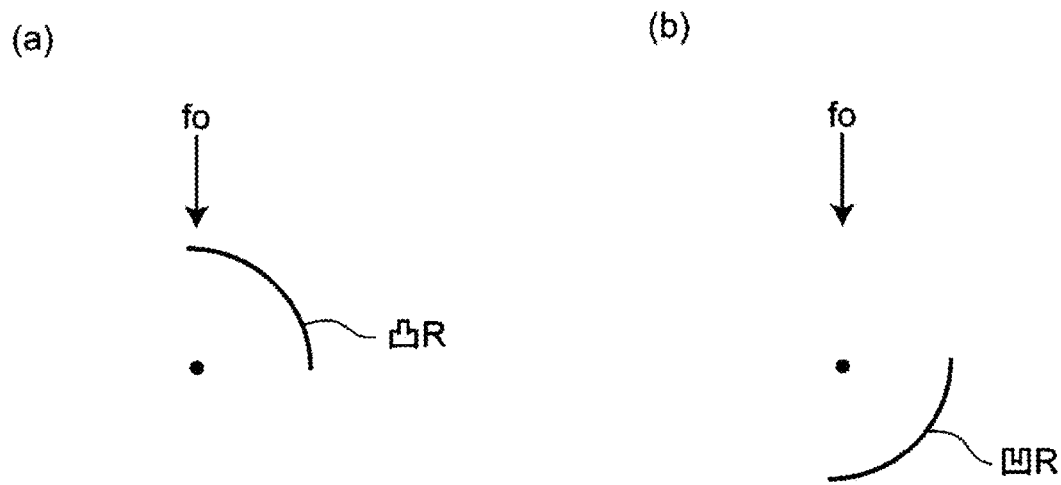
FIG. 49 is a drawing for describing an identification of a feature point of a first application sample (3).

At first, as illustrated in FIG. 47, the main curvature is calculated with respect to each element of the CAD surface which configures the product shape data (Step S41). At this moment, as illustrated in FIG. 49 (*a*), it is judged such that the element whose main curvature is plus has a convex corner portion seen from the preliminary pressing direction $f_0$, and as illustrated in FIG. 49 (*b*), the element whose main curvature is minus has a concave corner portion seen from the preliminary pressing direction $f_0$.

Figure 48:
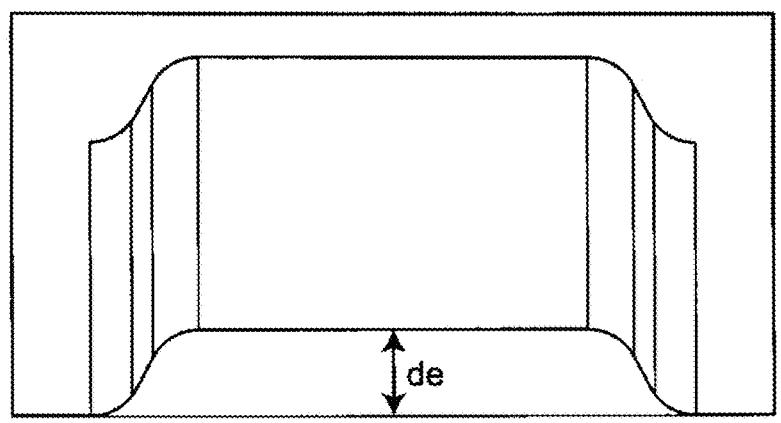
FIG. 48 is a drawing for describing an identification of a feature point of a first application sample (2).

Next, as illustrated in FIG. 48, it is judged if the emboss portion E of the product S exists or not (Step S42). If the fillet portions having the main curvature of both plus and minus are within the range of a judgement value de of the emboss depth, it is judged such that a portion surrounded by the fillet portions is the emboss portion E. The portion judged as the emboss portion E is not subject to the extraction process of the punch shoulder R fillet portion $R_p$ and the die R fillet portion Rd in the following steps.

Figure 50:
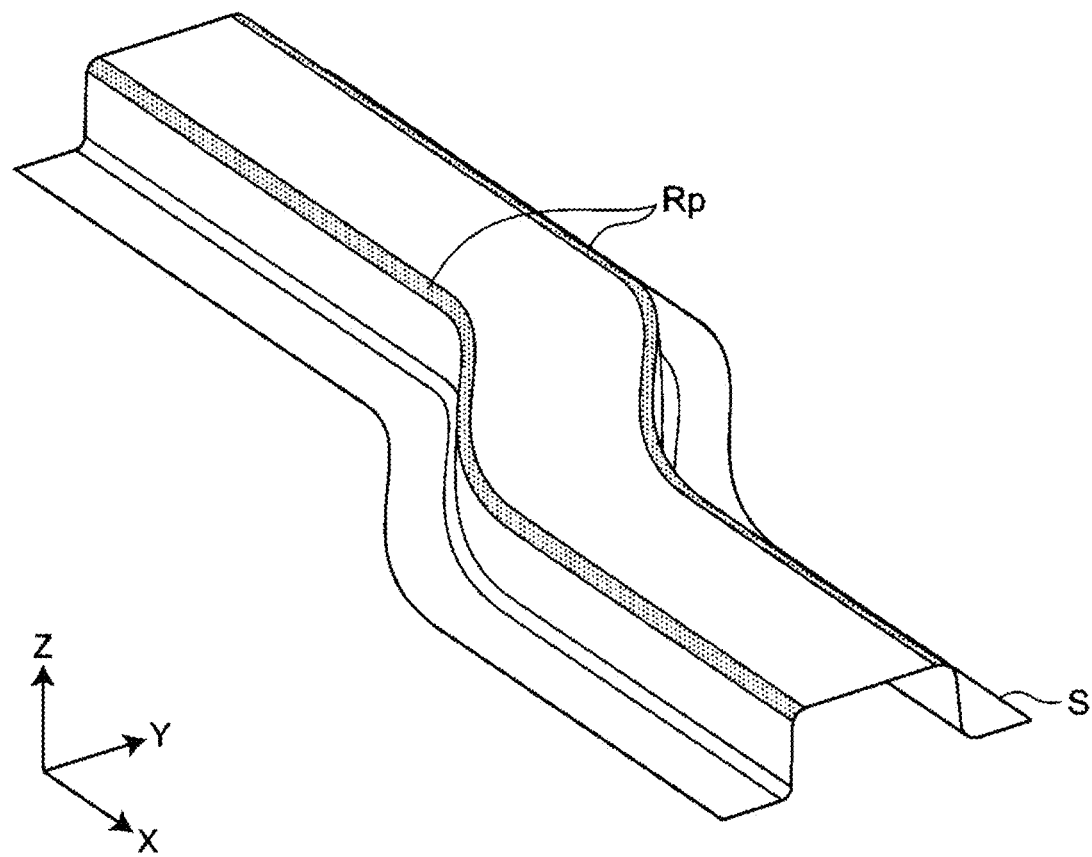
FIG. 50 is a drawing for describing an identification of a feature point of a first application sample (4).

Next as illustrated in FIG. 50, the elements having the calculated main curvature which is within the range of a punch shoulder R judgement allowable value of the feature shape identification judging parameter of the part processing method data DT200 is extracted as the punch shoulder R fillet portion Rp (Step S43).

Figure 51:
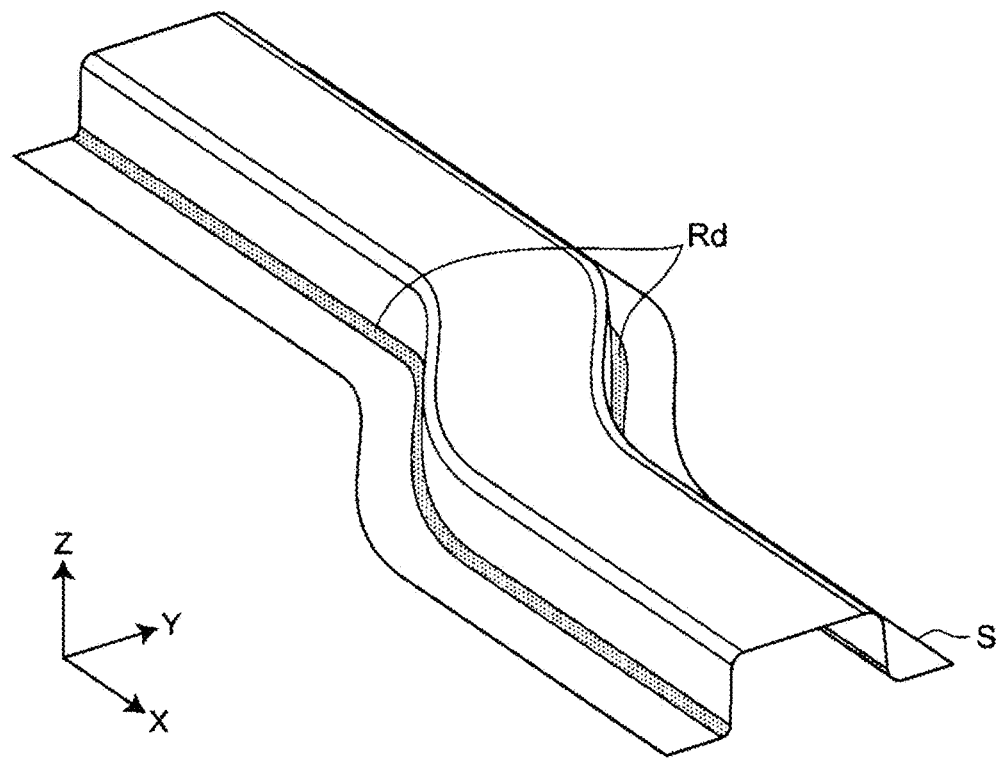
FIG. 51 is a drawing for describing an identification of a feature point of a first application sample (5).

Next, as illustrated in FIG. 51, the elements having the calculated main curvature which is within the range of a Die R judgement allowable value of the feature shape identification judging parameter of the part processing method data DT200 is extracted as the die R fillet portion Rd (Step S44).

Figure 52:
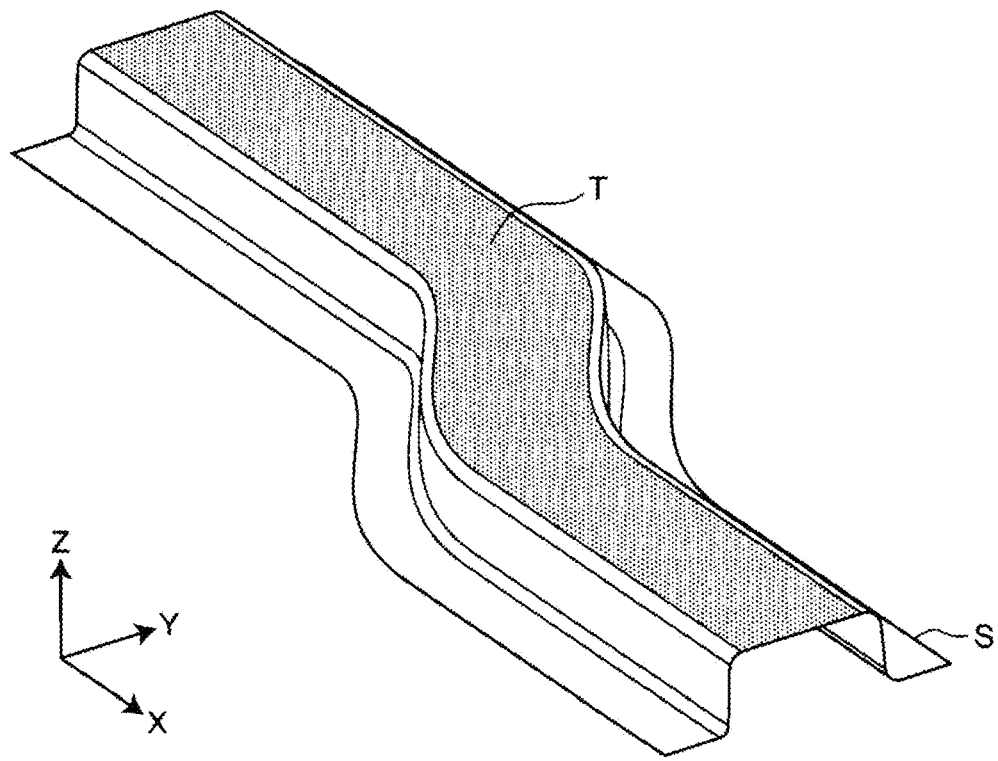
FIG. 52 is a drawing for describing an identification of a feature point of a first application sample (6).

Next, as illustrated in FIG. 52, the element positioned between punch shoulder R fillet portions Rp is extracted as the ceiling plate portion T (Step S45).

Figure 53:
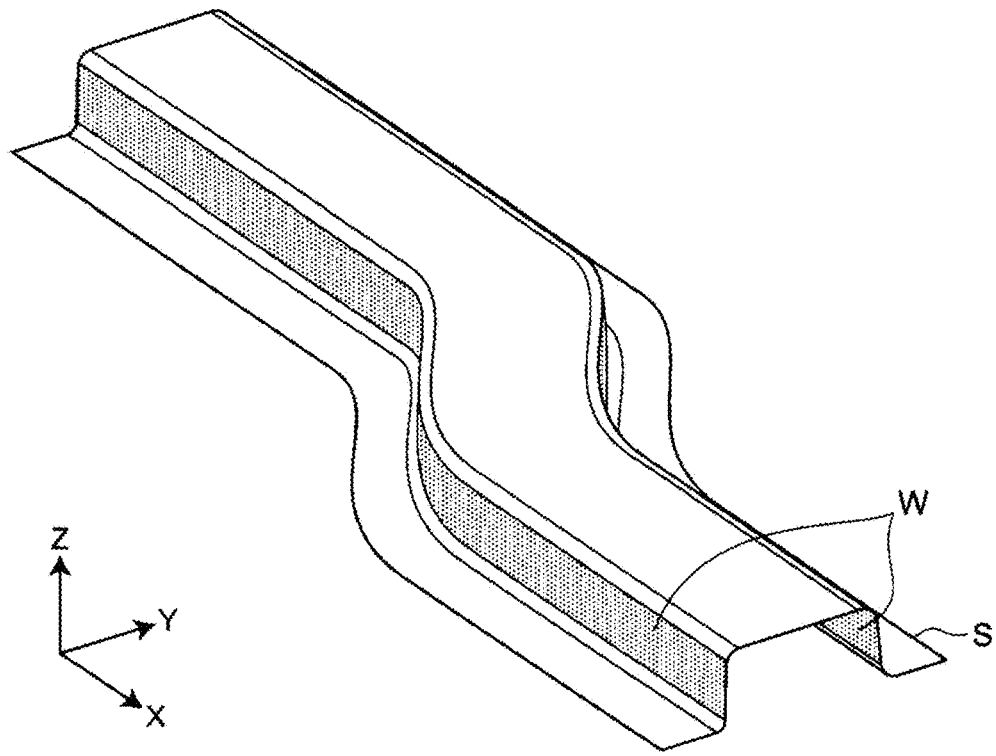
FIG. 53 is a drawing for describing an identification of a feature point of a first application sample (7).

Next, as illustrated in FIG. 53, the element positioned between punch shoulder R fillet portion Rp and the die R fillet portion Rd is extracted as the vertical wall portion W (Step S46).

Figure 54:
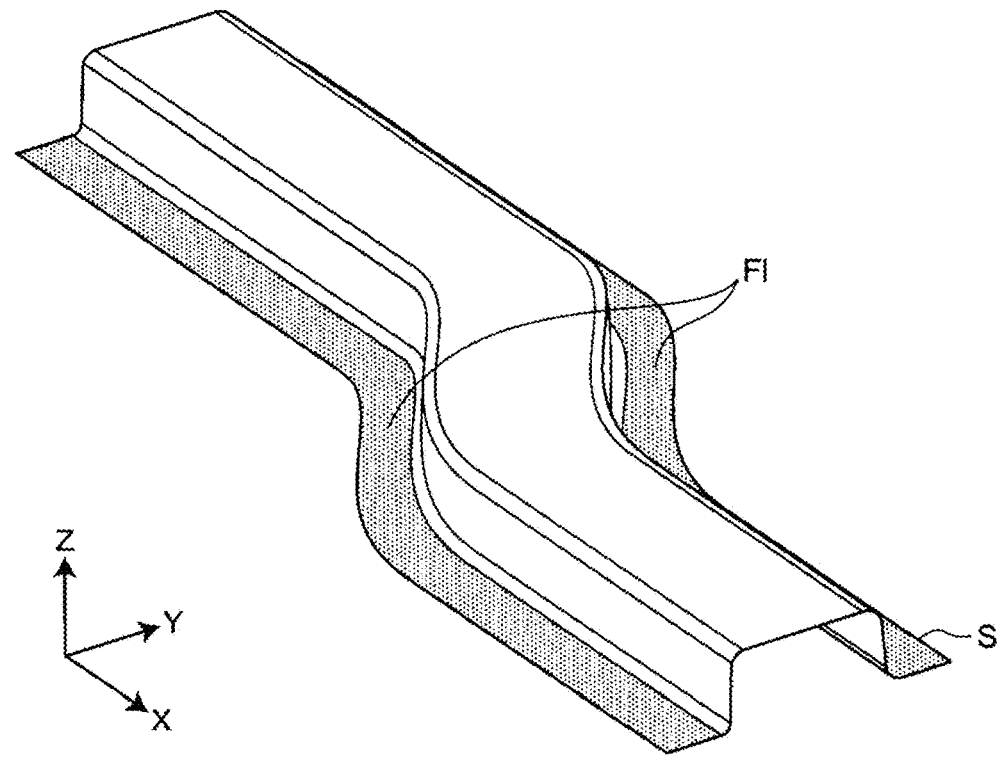
FIG. 54 is a drawing for describing an identification of a feature point of a first application sample (8).
Figure 55:
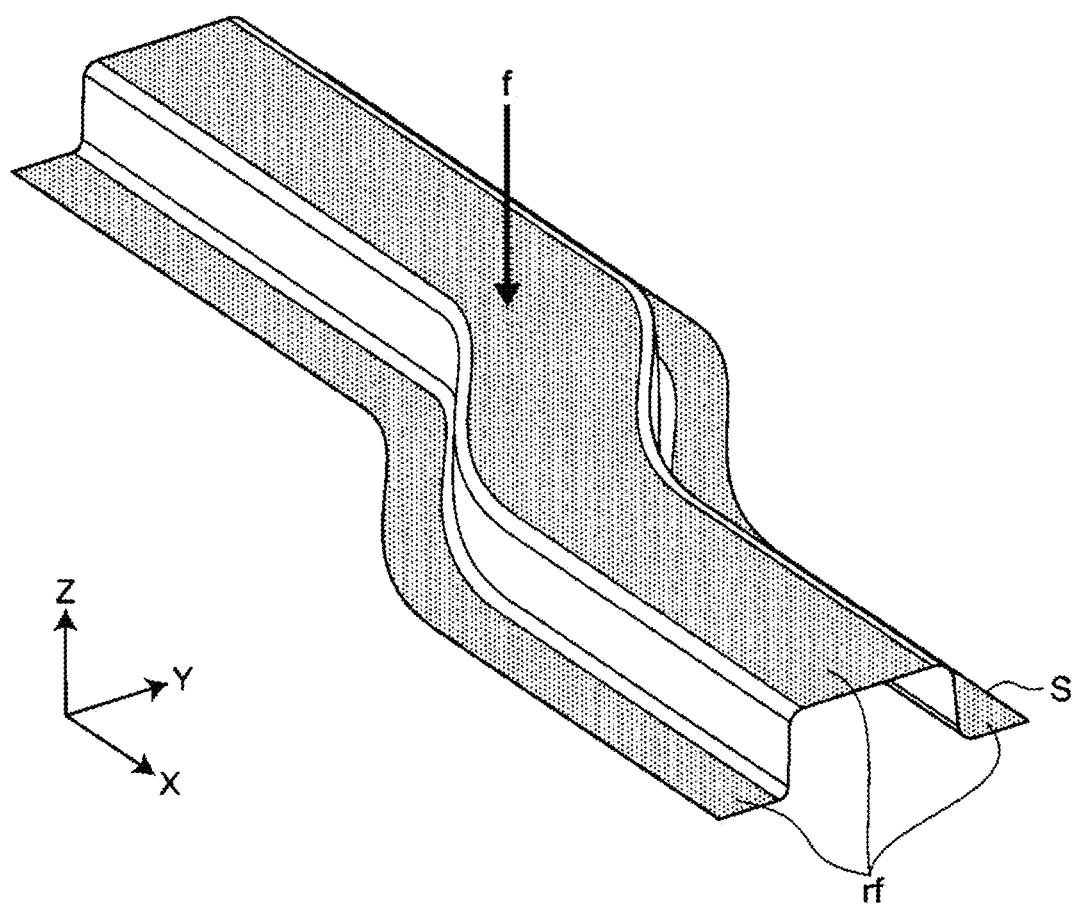
FIG. 55 is a drawing for describing a setting of a pressing direction of a first application sample.

Next, as illustrated in FIG. 54, the element positioned at the opposite side of vertical wall portion W to the die R fillet portion Rd is extracted as the flange portion Fl (Step S47).

Figure 56:
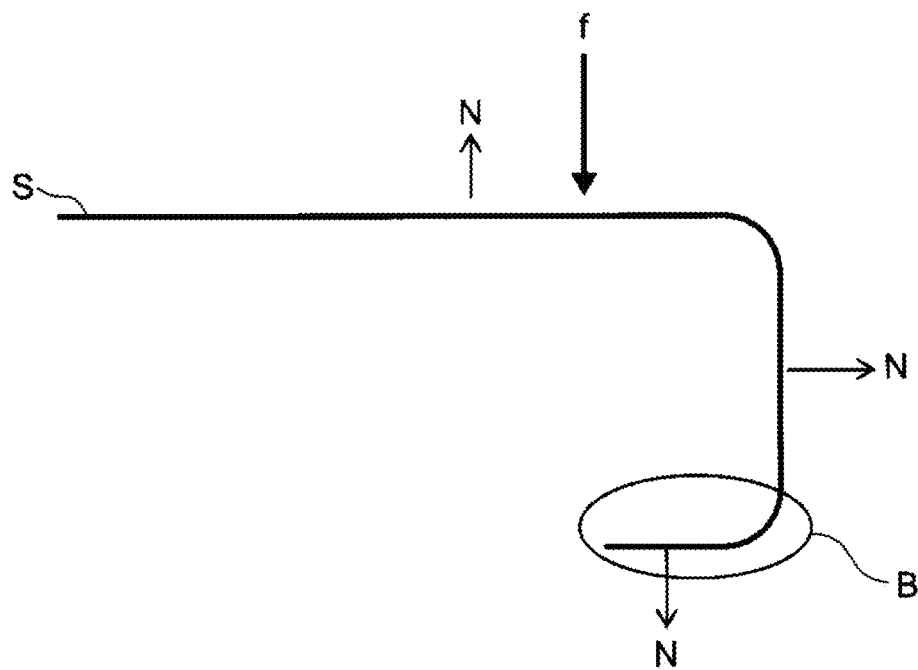
FIG. 56 is a drawing for describing an omission of a bent portion of a first application sample.

Finally, as illustrated in FIG. 56, the product shape outline $OL_s$ is determined with excluding the vending portion B (Step S48).

Accordingly, the feature shape of the products may have been identified automatically.

(3-2-3) Pressing Direction Setting Method

Figure 30:
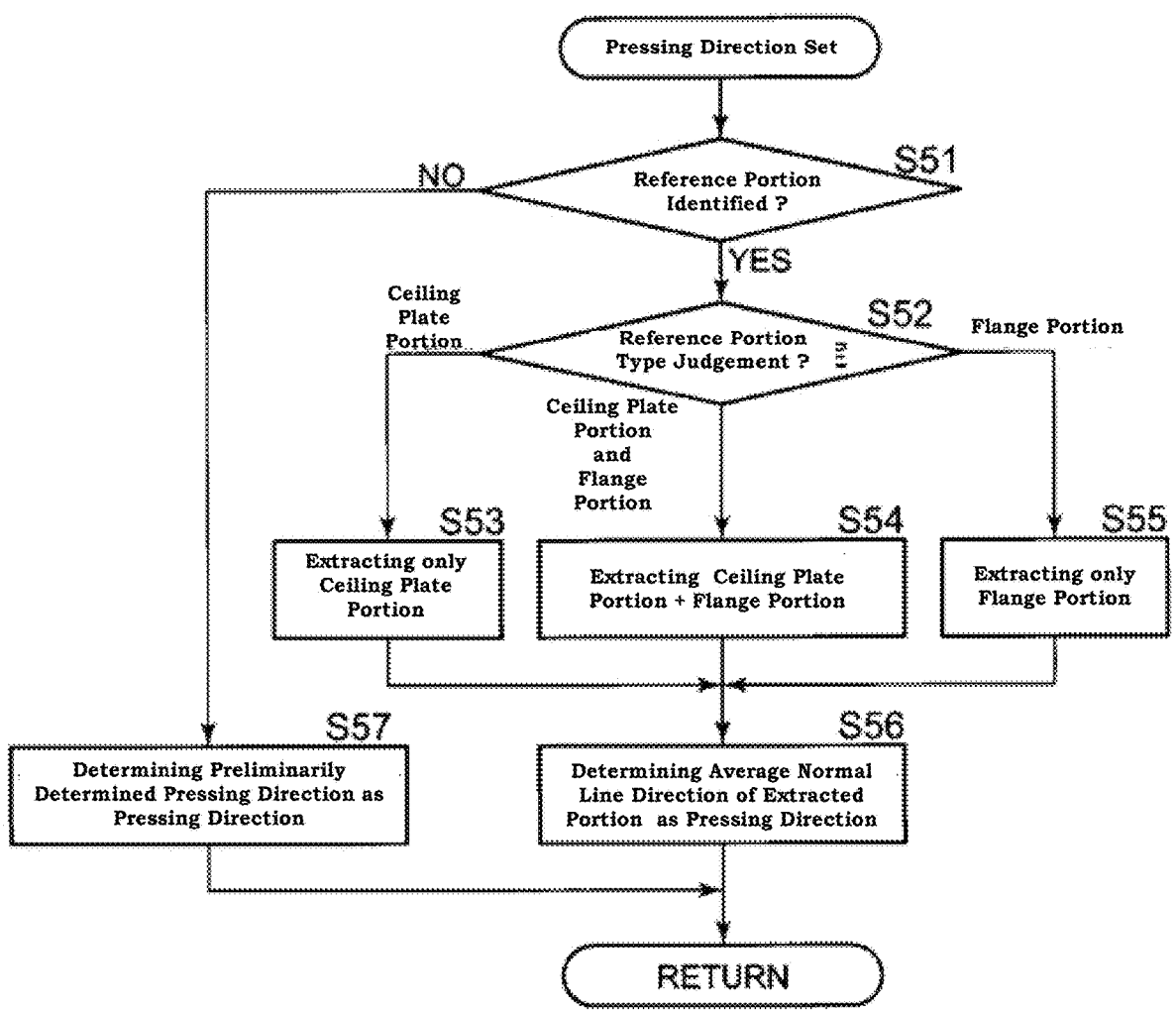
FIG. 30 is a flowchart for illustrating a method for setting a pressing direction.

Next, the pressing direction setting (Step S25) which is a subroutine of the flowchart of FIG. 27 will be described according to the flowchart of FIG. 30.

At first, based on the reference portion of the feature shape identification judging parameter of the part processing method data DT200, it is judged if the reference type for setting the pressing direction is identified or not (Step S51).

In Step S51, if it is judged such that the reference portion is identified, the reference type is judged (Step S52).

In Step S52, if it is judged such that the reference portion type is the ceiling plate portion T, only the ceiling plate portion T of the product S is extracted (Step S53).

In Step S52, if it is judged such that the reference portion type is the ceiling plate portion T and the flange type portion Fl, the ceiling plate portion T and the flange portion Fl of the product S are extracted (Step S 54).

In Step S52, it is judged such that the reference portion type is the flange type portion Fl, only the flange portion of the product is extracted (Step S55).

Finally, the average normal line direction of the extracted part of the products S is calculated, and the calculated average normal line direction is set as the pressing direction f (Step S57).

On the contrary, in Step S51, it is judged such that the referencing part is not referred to, the pressing direction which is preliminarily determined is determined as the pressing direction f (Step S57).

Accordingly, the pressing direction may have been set automatically.

(3-2-4) Vertical Wall Portion Minus Angle Adjusting Method

Figure 31:
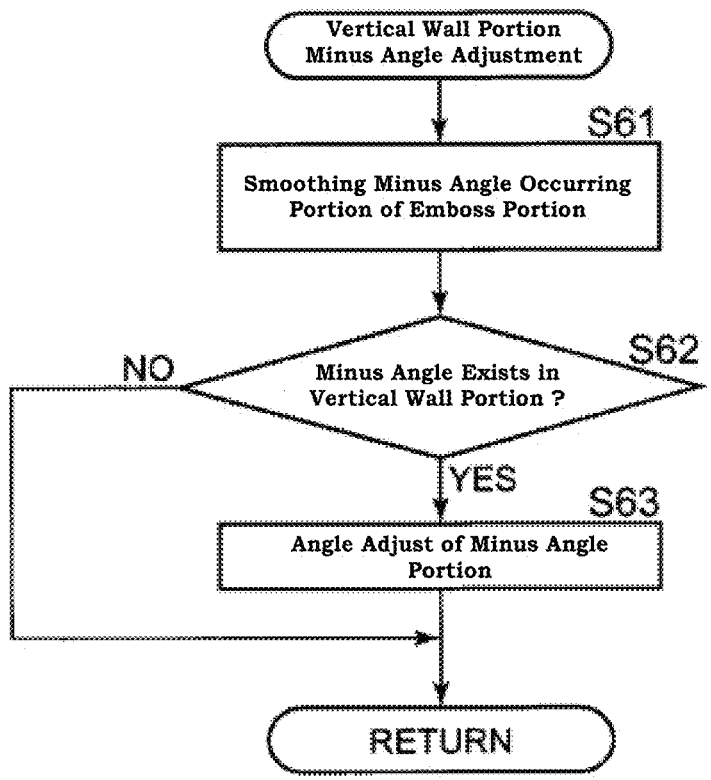
FIG. 31 is a flowchart for illustrating a method for adjusting a minus angle of a vertical wall portion.

Next, the vertical wall portion minus angle adjustment (Step S26) which is a subroutine of the flowchart of FIG. 27 will be described according to the flowchart of FIG. 31.

At first, if the emboss portion exists, the minus angle occurring portion C of the emboss portion is smoothed (Step S61).

Next, it is judged if the minus angle occurring portion C in which the surface direction of the vertical wall portion W to the pressing direction f becomes a minus angle exists or not (Step S62).

Figure 57:
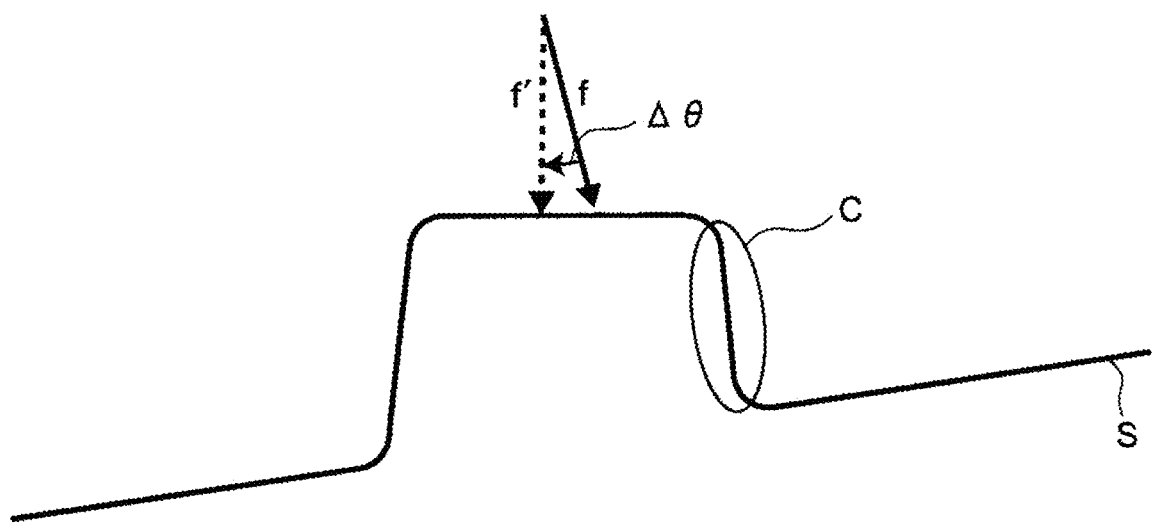
FIG. 57 is a drawing for describing an adjustment of a minus angle of a vertical wall portion of a first application sample.

Next, in Step S62, if it is judged such that the minus angle occurring portion C exists, as illustrated in FIG. 57, the pressing direction f created by tilting the pressing direction f by an adjusting angle $\Delta\theta$ is set as the pressing direction of this press forming (Step S63).

Accordingly, the minus angle of the vertical wall portion may have been adjusted.

(3-2-5) Pressing Method Determining Method

Figure 32:
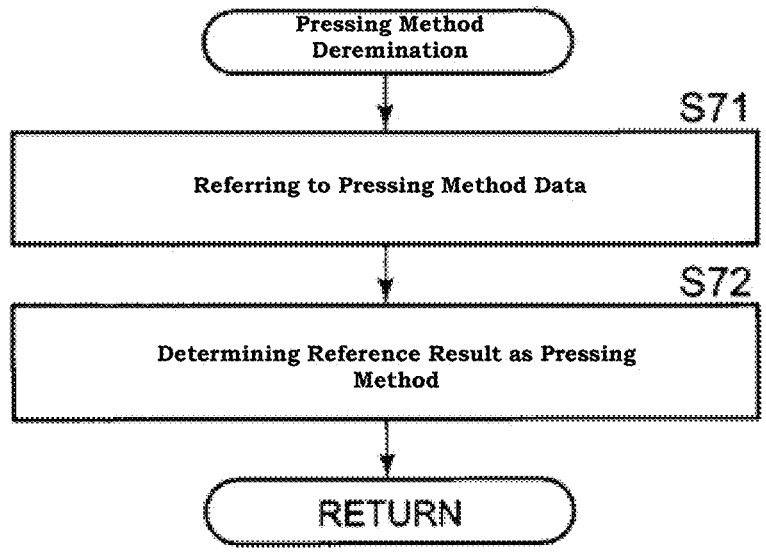
FIG. 32 is a flowchart for illustrating a method for determining a pressing process.

Next, the pressing method determination (Step S27) which is a subroutine of the flowchart of FIG. 27 will be described according to the flowchart of FIG. 32.

At first, data of the pressing method type and with/without pad in the pressing method data DT204 relating to the referencing part stored in the part processing method data storing portion 12C is referred to (Step S71).

Finally, the pressing method type and with/without pad relating to the referencing part is determined as the pressing method of the product S (Step S72). For example, if the pressing method of the referencing part is the forming (bending) without a pad, the pressing method of the product S is also judged as the forming (bending) without a pad.

Accordingly, the pressing method of the product may have been determined automatically.

(3-2-6) Press Die Shape Creation Method

Figure 33:
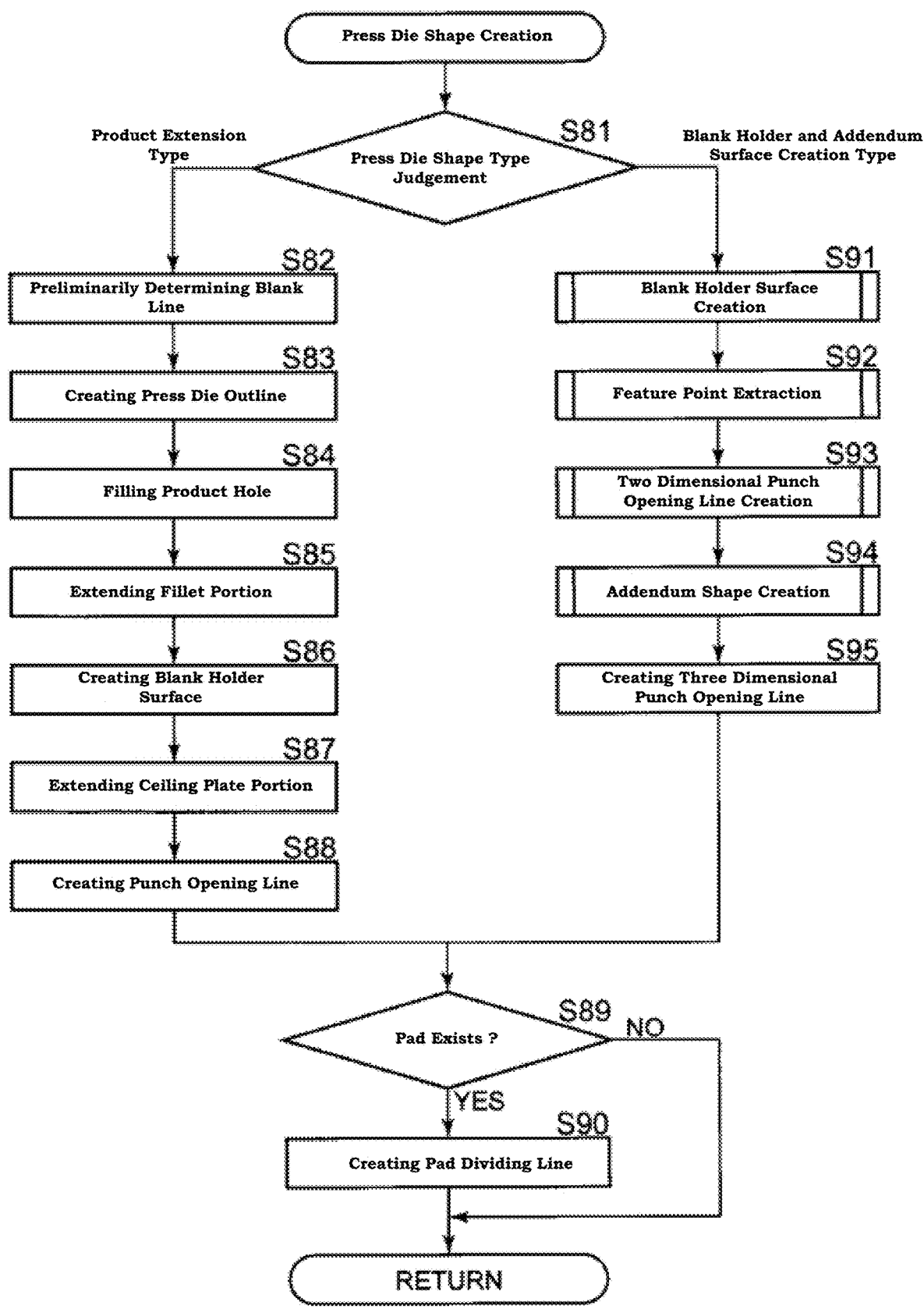
FIG. 33 is a flowchart for illustrating a method for creating a press die shape.

Next, the press die shape creation (Step S28) which is a subroutine of the flowchart of FIG. 27 will be described according to the flowchart of FIG. 33.

At first, it is judged if the press die shape type in the press die shape creation parameter of the referencing part stored in the part processing method data storing portion 12C is the product extension type or the blank holder and addendum surface creation type (Step S81).

Figure 58:
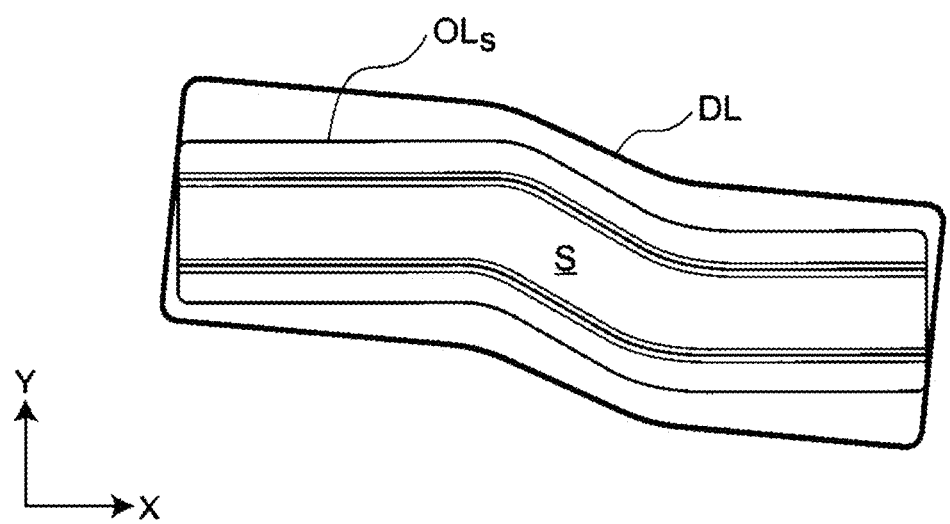
FIG. 58 is a drawing for describing a creation of a press die shape of a first application sample (1).
Figure 59:
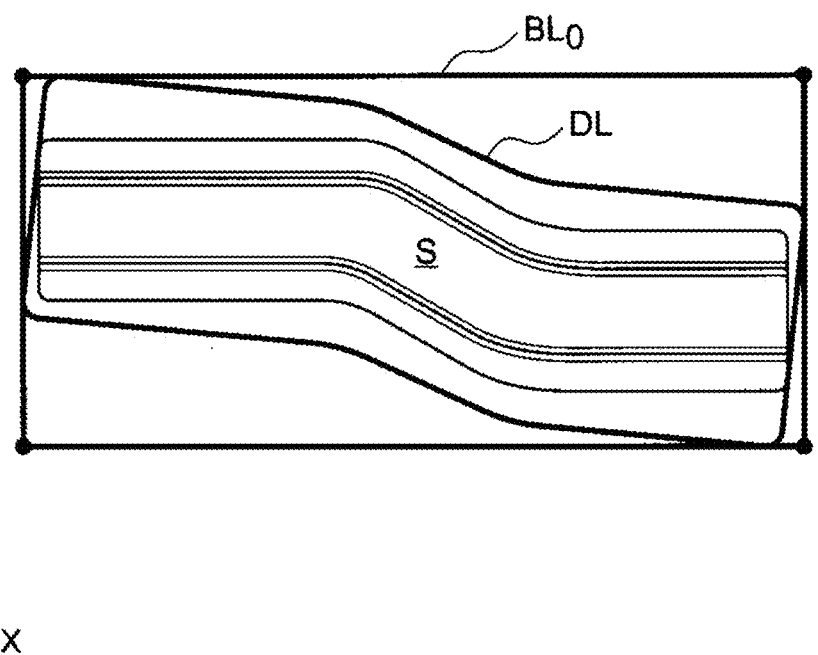
FIG. 59 is a drawing for describing a creation of a press die shape of a first application sample (2).

If a result of the judgement of Step 81 is the product extension type, the blank line $BL_0$ of the product S is preliminarily determined at first (Step S82). As illustrated in FIG. 58, the product extend line DL is created from the product S, then as illustrated in FIG. 59, a rectangular line which outwardly contacts the product extend line DL, and the rectangular line is preliminarily determined as the blank line $BL_0$.

Figure 60:
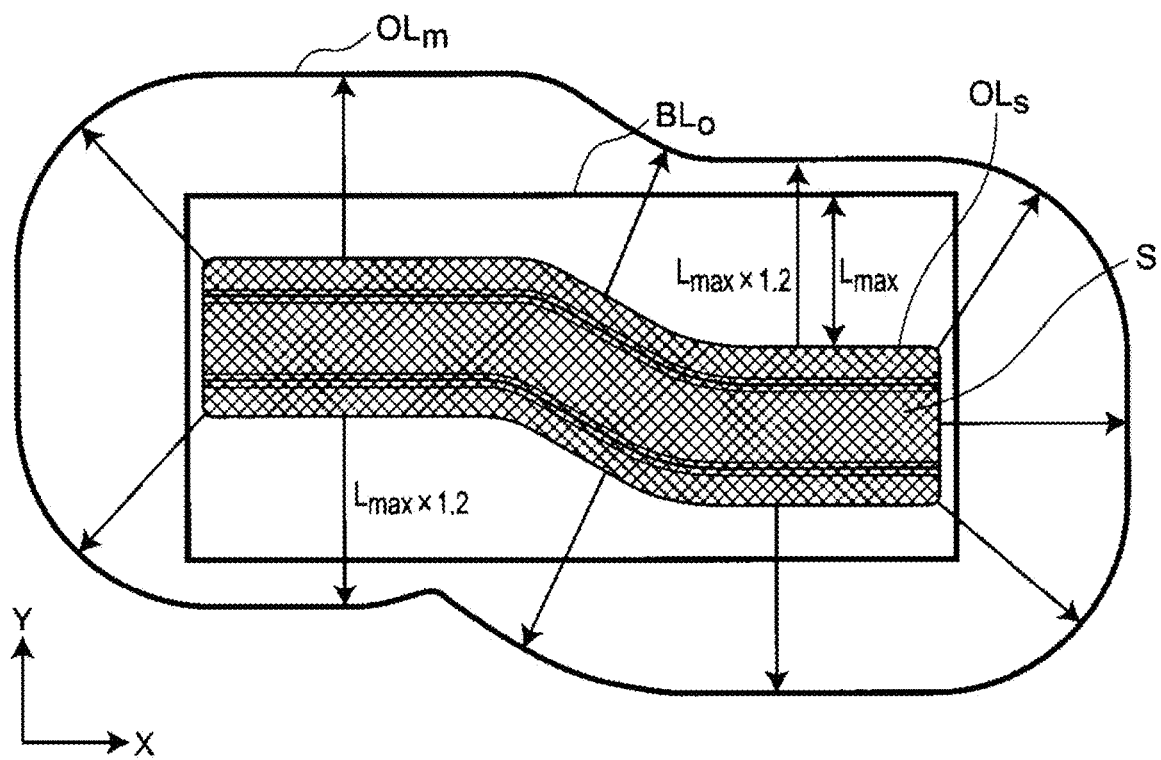
FIG. 60 is a drawing for describing a creation of a press die shape of a first application sample (3).
Figure 61:
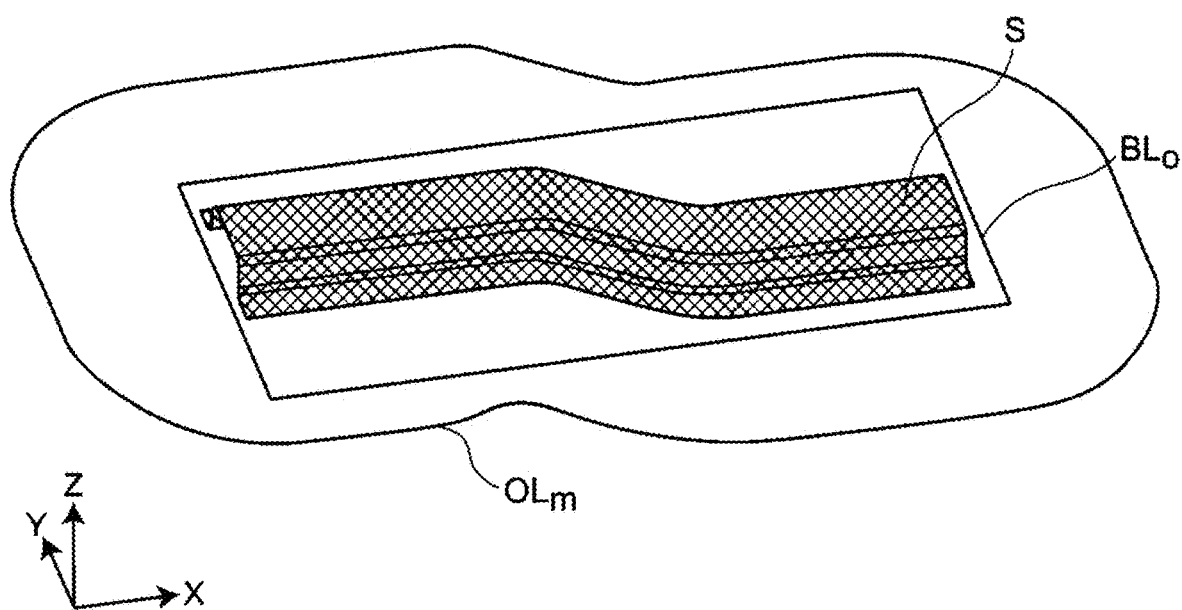
FIG. 61 is a drawing for describing a creation of a press die shape of a first application sample (4).

Next, the press die outline $OL_m$ is created based on the blank line which is determined preliminarily (Step S83). At this moment, as illustrated in FIG. 60, a maximum distance $L_{max}$ between the product shape outline $OL_s$ and the preliminary blank line $Bl_0$ is calculated. For example, the press die outline $OL_m$ is created at the position which is outwardly apart from the product shape outline $OL_s$ by a distance which is 1.2 times of the maximum distance $L_{max}$. Accordingly, as illustrated in FIG. 61, the press die outline $OL_m$ is created as surrounding the product S and the preliminary blank line $BL_0$.

Next, if the product has a hole, this hole is filled (Step S84).

Figure 62:
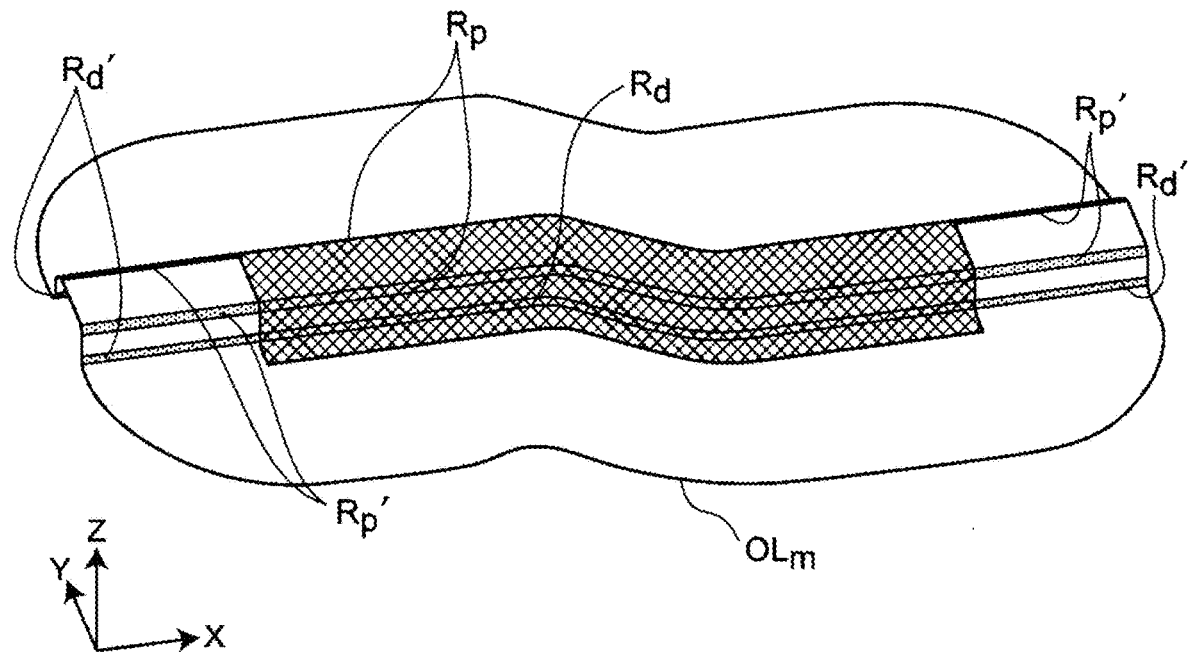
FIG. 62 is a drawing for describing a creation of a press die shape of a first application sample (5).

Next, as illustrated in FIG. 62, the punch shoulder R fillet portion Rp of the product S and the die R fillet portion Rd are extended (Step S85). Extended portion of each fillet portion Rp, Rd is determined as the punch shoulder R fillet extended portion Rp' and a die R fillet extended portion Rd'.

Figure 63:
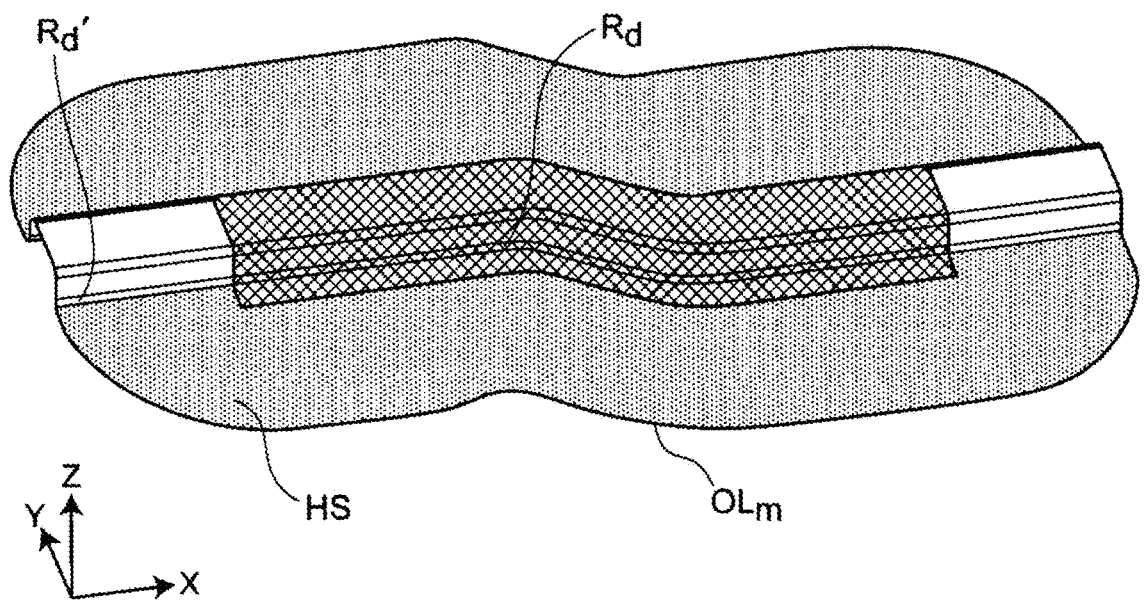
FIG. 63 is a drawing for describing a creation of a press die shape of a first application sample (6).

Next, as illustrated in FIG. 63, a portion surrounded by the die R fillet portion Rd and the extended die R fillet portion Rd', and the press die outline $OL_m$ is determined as the blank holder surface HS (Step S86).

Figure 64:
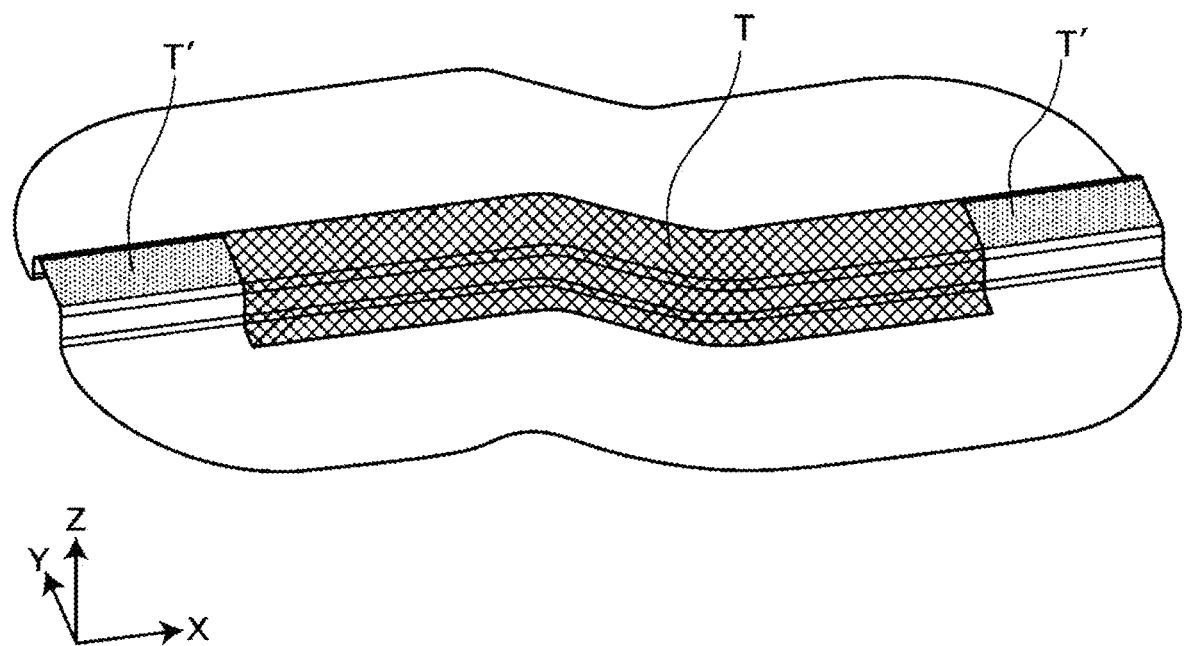
FIG. 64 is a drawing for describing a creation of a press die shape of a first application sample (7).

Next, as illustrated in FIG. 64, the ceiling plate portion T is extended (Step S88). An extended portion of the ceiling plate portion T is determined as the ceiling plate extended portion T'.

Next, as illustrated in FIG. 66, in the case of having the blank holder H, there is created the punch opening line $L_p$ which divides the blank holder H and the punch Pn by the border line between the blank holder surface H, and the fillet portion R and the extended portion thereof (Step S87). As illustrated in FIG. 67 (a), (b), based on the punch opening line $L_p$, the tree dimensional punch opening $L_{p\_3d}$ and the two dimensional punch opening line $L_{p\_2d}$ are created.

Next, it is judged if the pad Pd exists or not (Step S89). If the pad Pd does not exist, this subroutine is finished.

Figure 65:
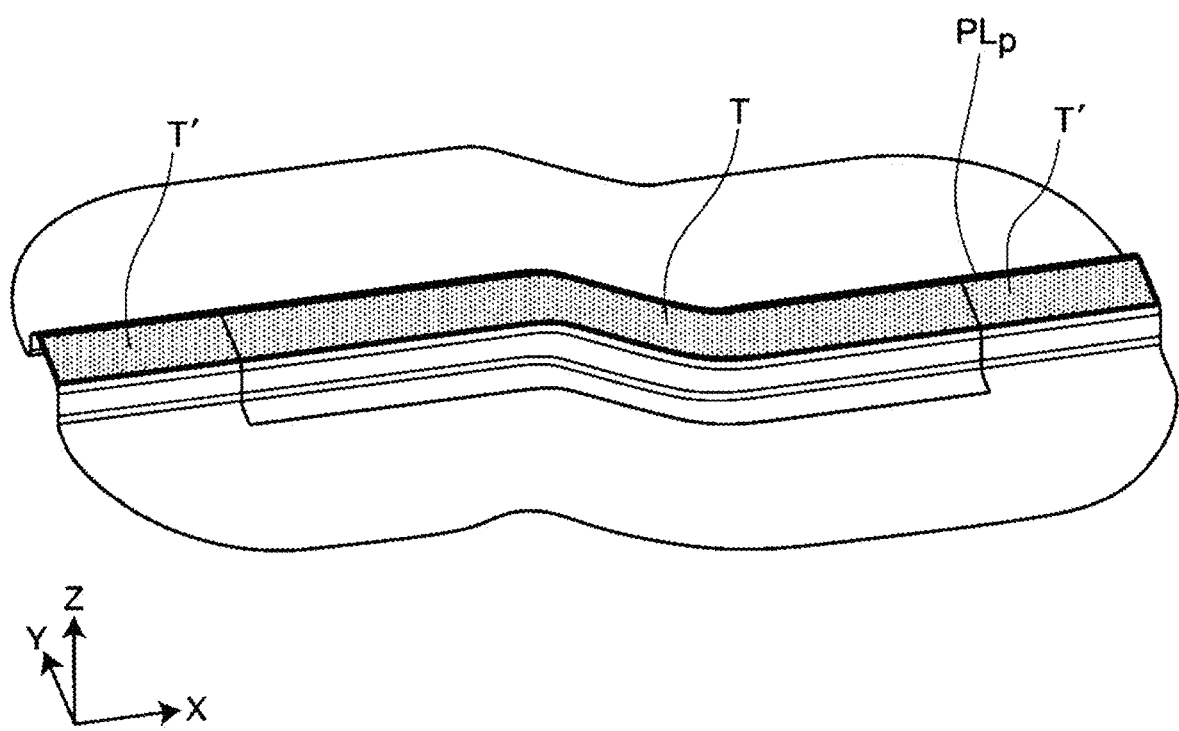
FIG. 65 is a drawing for describing a creation of a press die shape of a first application sample (8).
Figure 68:
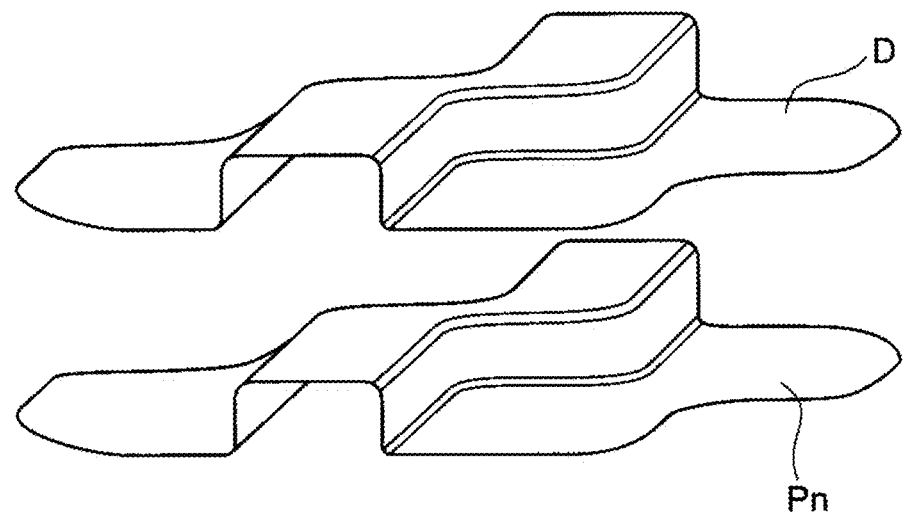
FIG. 68 is a perspective view for illustrating a press die shape of a forming (bending) (without a pad) created in a first application sample.
Figure 69:
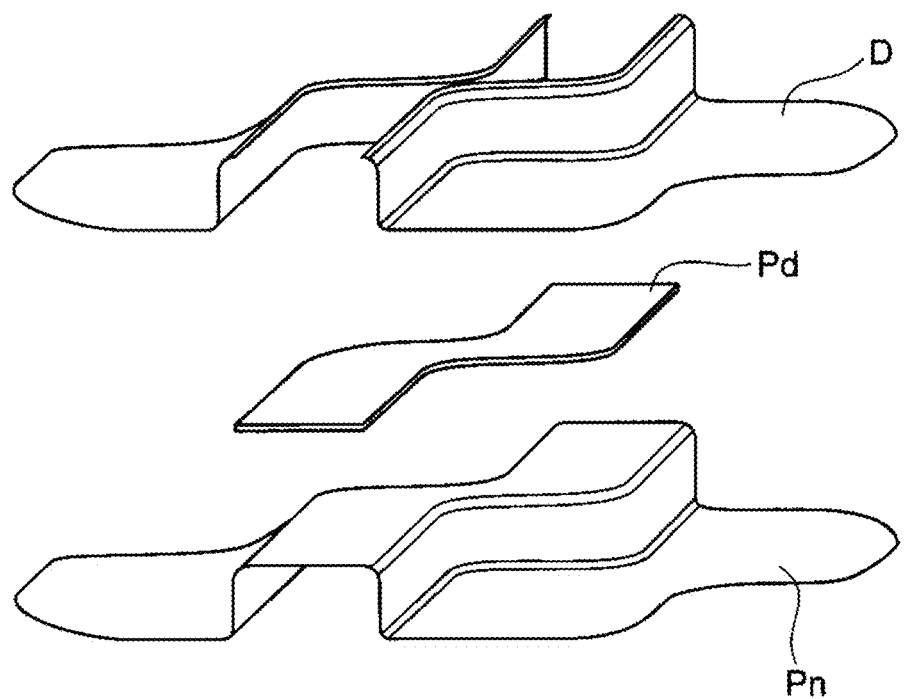
FIG. 69 is a perspective view for illustrating a press die shape of a forming (bending) (with a pad) created in a first application sample.
Figure 70:
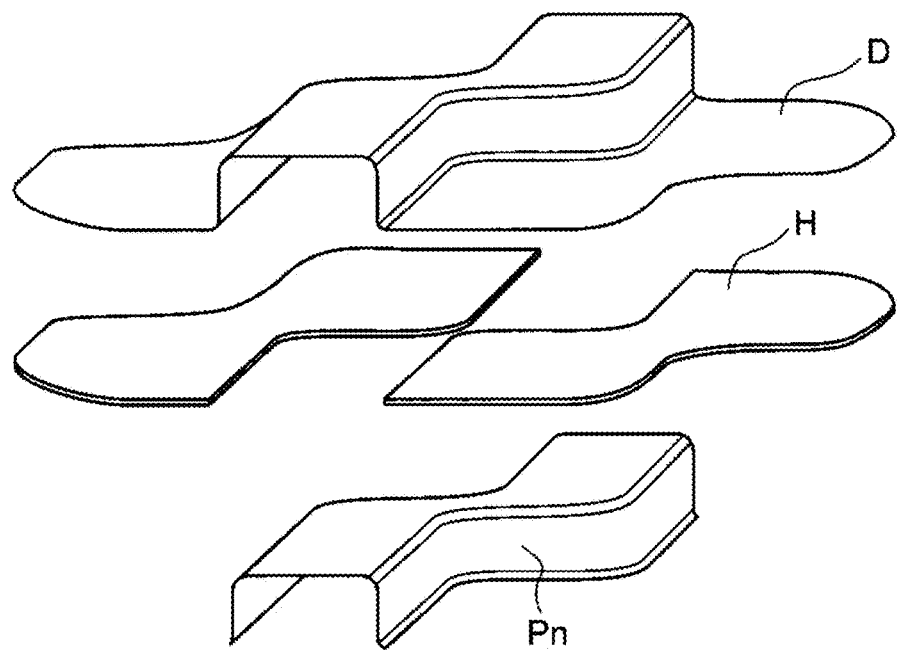
FIG. 70 is a perspective view for illustrating a press die shape of a drawing (without a pad) created in a first application sample.
Figure 71:
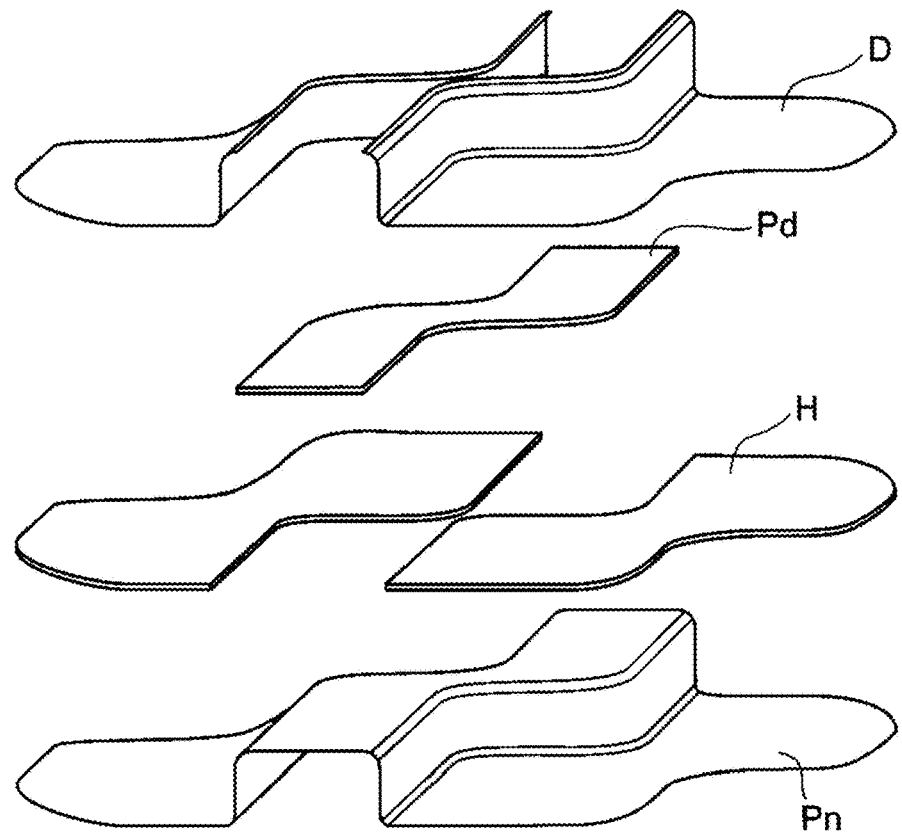
FIG. 71 is a perspective view for illustrating a press die shape of a drawing (with a pad) created in a first application sample.

If a result of judgement of Step S89 is that the pad exists, as illustrated in FIG. 65, the outline of the ceiling plate portion T and the extended portion thereof T' is created as the pad dividing line PLp (Step S90).

If a result of judgement of Step S81 is the blank holder and addendum surface creation type, at first, as illustrated in FIG. 76, FIG. 77(c), FIG. 79(b) and FIG. 80(b), the blank holder surface HS is created (Step S91).

Next, as illustrated in FIG. 81, the feature points a on the product shape outline $OL_s$ are extracted (Step S92).

Next, as illustrated in FIG. 81, the second dimensional punch outline $L_{p\_2d}$ is created based on the feature points a (Step S93).

Next, as illustrated in FIG. 83, the addendum shape is created (Step S94).

Figure 82:
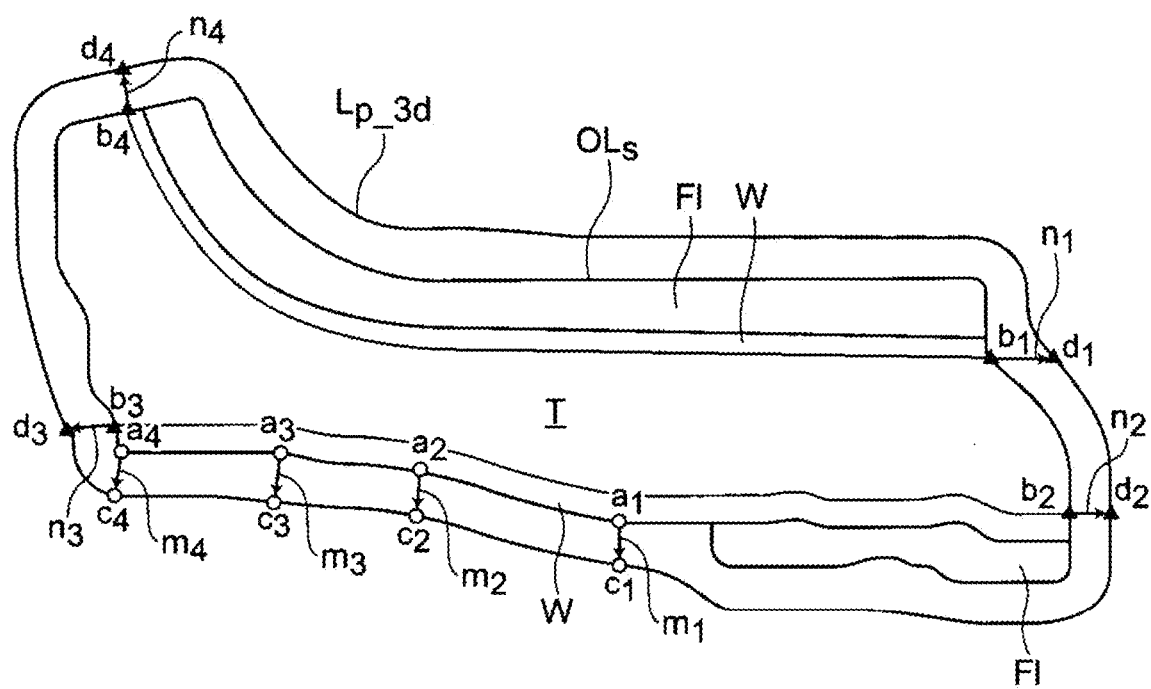
FIG. 82 is a drawing for describing a creation of a press die shape of a second application sample (7).

Next, as illustrated in FIG. 82, the three dimensional punch outline $L_{p\_3d}$ is created based on the second dimensional punch outline $L_{p\_2d}$ (Step S95).

Accordingly, as illustrated in FIG. 68 to FIG. 71, FIG. 88 to FIG. 91, the press die shape of any press die shape type may have been created automatically.

(3-2-6-1) Blank Holder Surface Creation Method

Figure 34:
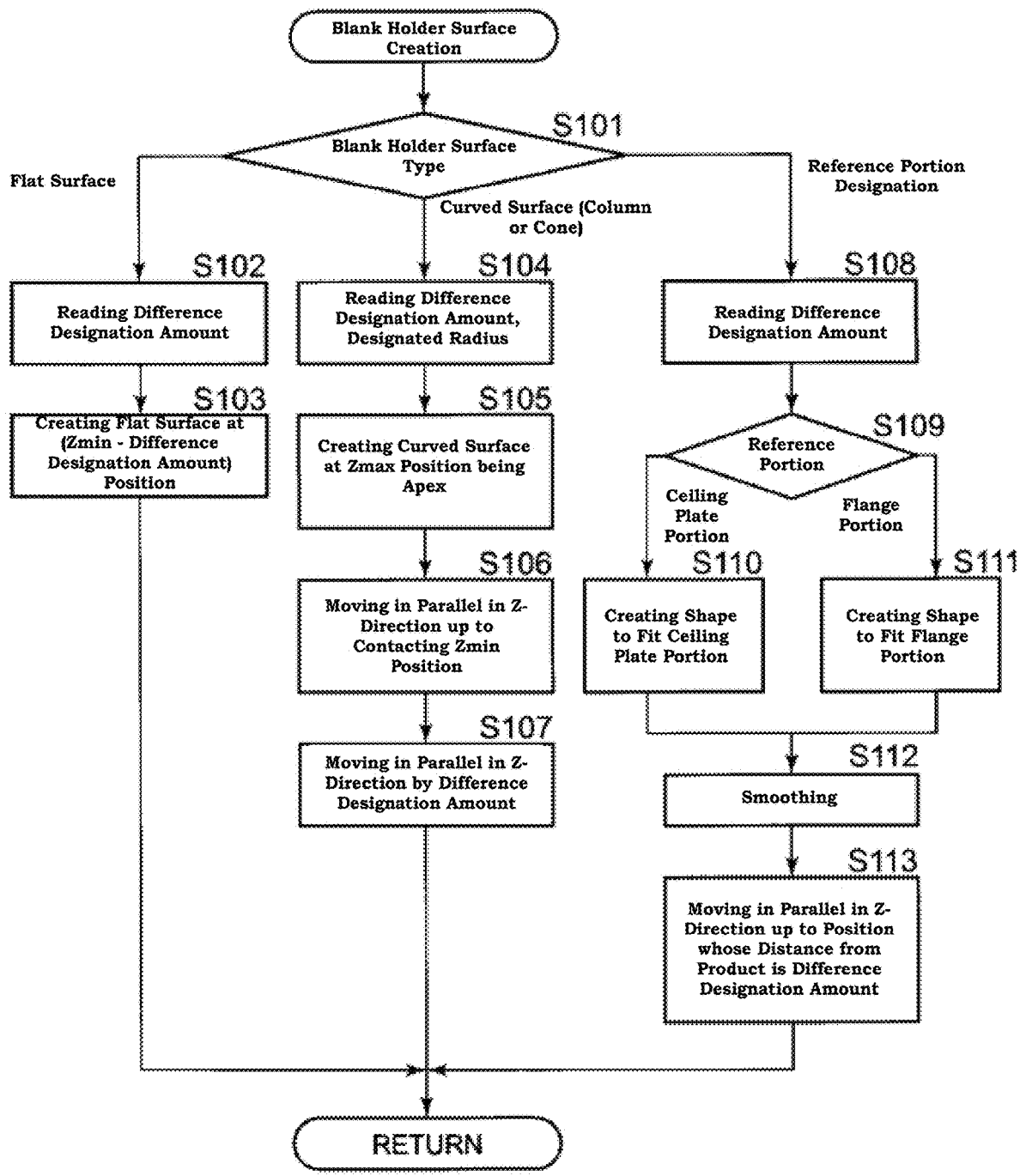
FIG. 34 is a flowchart for illustrating a method for creating a blank holder surface.

Next, the winkle holding surface creation (Step S91) which is a subroutine of the flowchart of FIG. 33 will be described according to the flowchart of FIG. 34.

At first, it is judged the blank holder surface type of the blank holder surface parameter in the press die shape parameter relating to the referencing part stored in the part processing method data storing portion 12C (Step S101).

Figure 76:
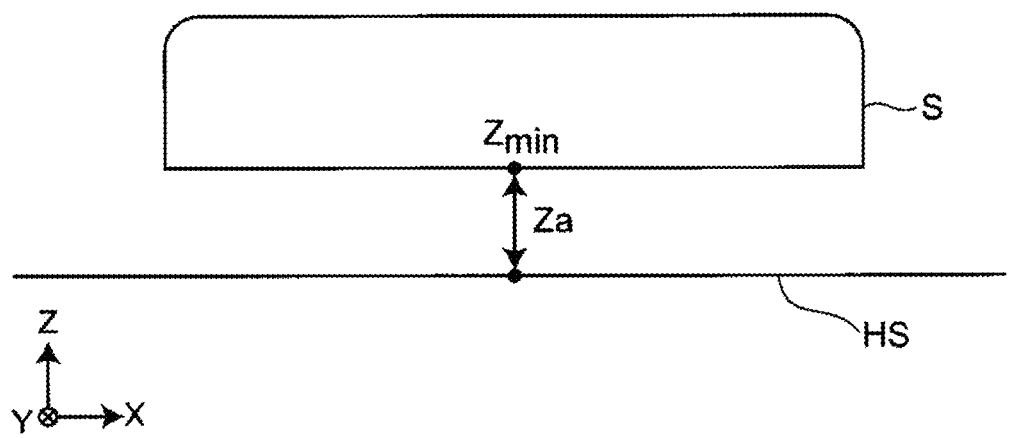
FIG. 76 is a drawing for describing a creation of a press die shape of a second application sample (1).

If a result of the judgement of Step S101 is a flat surface, as illustrated in FIG. 76, a forming position difference designation amount $Z_a$ of the blank holder surface parameter of the referencing parts is read (Step S102).

Next, a flat surface is created at the position lower than the lowest position $Z_{min}$ of the product S by the forming position difference designation amount $Z_a$ as the blank holder surface HS (Step S103).

If a result of the judgement of Step S101 is a curved surface, the forming position difference designation amount $Z_a$, the curved surface type (a column or a cone) and the designated radius R are read from the blank holder surface parameter of the referencing part (Step S104). It is determined such that the designated radius is set in a curved surface definition parameter 1 of the blank holder surface parameter of the referencing part.

Figure 77:
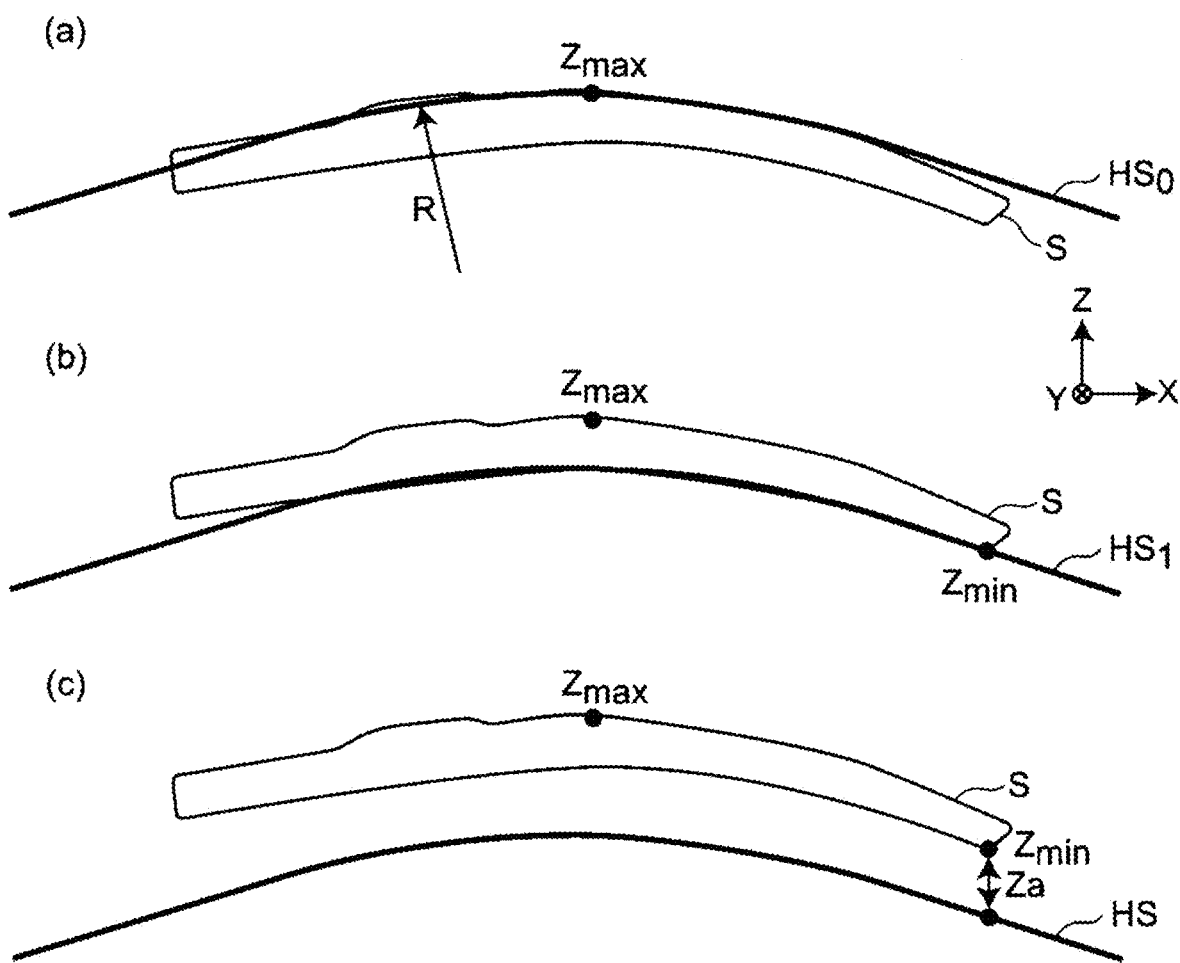
FIG. 77 is a drawing for describing a creation of a press die shape of a second application sample (2).

Next, as illustrated in FIG. 77(a), the curved surface $HS_0$ is created so that the highest position $Z_{max}$ of the product S becomes an apex (Step S105). For example, if the curved surface type is a column, as illustrated in FIG. 78(a), the curved surface $HS_0$ is created based on the size L1, L2 of the product S and the designated radius R. If the curved surface type is a cone, as illustrated in FIG. 78(b), the curved surface $HS_0$ is created based on the size L1, L2, L3 of the product S and the designated radius R1, R2. Since a method to form the blank holder surface from the product shape of the curved surface type is the well-known technology, a further description is omitted.

Next, as illustrated in FIG. 77(b), the curved surface $HS_0$ is moved in parallel in the minus Z direction up to contacting the lowest point Zmin of the product S (Step S106). The curved surface moved in parallel in the minus Z direction is determined as the $HS_1$.

Next as illustrated in FIG. 77(c), the blank holder surface HS is obtained by moving the curved surface $HS_1$ in parallel in the minus Z direction by the forming position difference designation amount $Z_a$ (Step S107).

If a result of the judgement of Step S101 is the reference portion designation, the forming position difference designation amount $Z_a$ is read from the blank holder surface parameter of the referencing part (Step S108).

Next, the reference portion is judged based on the blank holder surface type (Step S109).

Figure 79:
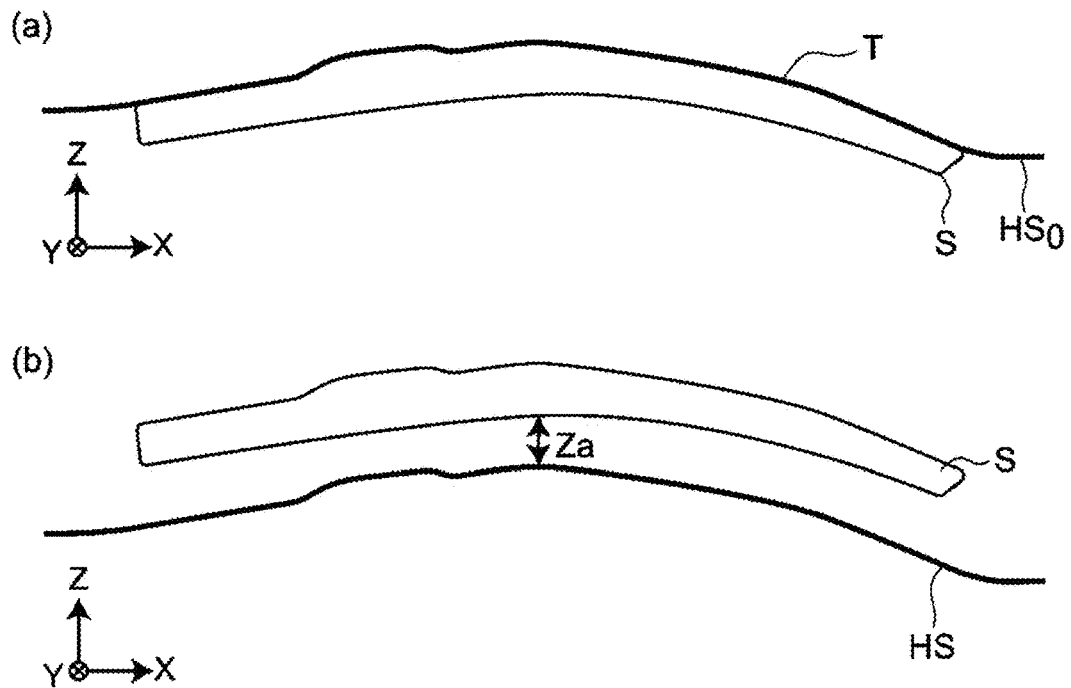
FIG. 79 is a drawing for describing a creation of a press die shape of a second application sample (4).

If a result of the judgement of Step S109 is the ceiling plate portion T, as illustrated in FIG. 79(a), a shape corresponding to the ceiling plate portion T of the product S is created (Step S110).

If a result of the judgement of Step S109 is the flange portion, as illustrated in FIG. 80(a), a shape corresponding to the flange portion Fl of the product S is created (Step S111).

Next, the created fillet shape is smoothed (Step S112). The smoothed curved surface is determined as the $HS_0$.

Figure 80:
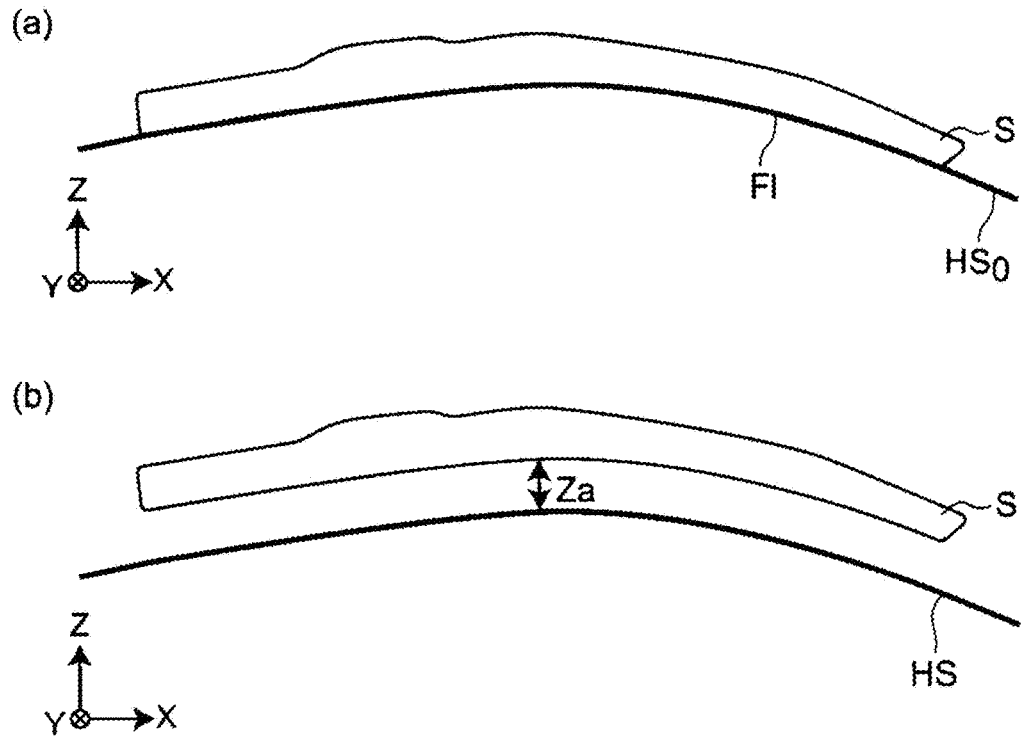
FIG. 80 is a drawing for describing a creation of a press die shape of a second application sample (5).

Finally, as illustrated in FIG. 79(b), FIG. 80 (b), the curved surface $HS_0$ is moved in parallel in the minus Z direction up to the position where the distance from the product S becomes the forming position difference designation amount $Z_a$ (Step S113).

Accordingly, the blank holder surface may be created automatically.

(3-2-6-2) Feature Point Extracting Method

Figure 35:
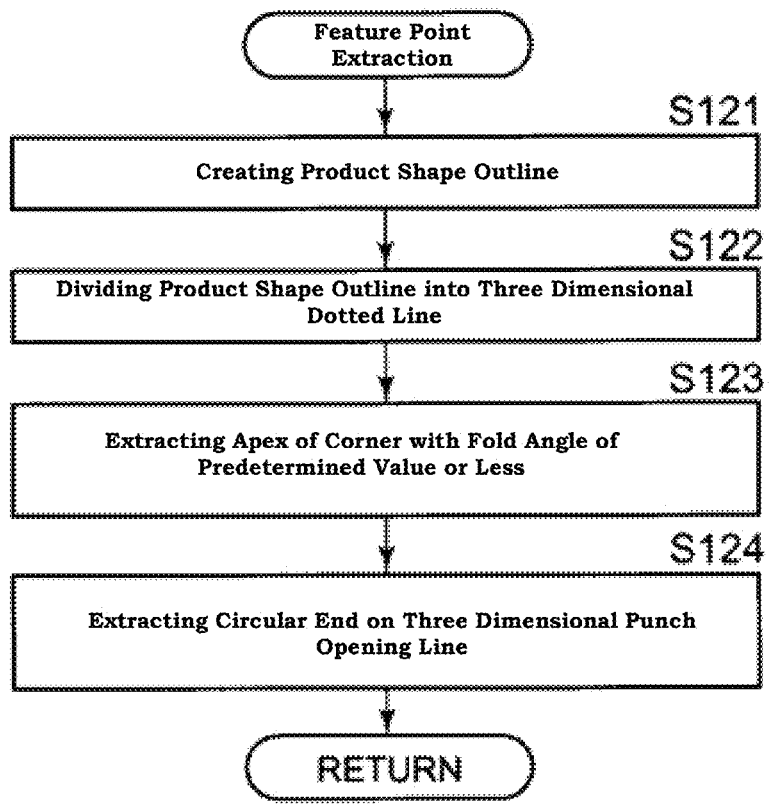
FIG. 35 is a flowchart for illustrating a method for extracting a feature point.

Next, the feature point extraction (Step S92) which is a subroutine of the flowchart of FIG. 33 will be described according to the flowchart of FIG. 35.

At first, as illustrated in FIG. 81, the product shape outline $OL_s$ which is the outline of the product S is created based on the product shape model data DT102 (Step S121).

Next, while it is not illustrated, the product shape outline $OL_s$ is divided into the three dimensional dotted line along the whole outer periphery thereof (Step S122).

Next, in the nodal points which configure the divided three dimensional dotted line, the nodal point in which a fold angle between two lines created by connecting the nodal point and two adjacent nodal points on both sides is a predetermined angle or less is extracted with using the feature point flag of the product shape outline data DT103 (Step S123).

Finally, the end points of the circular arc on the three dimensional punch opening line $L_{p\_3d}$ is extracted with using the feature point flag of the product shape outline data DT103, and the extracted apex and the end points of the circular arc are set as the feature points a (Step S124).

Accordingly, the feature point may be set automatically.

(3-2-6-3) Two Dimensional Punch Opening Line Creation Method

Figure 36:
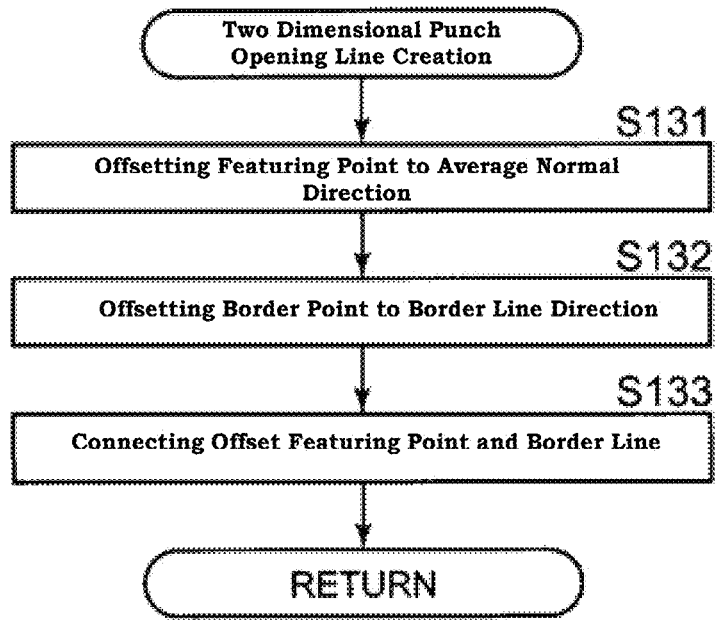
FIG. 36 is a flowchart for illustrating a method for creating a two dimensional punch opening line.

Next, the two dimensional punch opening line creation (Step S93) which is a subroutine of the flowchart of FIG. 33 will be described according to the flowchart of FIG. 36.

At first, as illustrated in FIG. 81(a), each feature point a is offset by a predetermined distance in the direction of the average normal line (Step S131). At this moment, as illustrated in FIG. 81 (b), if the lines $l_1$, $l_2$ which are respectively extended from the feature points $a_1$, $a_2$ in the direction of the average normal line cross each other, these feature points $a_1$, $a_2$ are not offset.

Next, as illustrated in FIG. 81(a), the CAD surface border point b on the product shape outline $OL_s$ is offset by a predetermined distance in the direction of the CAD surface border line (Step S132). The CAD border line means a border line between the adjacent CAD surfaces in the plurality of CAD surfaces which configure the product shape data, and an intersecting point of the CAD border line and the product shape outline OLs is determined as the CAD surface border point. The predetermined distance of the offset in Steps S131, S132 is set according to the offset distance of the two dimensional punch opening line of the addendum shape parameter included in the press die shape creation parameter of the referencing part.

Finally, a spline curved line which pass the feature points a and the CAD border points b which are offset is created as the two dimensional punch opening line $L_{p\_2d}$ (Step S133).

Accordingly, the two dimensional punch opening line may be created automatically.

(3-2-6-4) Addendum Shape Creation Method

Figure 37:
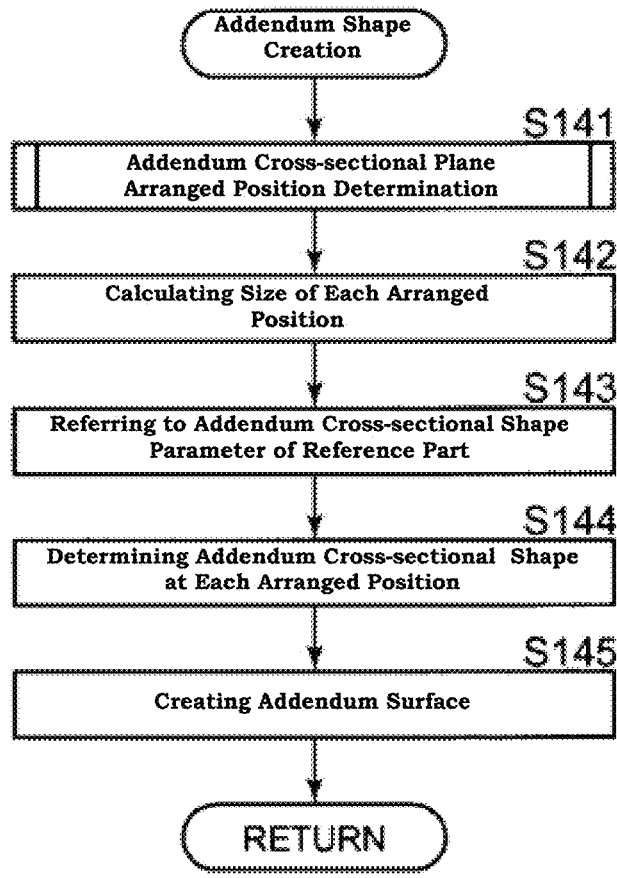
FIG. 37 is a flowchart for illustrating a method for creating an addendum shape.

Next, the addendum shape creation (Step S94) which is a subroutine of the flowchart of FIG. 33 will be described according to the flowchart of FIG. 37.

At first, as illustrated in FIG. 82, the lines $m_1$ to $m_4$ being positioned on the product shape outline $OL_s$, which are drawn from the feature points $a_1$ to $a_4$ positioned on the vertical wall portion W to the three dimensional punch opening line $L_{p\_3d}$ in the direction of the average normal line, and the lines $n_1$ to $n_4$ which are drawn from the CAD border points $b_1$ to $b_4$ positioned on the product shape outline $OL_s$ to the three dimensional punch opening line $L_{p\_3d}$ in the direction of the CAD surface border line are determined as an arranged positions of the addendum cross-sectional plane (Step S141).

If the arranged positions of the addendum cross-sectional planes are the lines $n_1$ to $n_4$ drawn from the CAD border points $b_1$ to $b_4$, as illustrated in FIG. 83(a), sizes Za, Xa of each arranged position are calculated (Step S142). Za means a height from the blank holder surface HS to the CAD border points $b_1$ to $b_4$ in the Z direction, and Xa means a length from the three dimensional punch outline $L_{p\_3d}$ to the CAD border points $b_1$ to $b_4$ in the direction of the average normal line.

Next, as illustrated in FIG. 83(a), the addendum cross-sectional shape parameters Rw, Rd, θw of the referencing part are referred to (Step S143). The addendum cross-sectional shape parameters Rw, Rd, θw are set respectively according to the addendum cross-sectional shape parameter relating to the pad portion, the flange portion and the vertical wall portion, which are included in the addendum shape parameter in the press die shape creation parameter of the referencing part.

Next as illustrated in FIG. 83 (b), the addendum cross-sectional shape at each arranged position is determined based on the addendum cross-sectional shape parameters Rw, Rd, θw of the referencing part (Step S144). For example, the addendum cross-sectional shape parameters Rw', Rd', θw' of the product S may have the same values of those of the addendum cross-sectional shape parameters Rw, Rd, θw of the referencing part.

Figure 84:
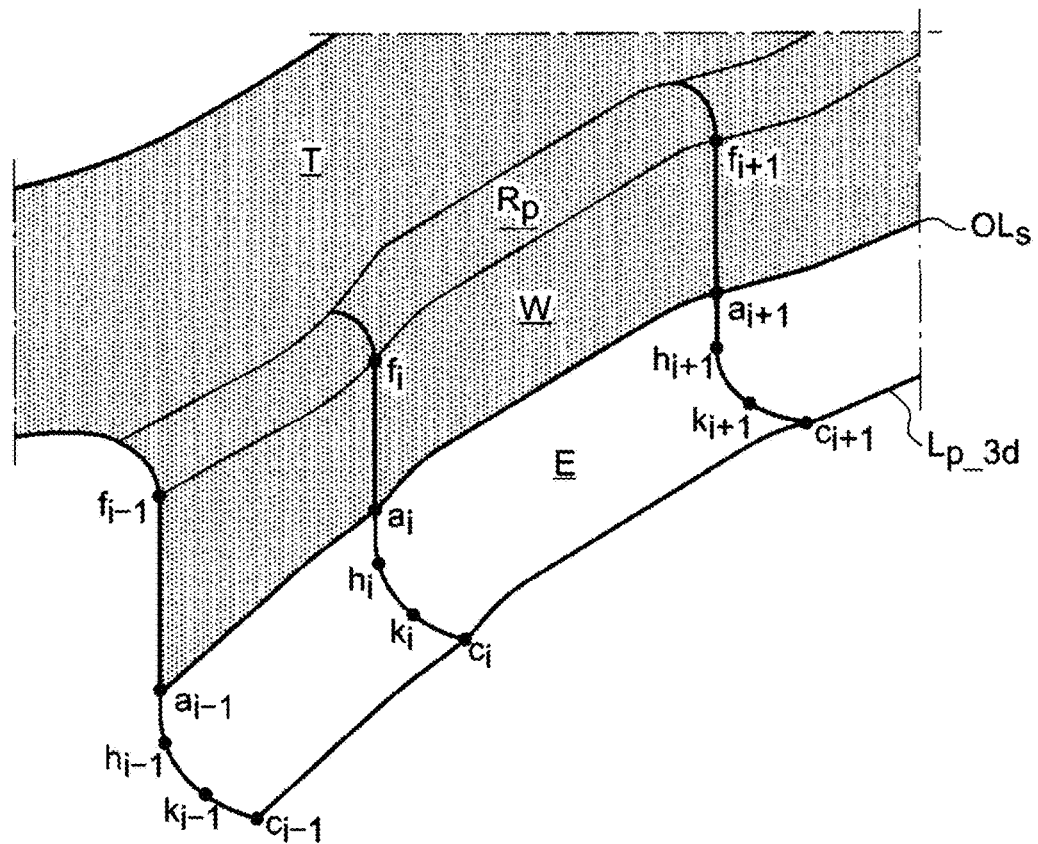
FIG. 84 is a drawing for describing a creation of a press die shape of a second application sample (9).

On the contrary, if the arranged position of the addendum cross-sectional plane is on the lines $m_1$ to $m_4$ drawn from the feature points $a_1$ to $a_4$, as illustrated in FIG. 84, the height Za from the blank holder surface HS to the feature points a1 to $a_4$ in the Z direction, and the distance Xa from the three dimensional punch opening line $L_{p\_3d}$ to the feature points $a_1$ to $a_4$ in the direction of the average normal line are calculated (Step S142).

Figure 85:
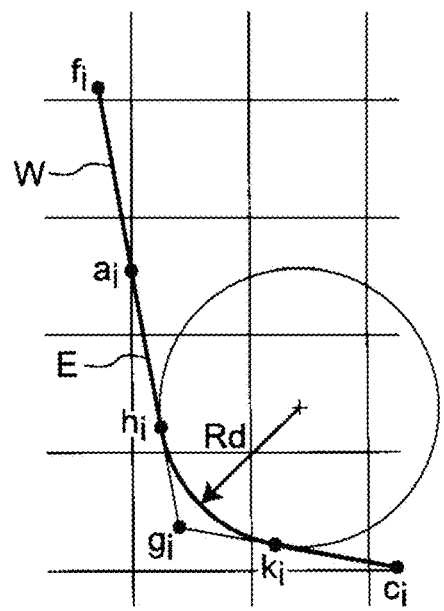
FIG. 85 is a drawing for describing a creation of a press die shape of a second application sample (10).
Figure 86:
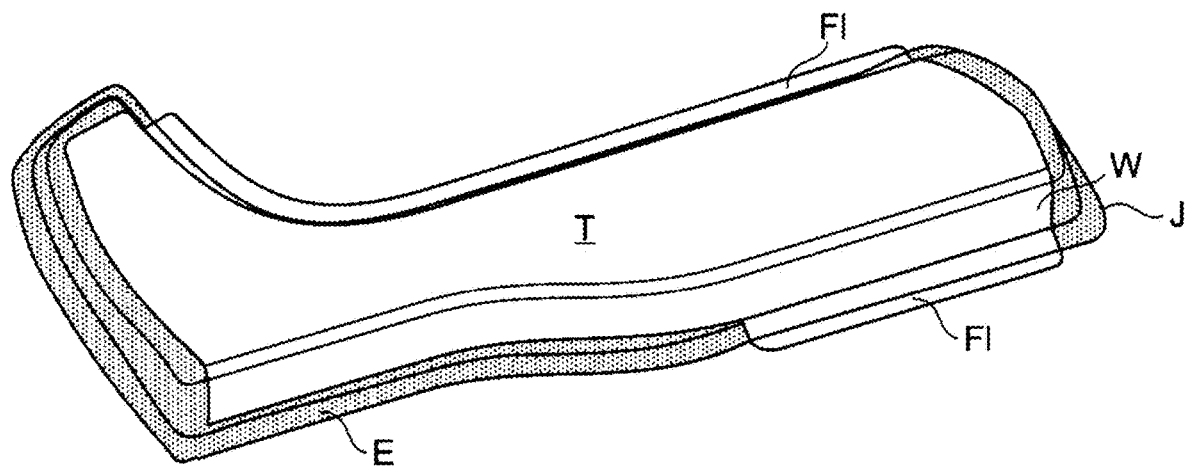
FIG. 86 is a drawing for describing a creation of a press die shape of a second application sample (11).

Next, as illustrated in FIG. 85, as the addendum cross-sectional shape parameter of the referencing part, an intersecting point of a line extended from the feature points $a_1$ to $a_4$ along the vertical wall portion W, and a line extended from the three dimensional punch opening line $L_{p\_3d}$ along the blank holder surface HS is determined as an intersecting point $g_i$, and the fillet radius Rd of the corner $a_i$, $g_i$, $c_i$ in which the intersecting point $g_i$ is an apex thereof is referred to (Step S143).

Next, the addendum cross-sectional shape of the product S at each arranged position is determined based on the addendum cross-sectional shape parameter Rd of the referencing part (Step S144). For example, the addendum cross-sectional shape parameter Rw' of the product S may have the same value of that of the addendum cross-sectional shape parameter Rd of the referencing part.

Finally, the addendum surface is created by connecting the adjacent addendum cross-sectional planes sequentially relating to all the addendum cross-sectional planes (the line $n_1$ to $n_4$, $m_1$ to $m_4$) (Step S145).

Figure 87:
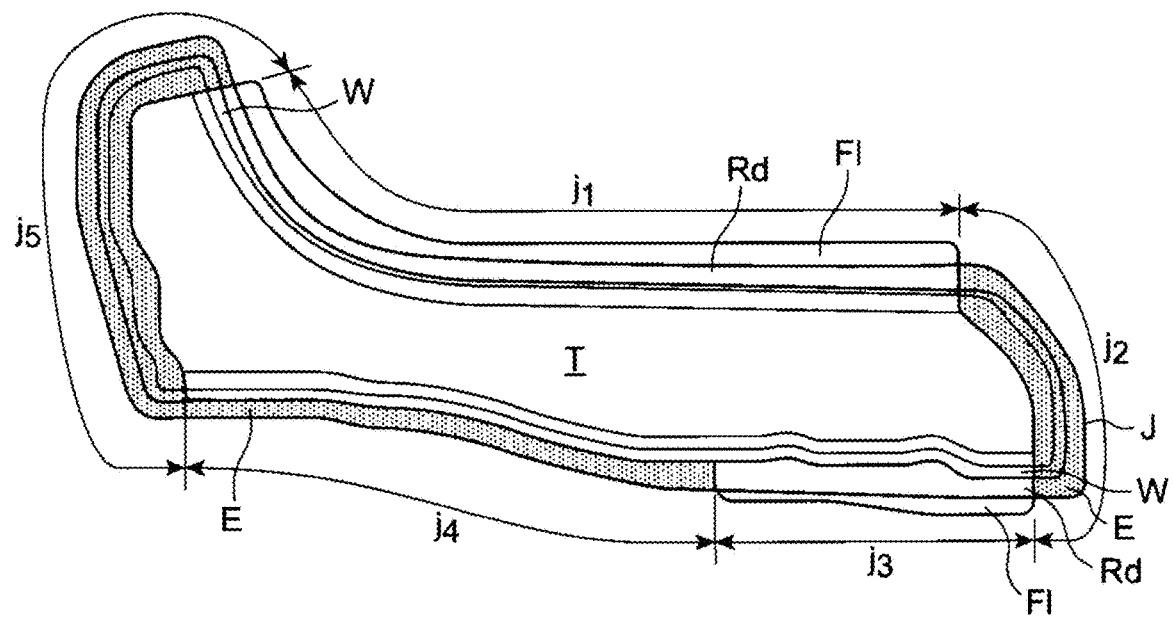
FIG. 87 is a drawing for describing a creation of a press die shape of a second application sample (12).
Figure 88:
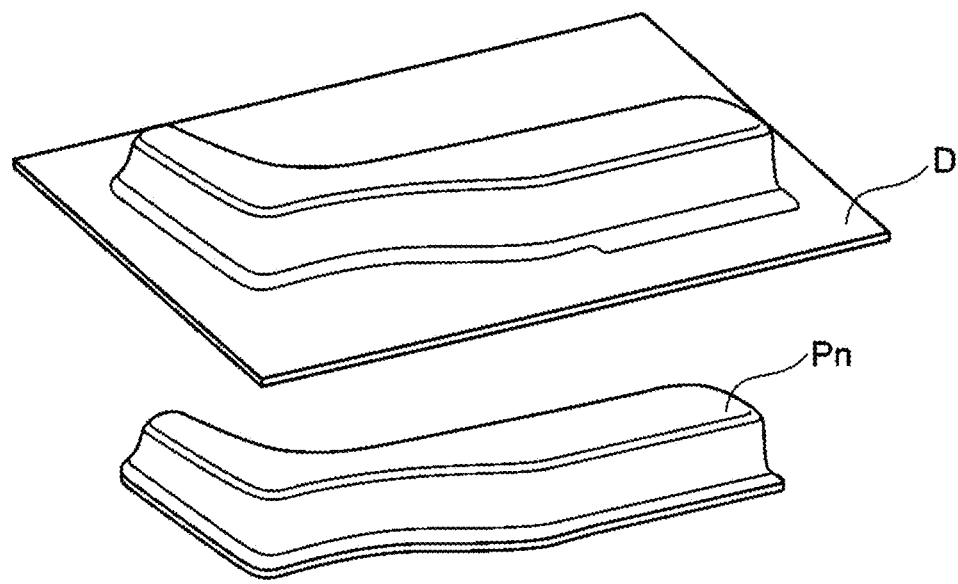
FIG. 88 is a perspective view for illustrating a press die shape of a forming (bending) (without a pad) created in a second application sample.
Figure 89:
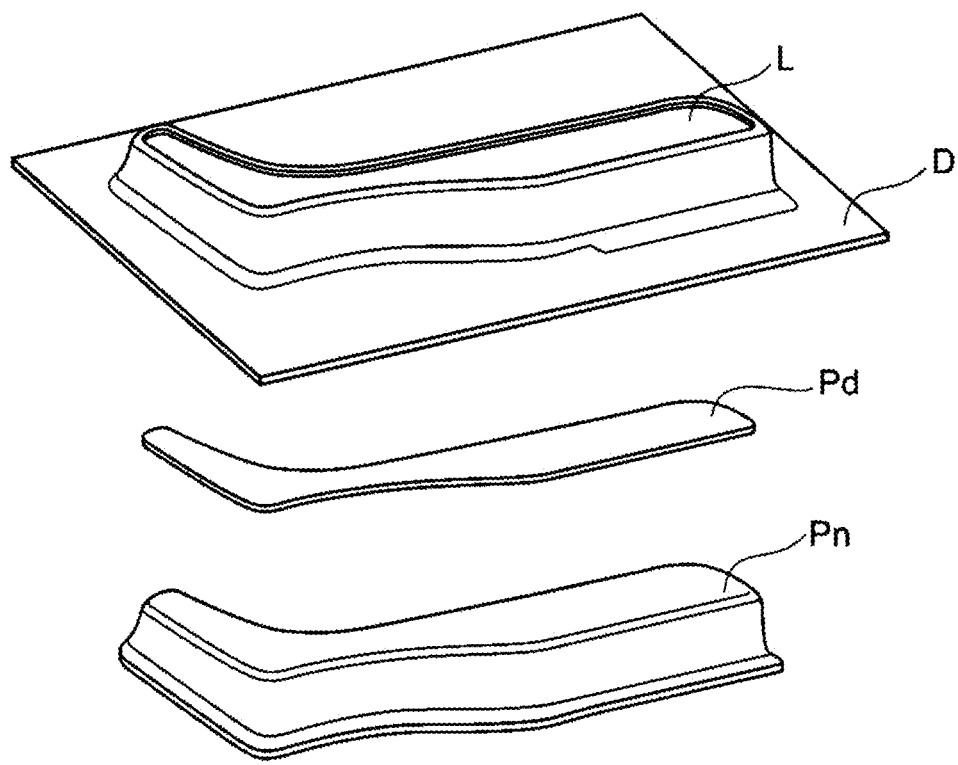
FIG. 89 is a perspective view for illustrating a press die shape of a forming (bending) (with a pad) created in a second application sample.
Figure 90:
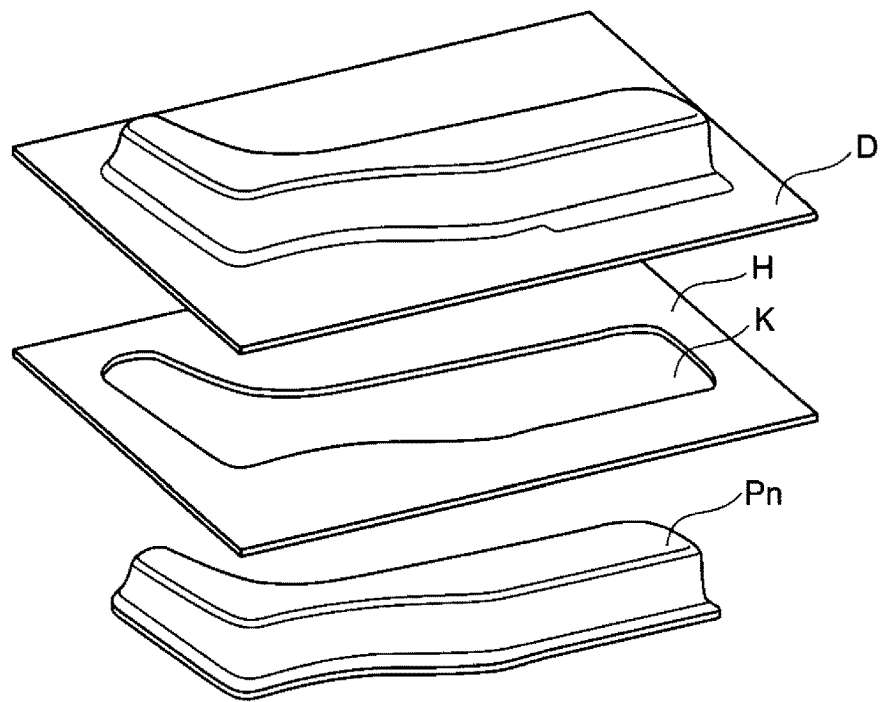
FIG. 90 is a perspective view for illustrating a press die shape of a drawing (without a pad) created in a second application sample.
Figure 91:
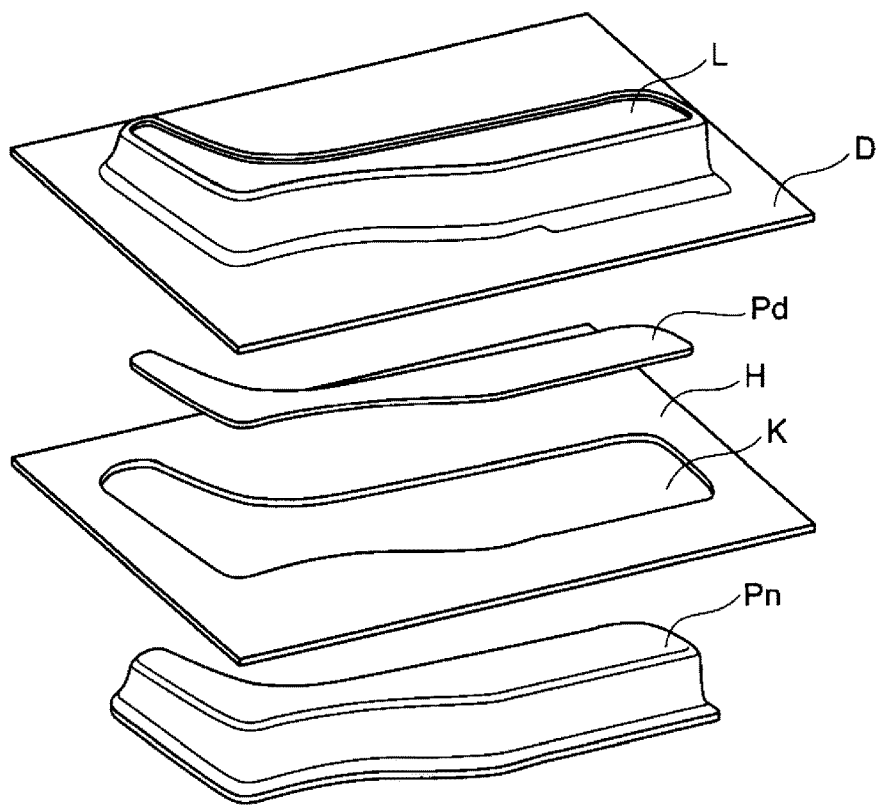
FIG. 91 is a perspective view for illustrating a press die shape of a drawing (with a pad) created in a second application sample.

Accordingly, the addendum shape may be created automatically. The products S with the addendum to which the created addendum shape E is added is illustrated in FIG. 82, FIG. 87. As illustrated in FIG. 87, the outline J of the product S with the addendum is configured with the j1, j3 configured with the border line of the flange portion Fl and the die R fillet portion Rd, the j2, j5 configured with the outline of the addendum portion E created by extending the ceiling palate portion T, and the j4 configured with the outline of the addendum portion E created by extending the vertical wall portion W.

(3-2-6-4-1) Addendum Cross-Sectional Plane Arranged Position Determining Method

Figure 38:
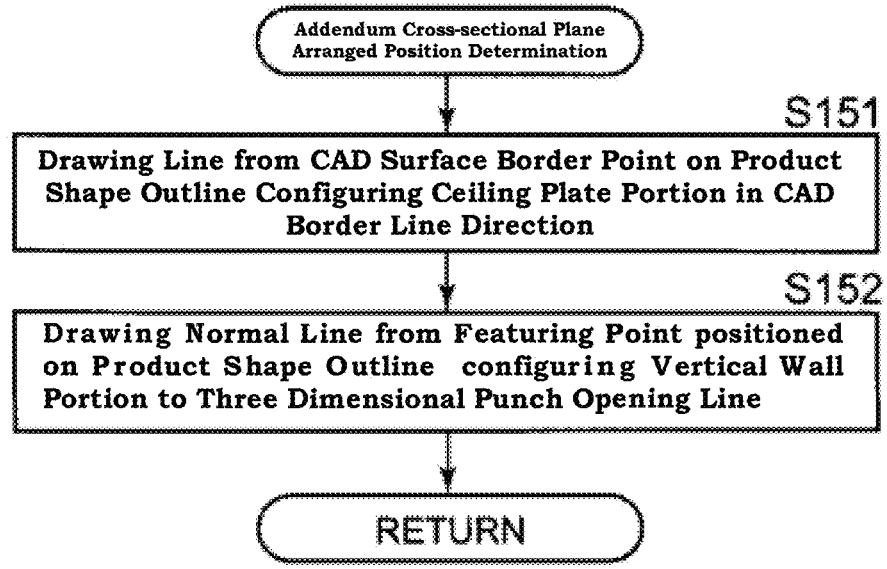
FIG. 38 is a flowchart for illustrating a method for determining an arranged position of an addendum cross-sectional plane.

Next, the addendum cross-sectional plane arranged position determination (Step S141) which is a subroutine of the flowchart of FIG. 37 will be described according to the flowchart of FIG. 38.

At first, as illustrated in FIG. 82, a line is drawn from the CAD surface border points $b_1$ to $b^4$ on the product shape outline $OL_s$ which configures the ceiling plate portion T to the three dimensional punch opening line $L_{p\_3d}$ in the direction of the CAD border line (Step S151). At this moment, if the lines $n_1$ to $n_4$ and the three dimensional punch opening line $L_{p\_3d}$ cross at the intersecting points $b_1$ to $b_4$, the lines $n_1$ to $n_4$ which connect the CAD surface border points $b_1$ to $b_4$ and the intersecting points $b_1$ to $b_4$ respectively are determined as the arranged position of the addendum cross-sectional plane.

Finally, a normal line is drawn from the feature points $a_1$ to $a_4$ positioned on the product shape outline $OL_s$ which configures the vertical wall portion to the three dimensional punch opening line $L_{p\_3d}$ (Step S152). At this moment, if the lines $m_1$ to $m_4$ and the three dimensional punch opening line $L_{p\_3d}$ cross at the intersecting points $c_1$ to $c_4$, the lines which connect the feature points $a_1$ to $a_4$ and the intersecting points $c_1$ to $c_4$ respectively are further determined as the arranged position of the addendum cross-sectional plane.

Accordingly, the addendum cross-sectional plane arranged position may have been determined automatically.

(3-2-7) Draw Bead Setting Method

Figure 39:
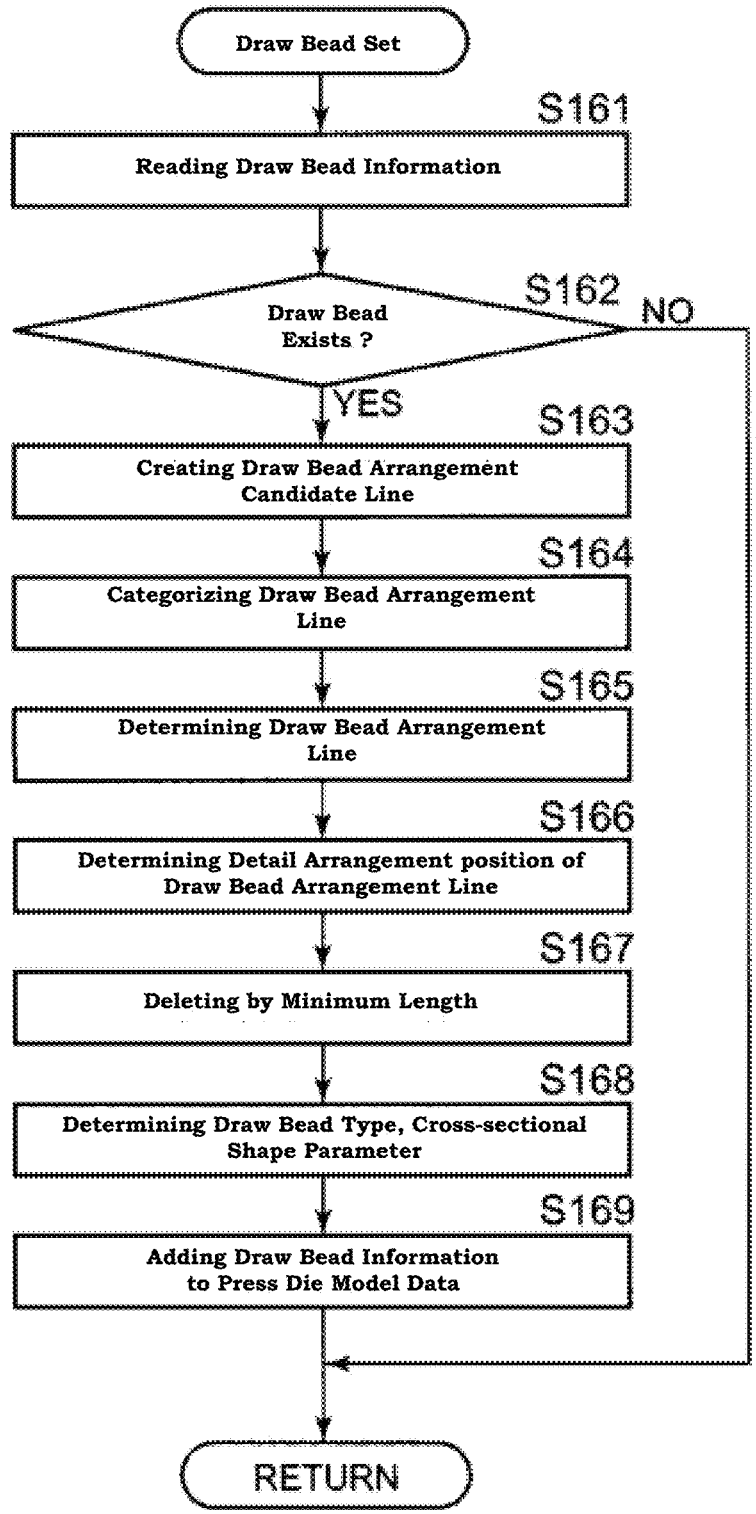
FIG. 39 is a flowchart for illustrating a method for setting a draw bead.

Next, the draw bead set (Step S29) which is a subroutine of the flowchart of FIG. 27 will be described according to the flowchart of FIG. 39.

At first, the draw bead information data DT of the referencing part is read from the part processing method data storing portion 12C (Step S161).

Next, it is judged if the draw bead exists or not based on the draw bead information data DT to be read (Step S162), and if it is judged such that the draw bead does not exist, this subroutine is finished.

Figure 92:
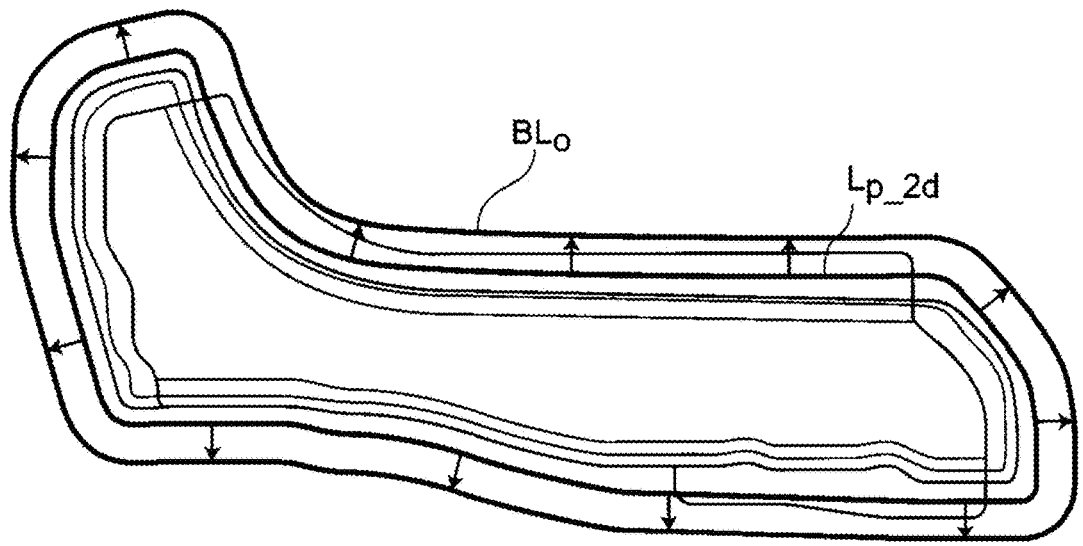
FIG. 92 is a drawing for describing a setting of a draw bead of a second application sample (1).

If a result of the judgement of Step S162 is that the bad exists, as illustrated in FIG. 92, a draw bead arrangement candidate line $BL_0$ is created by offsetting the two dimensional punch opening line $L_{p\_2d}$ of the product S outwardly by the offset distance (Step S163). The above mentioned offset distance is included in the draw bead information data DT to be read.

Figure 93:
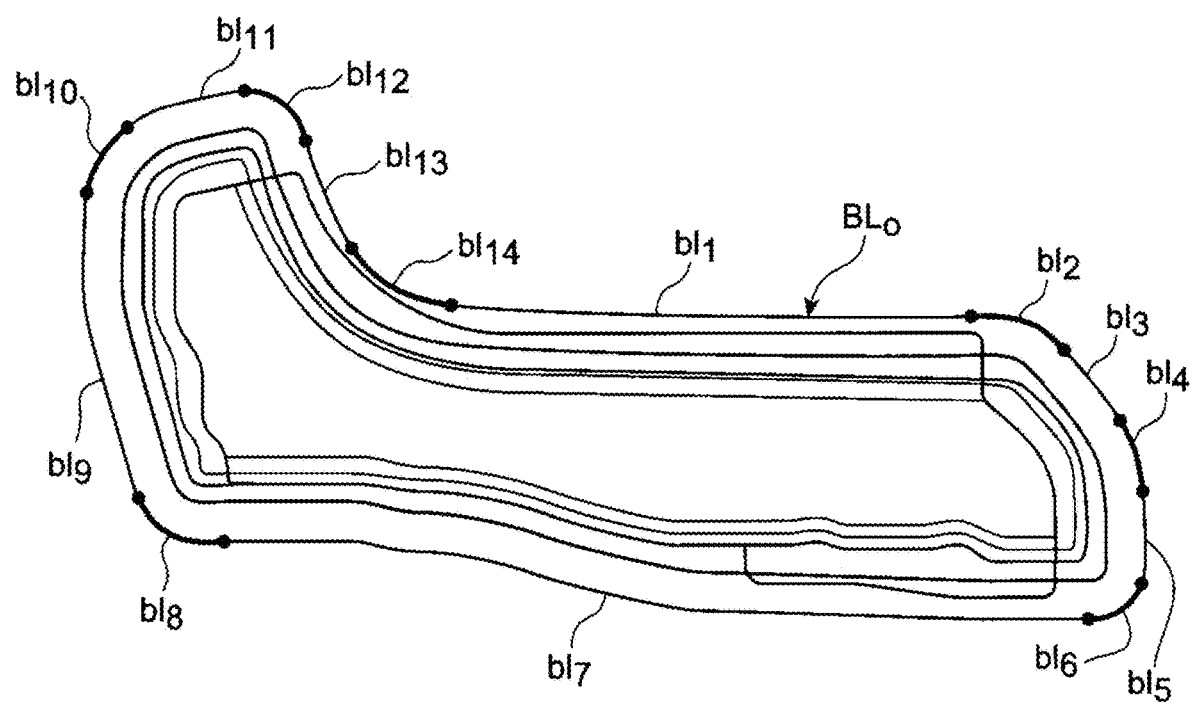
FIG. 93 is a drawing for describing a setting of a draw bead of a second application sample (2).

Next, as illustrated in FIG. 93, the circular arc portion is extracted from the created draw bead arrangement candidate line $BL_0$. Then, the circular arc portion is categorized into convex circular arc portions $bl_2$, $bl_5$, $bl_7$, $bl_9$, $bl_{11}$ and a concave circular arc portion $bl_{13}$, and the remaining parts of the draw bead arrangement candidate line BL0 are respectively determined as straight line portions $b_{11}$, $b_{14}$, $b_{16}$, $b_{18}$, $bl_{10}$, $bl_{12}$. Accordingly, the draw bead arrangement candidate line $BL_0$ is categorized into the straight line portion, the convex circular arc portion or the concave arc portion (Step S164). The circular arc portion may be extracted by determining the curved line portion having a predetermined radius or less in the draw bead arrangement candidate line $BL_0$ as a circular arc. Further, the convex circular arc portion and the concave circular arc portion may be distinguished by determining a circular arc in which normal line vectors extended outwardly from both end points of the circular arc cross each other as the concave circular arc portion, and determining a circular arc in which the extended normal line vectors do not cross each other as the convex circular arc portion.

Figure 94:
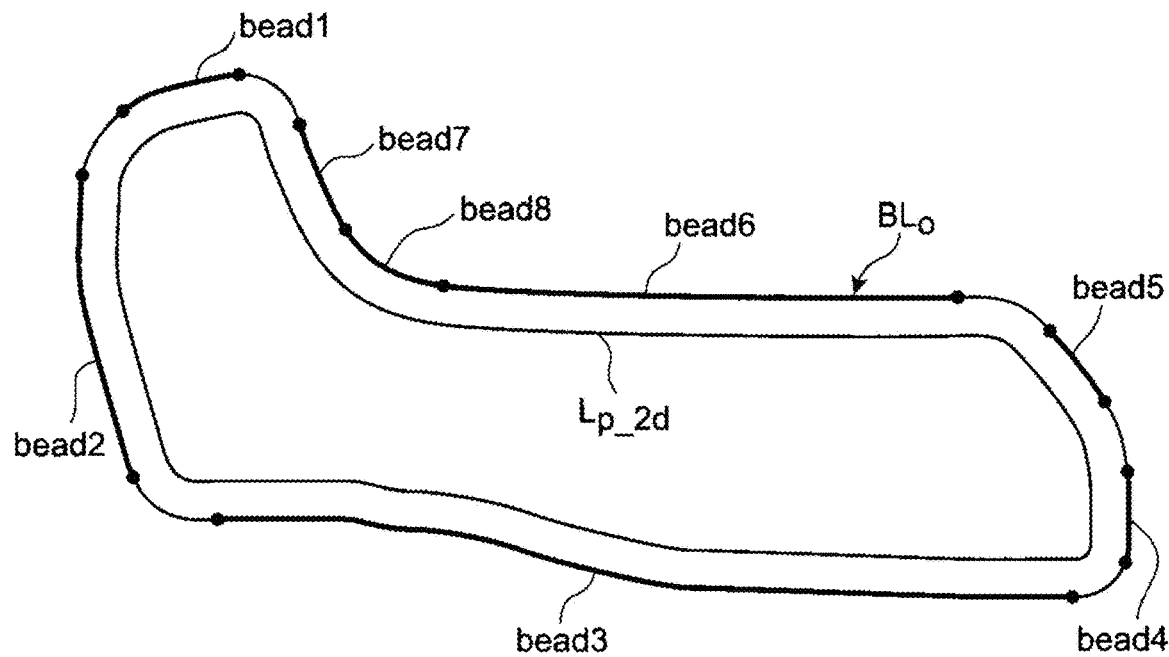
FIG. 94 is a drawing for describing a setting of a draw bead of a second application sample (3).

Next as illustrated in FIG. 94, for example, the straight line portions $bl_1$, $bl_3$, $bl_4$, $bl_6$, $bl_8$, $bl_{10}$, $bl_{12}$, and the concave circular arc portions $bl_{13}$, which are categorized are determined as draw bead arrangement line bead1 to bead8 (Step 165). The information such that either of the straight line portion, the convex circular arc portion bl or the concave circular arc portion becomes the draw bead arrangement line is included in the draw bead information data DT to be read as a draw bead arranging method (straight line portion on/off, the convex circular arc portion on/off, concave circular portion on/off).

Figure 95:
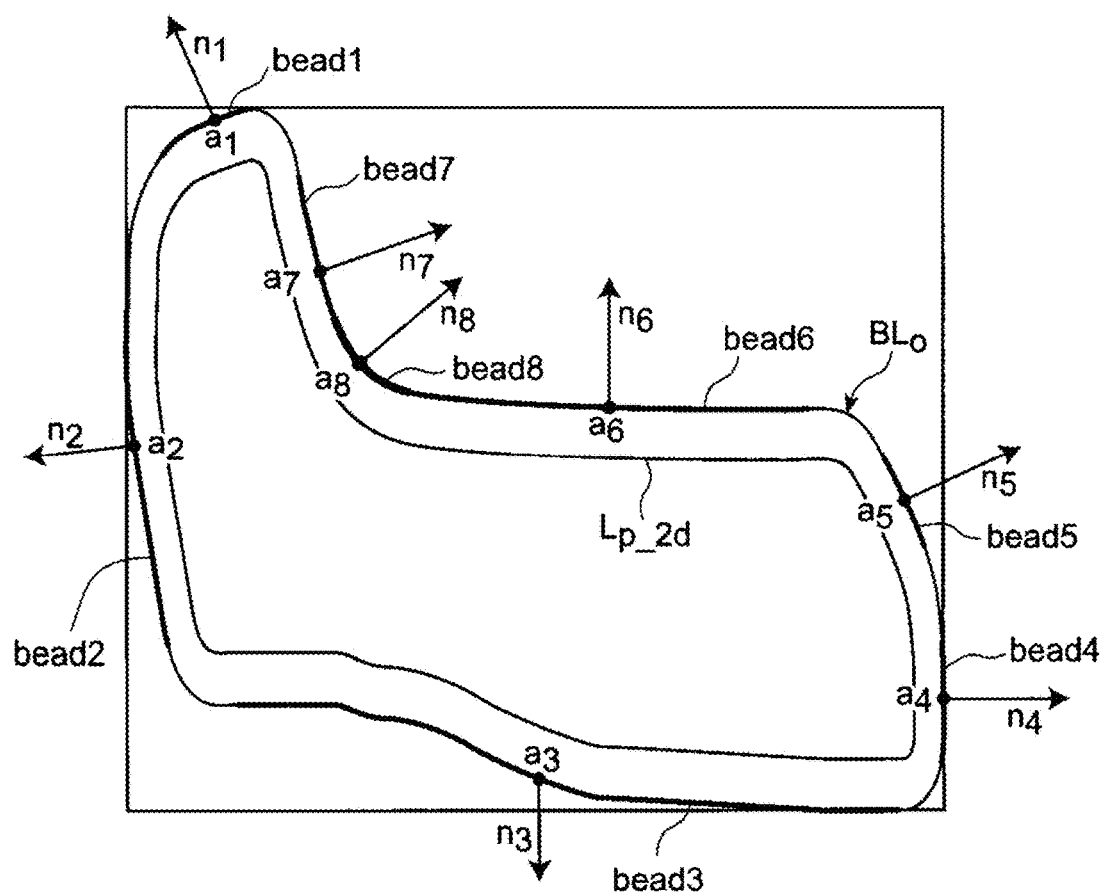
FIG. 95 is a drawing for describing a setting of a draw bead of a second application sample (4).

Next, if a plurality of different draw bead cross-sectional shapes are included in the same group judgement type (for example, the convex circular arc portion), as illustrated in FIG. 95, the draw bead arrangement position information of the draw bead arrangement lines bead1 to bead8 is compared each other in the normalized coordination system, and the number of the draw bead group corresponding to the arranged position is determined (Step S166). Specifically, the draw bead arrangement lines bead1 to bead8 are coordinate converted into the normalized coordinate system, and the average normal line direction and the center position coordinate of each normalized arrangement line are calculated. The condition is judged to be satisfied if the inner product of the calculated average normal line direction of the draw bead and the average normal line direction of the registered draw bead arranged position information becomes plus (thus, in the case that a holding force in the same direction is applied to the blank B), and a distance of the center position coordinates in the normalized coordination system is 1.0 or less.

Next, a draw bead which is shorter than the minimum draw bead length is deleted in the draw bead arrangement lines bead1 to bead8 (Step S167). The minimum draw bead length is included in the draw bead information data DT to be read.

Next, according to the draw bead information, the draw bead shape type bead1 to bead8 (circle/rectangular/step), the cross-sectional shape parameter (basic position, edge radius, center radius, depth or the like) is determined (Step S168).

Finally, the draw bead information to be set is added to the press die model data DT300 of the created product S (Step S169). At this moment, the draw bead shape itself which has a convex and concave shape may be directly added to the blank holder surface of the press die model of the die D and the blank holder H, and further the line draw bead (equivalent draw bead) which is a draw bead resisting force in a numerical model form may be added thereto.

Accordingly, the draw bead may have been created automatically.

(4) Method for Creating Blank Model Data by System for Automatically Creating Press Die Shape The method for creating a blank model data by the system for automatically creating a press die shape 1 will be described.

Figure 40:
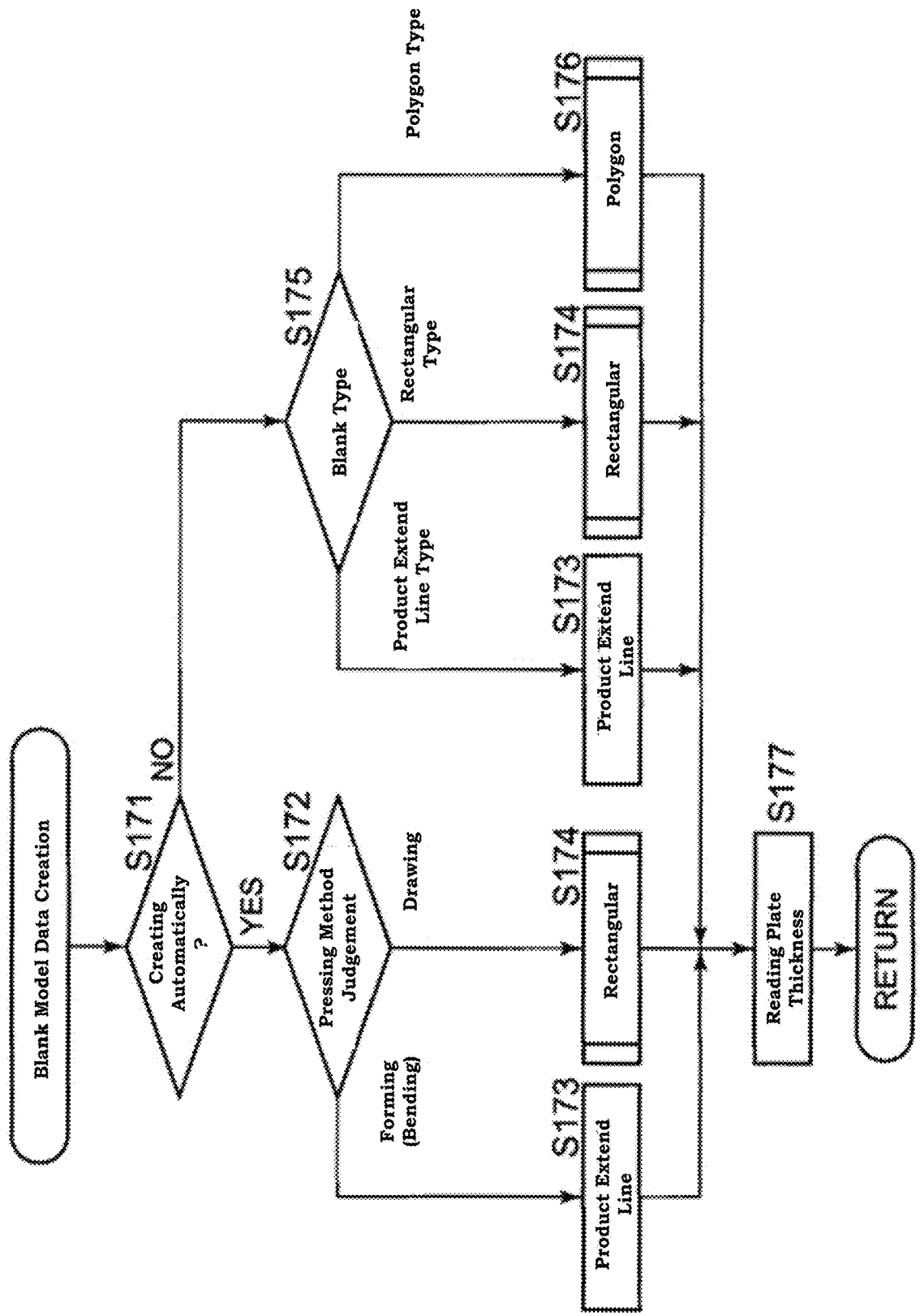
FIG. 40 is a flowchart for illustrating a method for creating a blank model data.

At first, a general work flow of the method for creating a blank model data is described according to the processing procedure as illustrated in the flowchart of FIG. 40.

At first, it is judged if a blank line is created automatically or not based on the blank type of the blank line creation parameter of the referencing part stored in the part processing method data storing portion 12C (Step S171). At this moment, either of "automatic", "product extend line", "rectangular" or polygon" is set in the blank type. In the case of "automatic", the blank line is created automatically.

In Step S171, if it is judged such that the blank line is created automatically, a type of the pressing method is judged based on the type of the pressing method parameter of the referencing part stored in the part processing method data storing portion 12C (Step S172).

Figure 72:
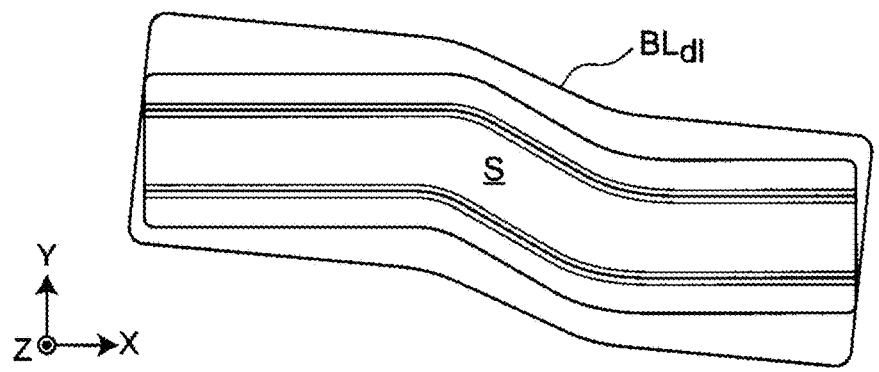
FIG. 72 is a drawing for describing a creation of a blank line of a first application sample (1).
Figure 96:
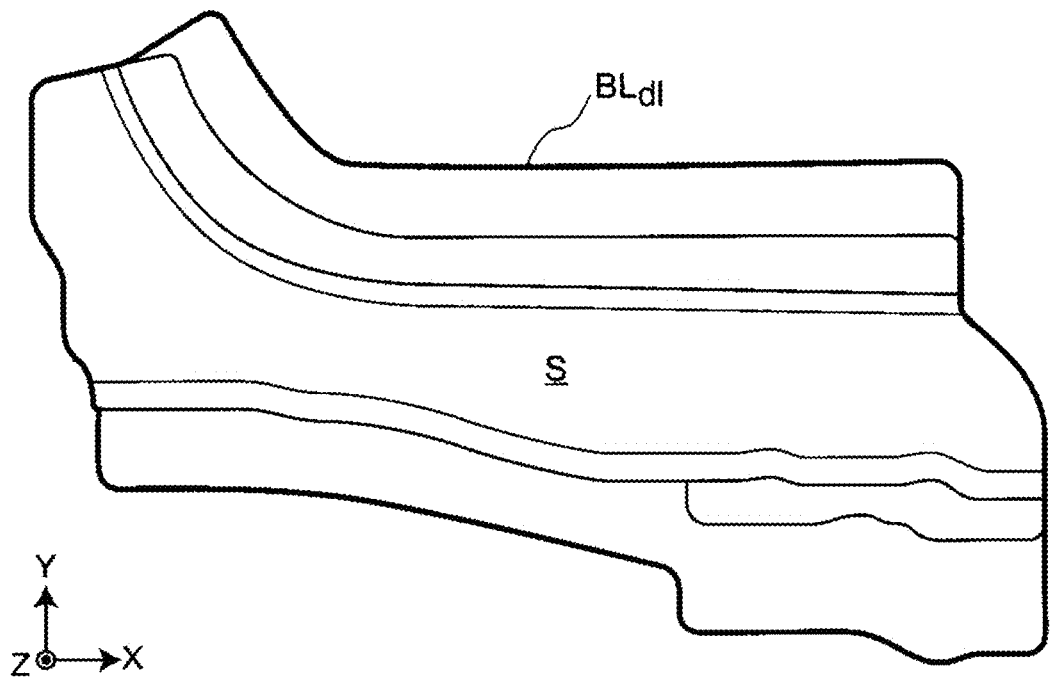
FIG. 96 is a drawing for describing a creation of a blank line of a second application sample (1).

If a result of the judgement of Step S172 is the forming (bending), as illustrated in FIG. 72, FIG. 96, the product extend line DL is created based on the product shape model data DT102, and this product extend line DL itself is determined as a blank line $BL_{d1}$ (Step S173). Since the product extend line may be created from the product shape, for example by using well-known technology such as the one step method in which a process being opposite to the forming process from the product shape to the blank shape is calculated in one step, or the like, further detailed description is omitted.

Figure 73:
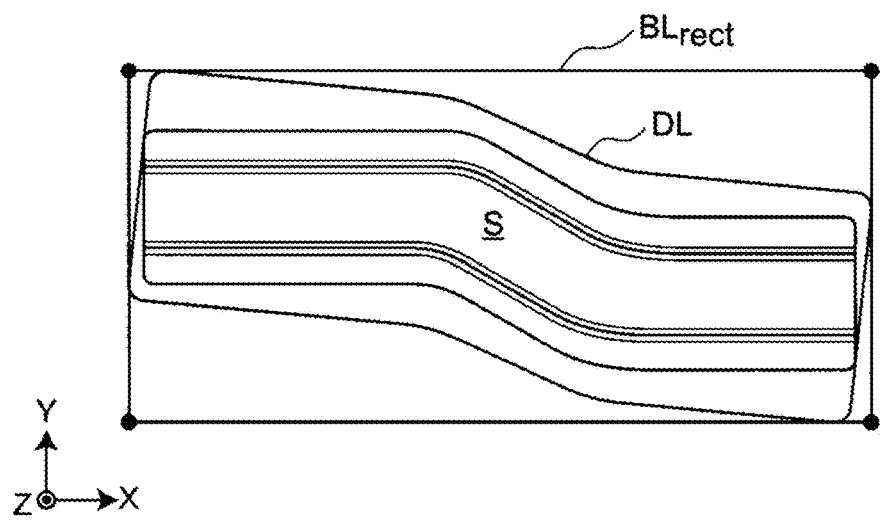
FIG. 73 is a drawing for describing a creation of a blank line of a first application sample (2).
Figure 97:
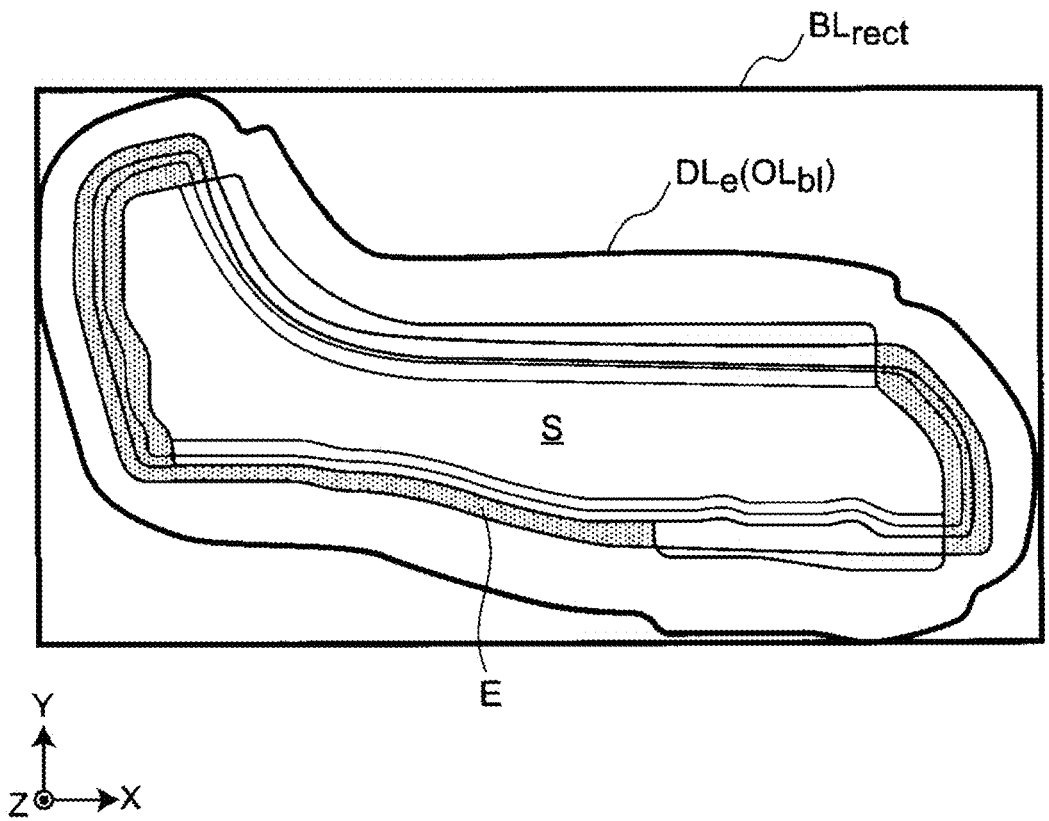
FIG. 97 is a drawing for describing a creation of a blank line of a second application sample (2).

If a result of the judgement of Step S172 is the drawing, as illustrated in FIG. 73, FIG. 97, the rectangular blank line $BL_{rect}$ is created based on the product data (Step S174).

On the contrary, in Step S171, if it is judged such that a blank line is not created automatically, a blank type is judged based on the blank type of the blank line creation parameter of the referencing part (Step S175).

If a result of the judgement of Step S175 is the product extend line type, as illustrated in FIG. 96, the product extend line DL itself is determined as a blank line $BL_{d1}$ (Step S173.)

If a result of the judgement of Step S175 is the rectangular type, as illustrated in FIG. 97, the rectangular blank line $BL_{rect}$ is created (Step S174).

Figure 74:
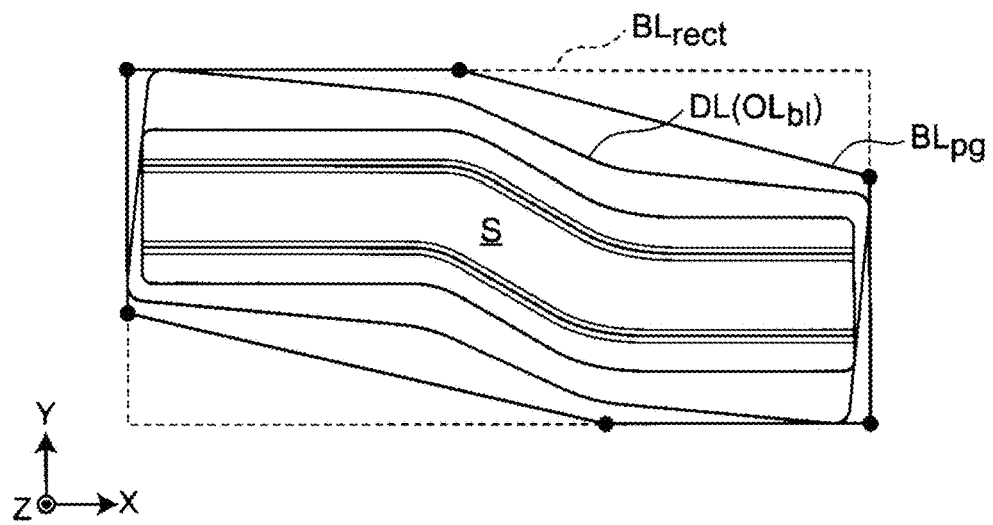
FIG. 74 is a drawing for describing a creation of a blank line of a first application sample (3).
Figure 102:
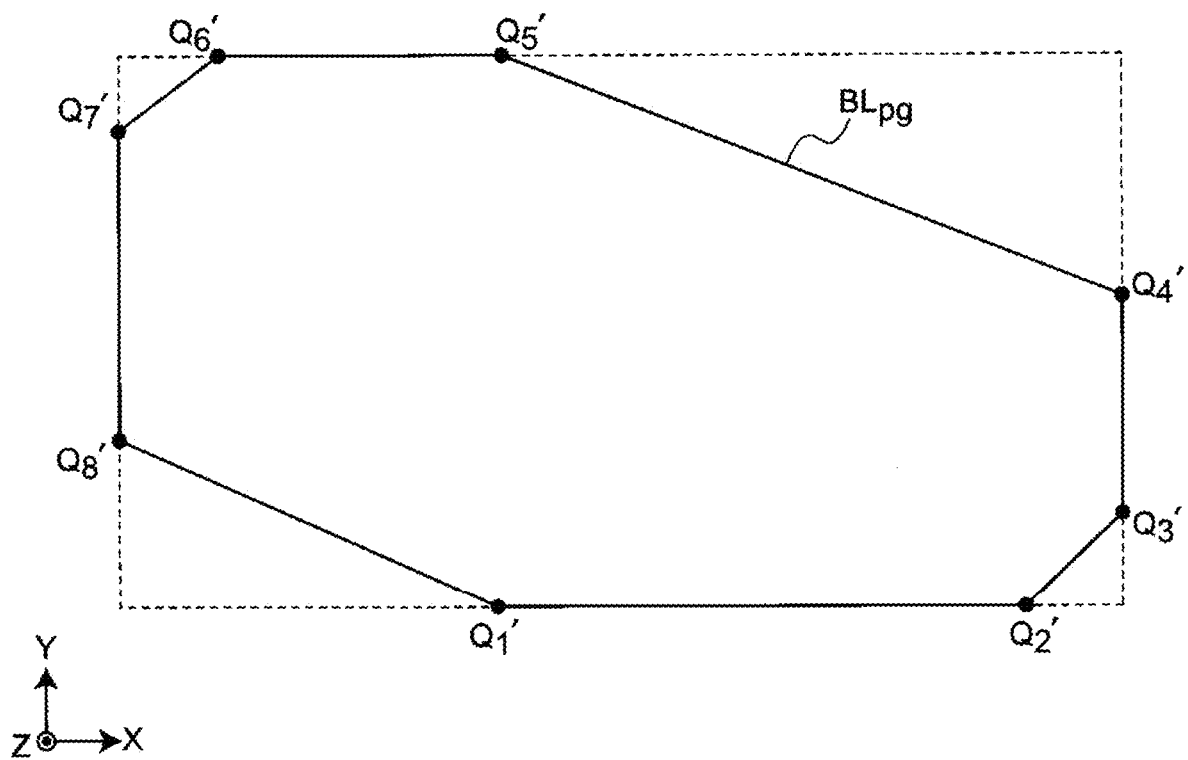
FIG. 102 is a drawing for describing a creation of a blank line of a second application sample (7).
Figure 106:
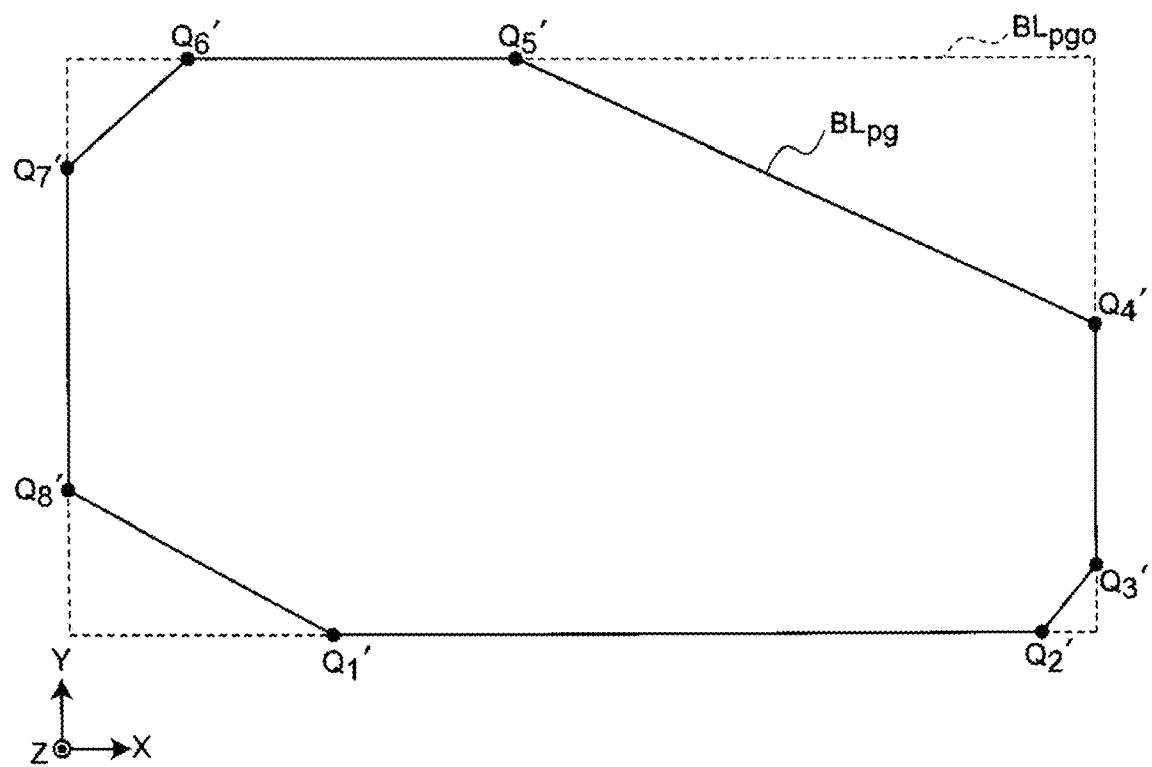
FIG. 106 is a drawing for describing a creation of a blank line of a second application sample (11).
Figure 107:
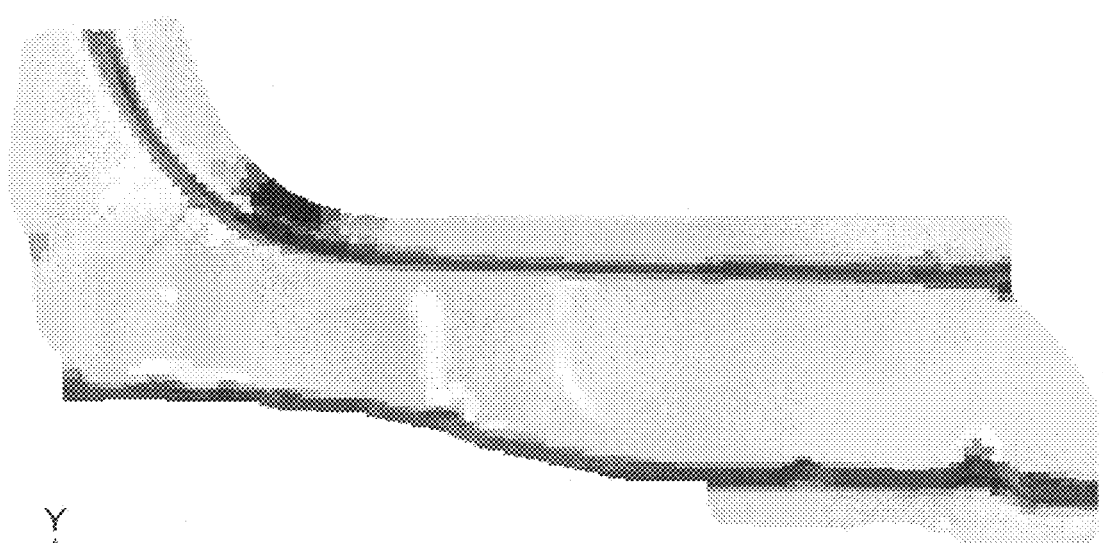
FIG. 107 is a drawing for illustrating a press forming simulation result of a second application sample.

If a result of the judgement of Step S175 is the polygon type, as illustrated in FIG. 74, FIG. 102, FIG. 106, the polygon blank line $BL_{pg}$ is created (Step S176).

Finally, a thickness of the blank material is read from the blank thickness data DT402 of the blank model data storing portion 12E (Step S177).

Accordingly, the blank model data DT400 may be created automatically.

(4-1) Rectangular Blank Line Creation Method

Figure 41:
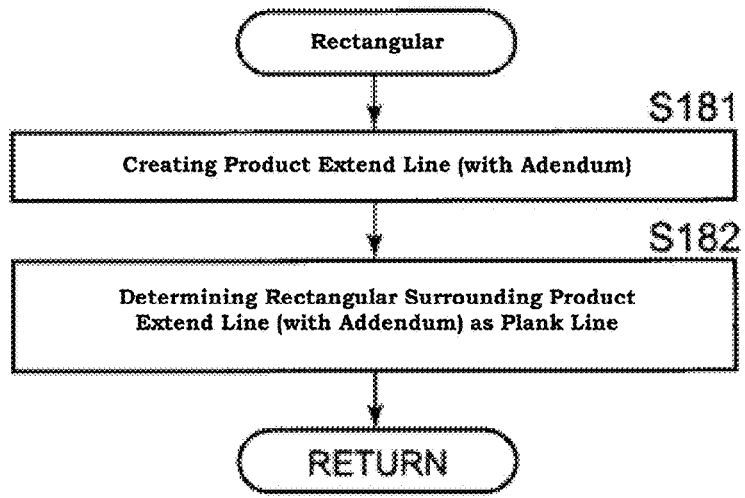
FIG. 41 is a flowchart for illustrating a method for creating a blank line of a rectangular type.

Next, a creation of the rectangular blank line (Step S174) which is a subroutine of the flowchart of FIG. 40 will be described according to the flowchart of FIG. 41.

At first, as illustrated in FIG. 73, FIG. 97, the product extend line DL is created in the case of the product extension type, and the extend line $DL_e$ of the product S with the addendum is created in the case of the blank holder surface and addendum surface creation type (Step S181).

Finally, the rectangular which outwardly contacts the created product extend line DL is determined as the blank line $BL_{rect}$ in the case of the product extension type, and the rectangular which outwardly contacts the created extend line $DL_e$ of the product S with the addendum is determined as the blank line $BL_{rect}$ in the case of the blank holder surface and addendum surface creation type (Step S182).

Accordingly, the rectangular blank line $BL_{rect}$ may be created automatically.

(4-2) Polygon Blank Line Creation Method

Figure 42:
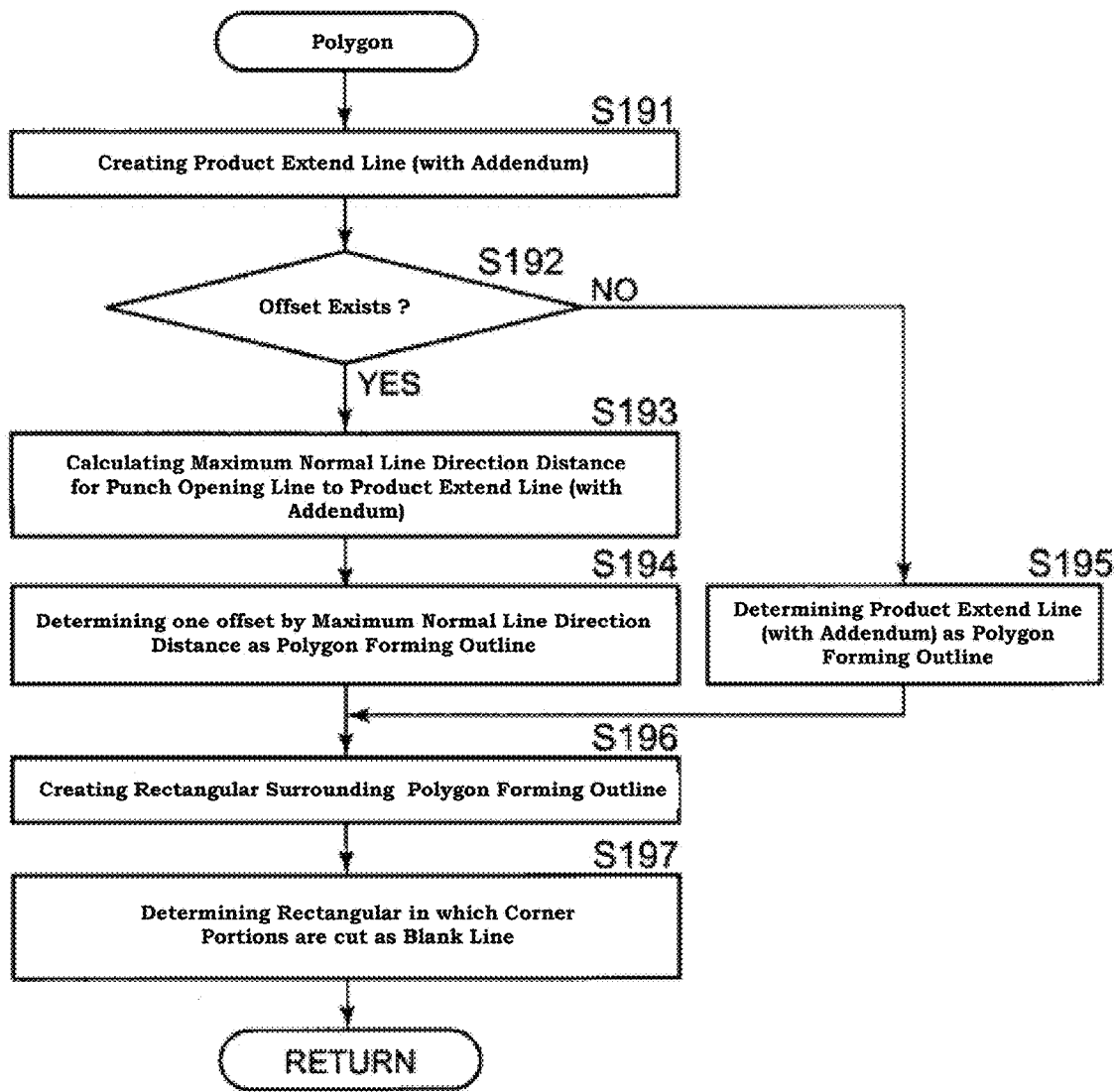
FIG. 42 is a flowchart for illustrating a method for creating a blank line of a polygon type.
Figure 43:
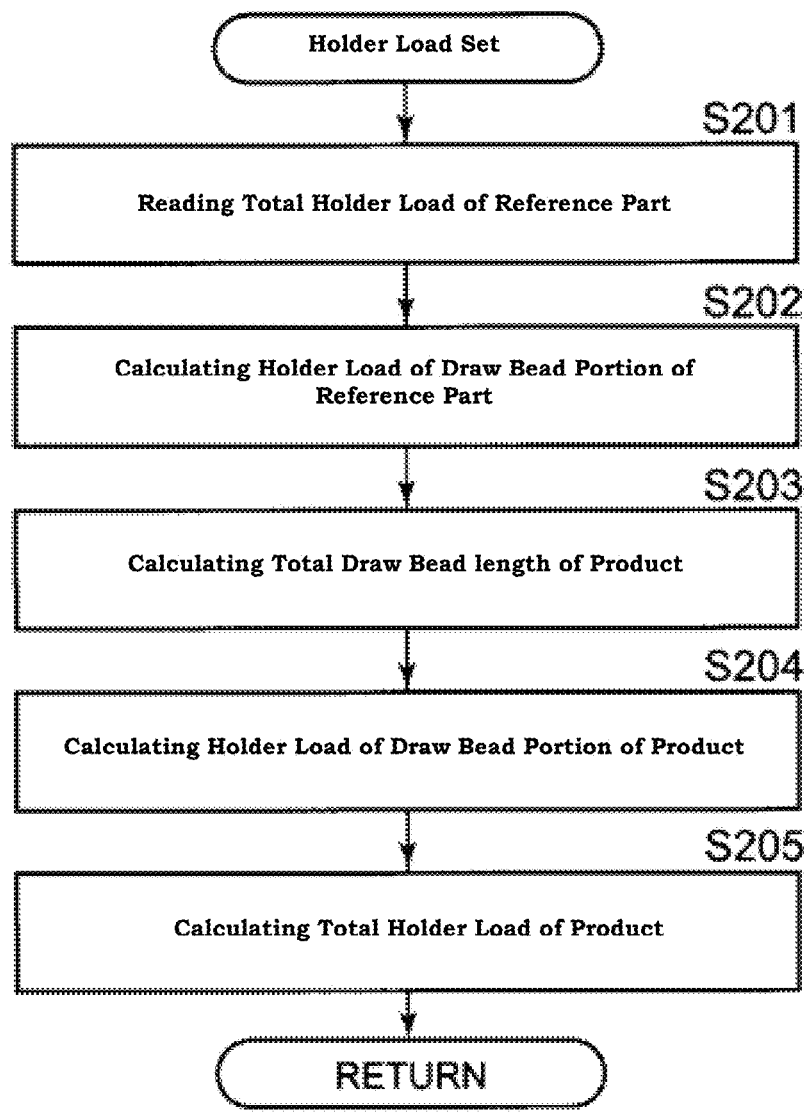
FIG. 43 is a flowchart for illustrating a method for setting a holder load.

Next, a creation of the polygon blank line (Step S176) which is a subroutine of the flowchart of FIG. 40 will be described according to the flowchart of FIG. 42.

At first, as illustrated in FIG. 74, FIG. 97, the product extend line DL is created in the case of the product extension type, and the extend line $DL_e$ of the product S with the addendum is created in the case of the blank holder surface and addendum surface creation type (Step S191).

Next, it is judged if any offset exists or not based on the offset amount of the blank line creation parameter stored in the part processing method data storing portion 12C (Step S192).

Figure 103:
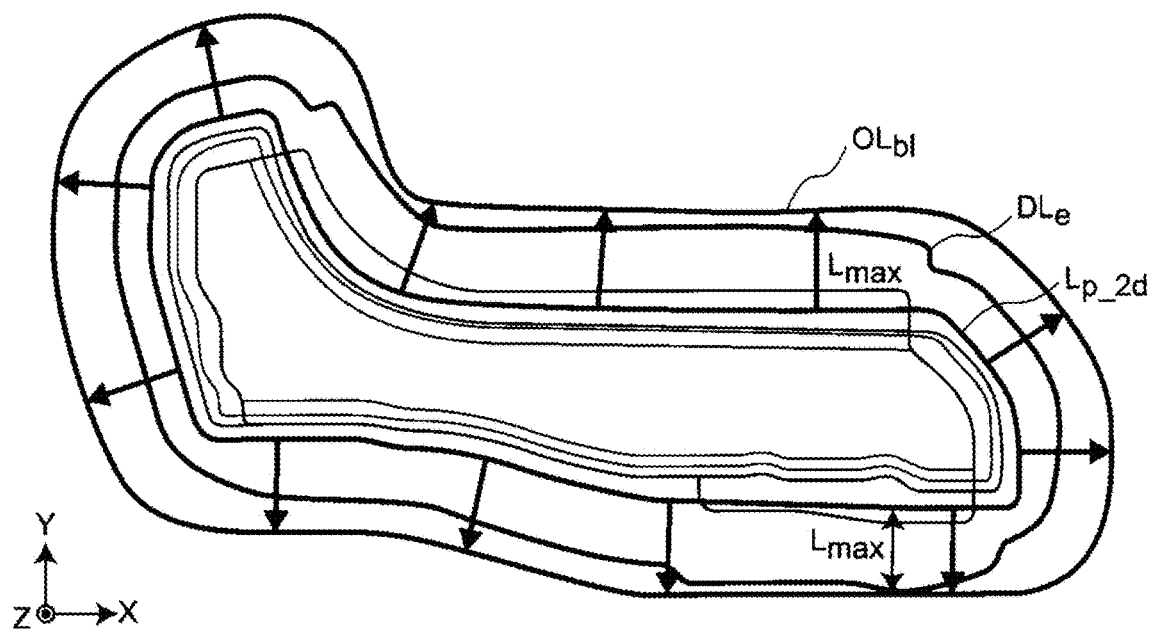
FIG. 103 is a drawing for describing a creation of a blank line of a second application sample (8).

If a result of the judgement of Step S192 is that the offset exists, as illustrated in FIG. 103, a maximum normal line direction distance $L_{max}$ from the two dimensional punch opening line $L_{p\_2d}$ to the product extend line DL is calculated in the case of the product extension type, and a maximum normal line direction distance $L_{max}$ from the two dimensional punch opening line $L_{p\_2d}$ to the an extend line $DL_e$ of the product S with the addendum is calculated in the case of the blank holder surface and addendum surface creation type (Step S193).

Next, as illustrated in FIG. 103, a line created by offsetting the two dimensional punch opening line $L_{p\_2d}$ by the maximum normal line direction distance $L_{max}$ is determined as a polygon forming outline $OL_{b1}$ (Step S194).

On the contrary, if a result of the judgement of Step S192 is that the offset does not exist, as illustrated in FIG. 74, FIG. 97, a product extend line DL is determined as a polygon forming outline $OL_{b1}$ in the case of the product extension type, and the extend line $DL_e$ of the product S with the addendum is determined as a polygon forming outline $OL_{b1}$ in the case of the blank holder surface and addendum surface creation type (Step S195).

Figure 98:
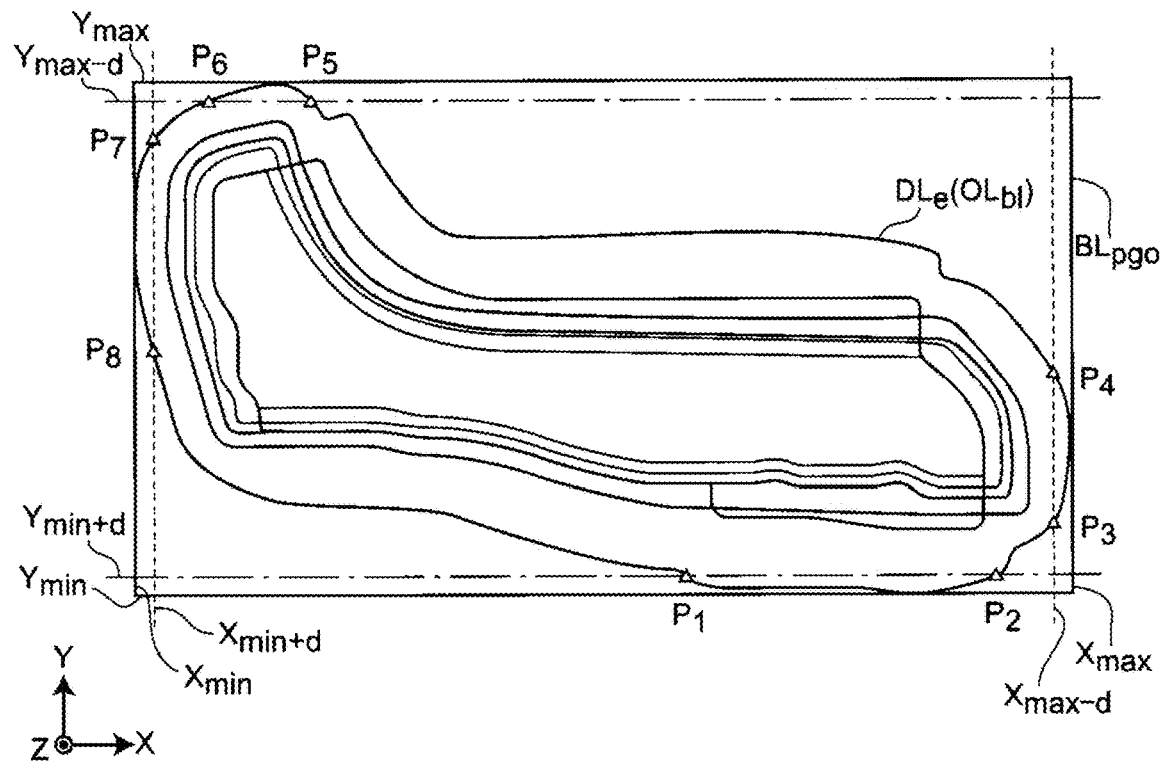
FIG. 98 is a drawing for describing a creation of a blank line of a second application sample (3).
Figure 104:
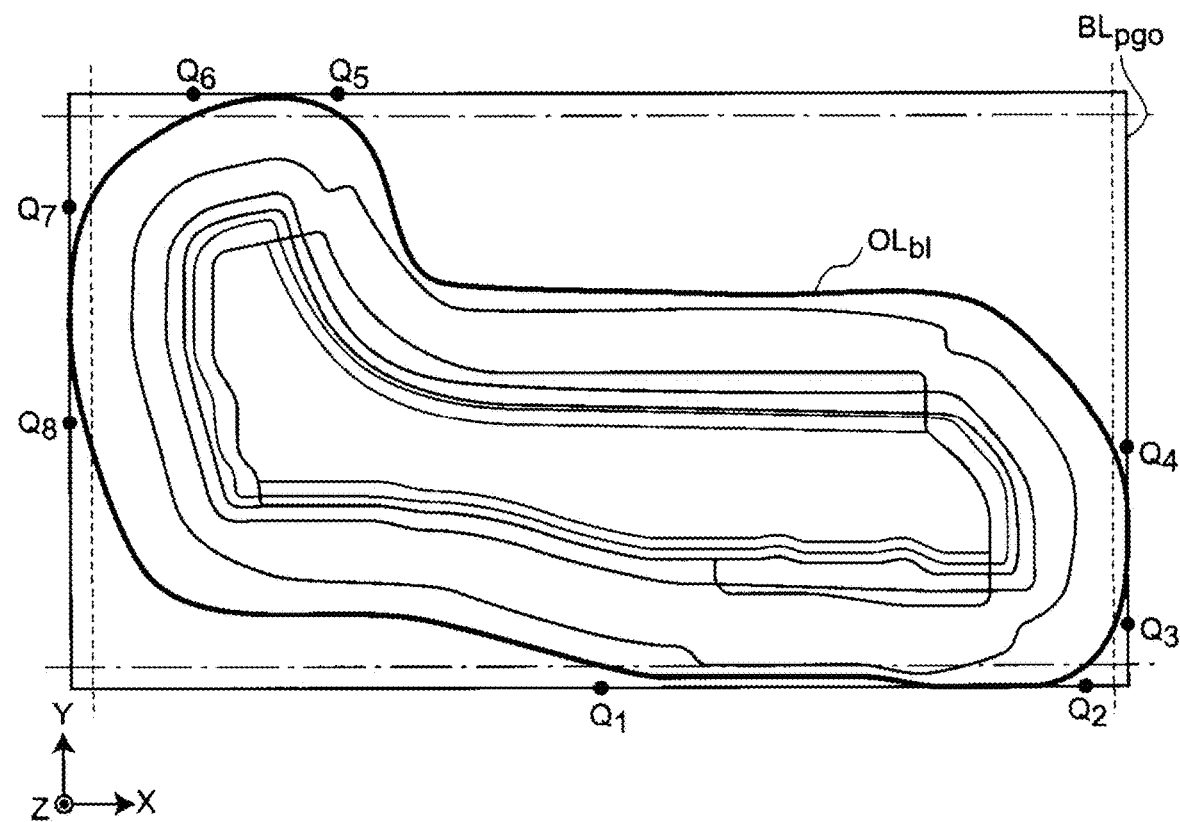
FIG. 104 is a drawing for describing a creation of a blank line of a second application sample (9).
Figure 105:
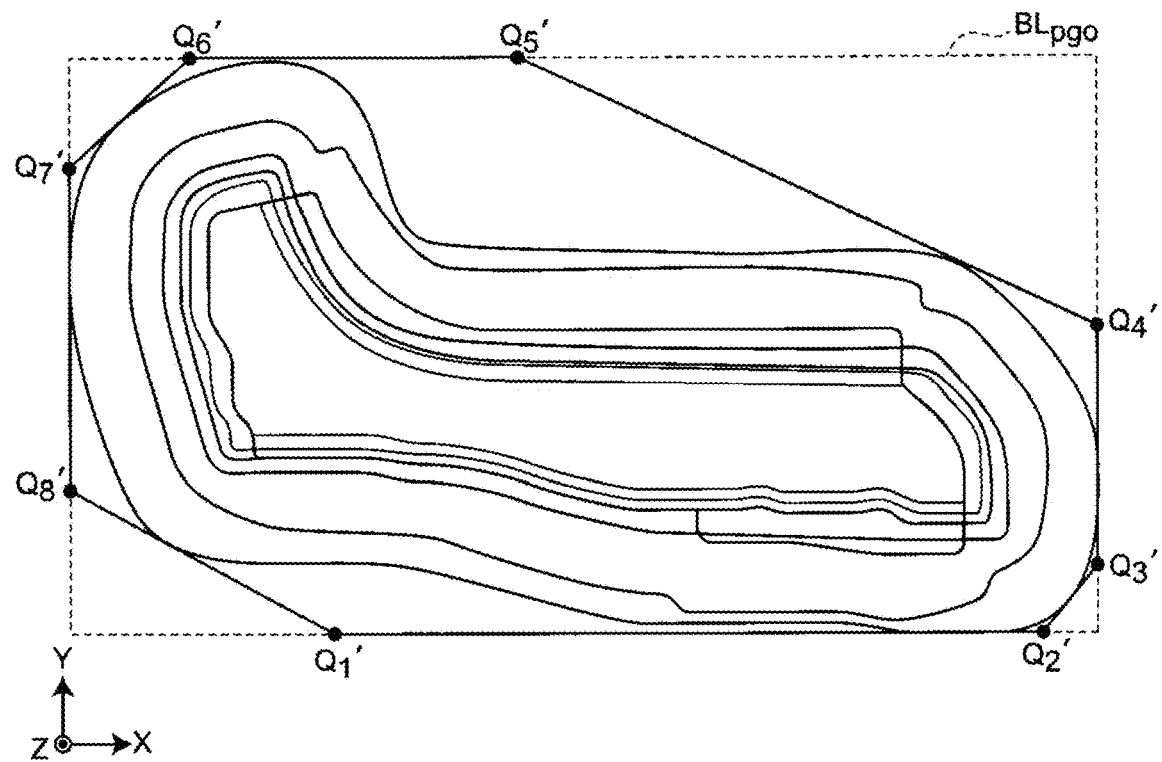
FIG. 105 is a drawing for describing a creation of a blank line of a second application sample (10).

Next, as illustrated in FIG. 98, FIG. 104, the polygon forming rectangular blank line $BL_{pgo}$ which outwardly contacts the polygon forming outline $OL_{b1}$ is created (Step S196).

Finally, as illustrated in FIG. 74, FIG. 102, FIG. 106, one in which the corner portion is cut off from the created polygon forming rectangular blank line $BL_{pgo}$ is determined as the blank line $BL_{pg}$ (Step S197).

The method for cutting off the corner portion from the created polygon forming rectangular blank line $BL_{pgo}$ is hereinafter described.

At first, as illustrated in FIG. 98, each of the side $X_{max}$, $X_{min}$, $Y_{max}$, $Y_{min}$ which configure the polygon forming rectangular blank line $BL_{pgo}$ is moved inwardly in parallel by a predetermined distance. Then, a position of the intersecting point of each of the sides $X_{max}$–d, $X_{min}$+d, $Y_{max}$–d, $Y_{min}$+d, which are moved in parallel and the polygon forming outline $OL_{b1}$ is calculated.

Figure 99:
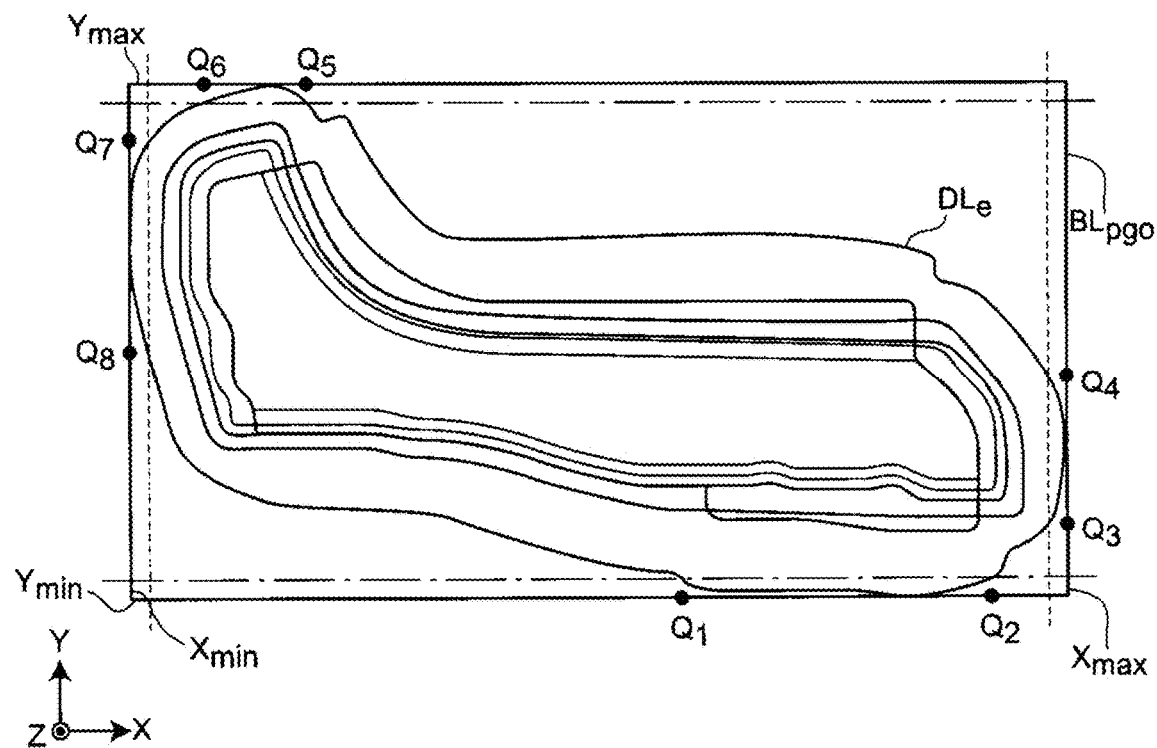
FIG. 99 is a drawing for describing a creation of a blank line of a second application sample (4).

Next as illustrated in FIG. 99, FIG. 104, points Q1 to Q8 created by moving each of the intersecting points in the normal line direction of each side on the polygon forming rectangular blank line BLpgo are calculated.

Figure 100:
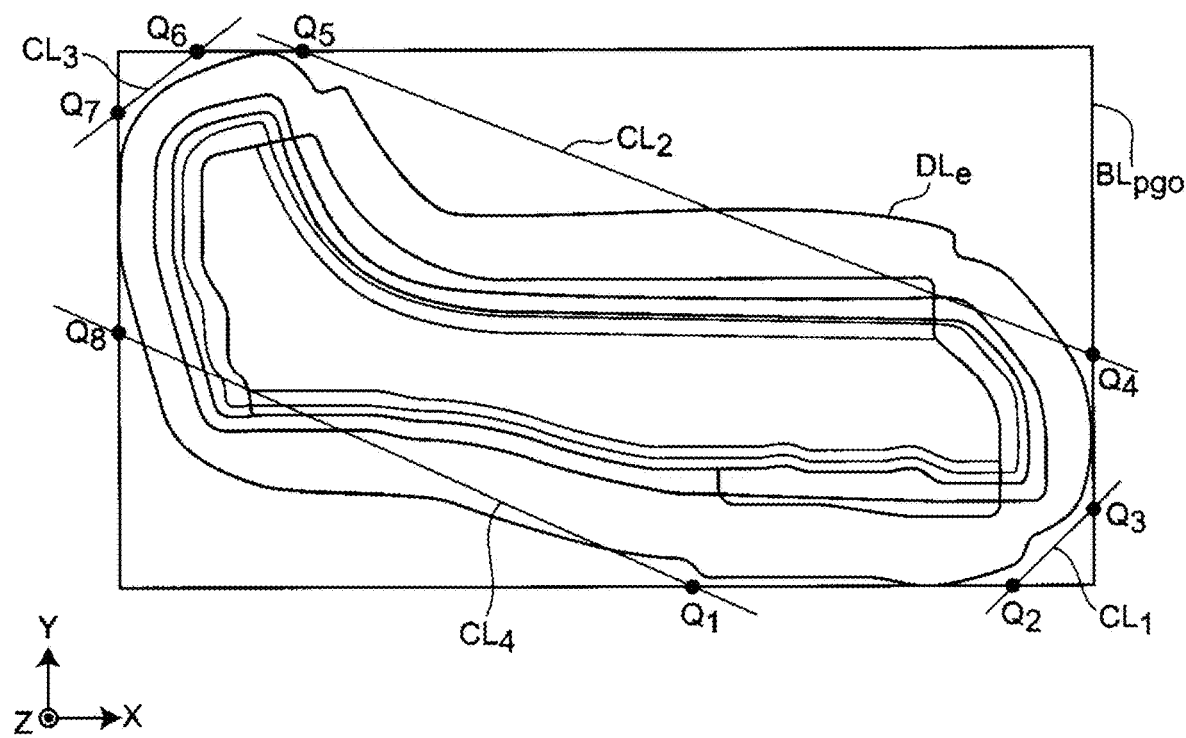
FIG. 100 is a drawing for describing a creation of a blank line of a second application sample (5).

Next, as illustrated in FIG. 100, the cutting lines $CL_1$ to $CL_4$, being straight lines, which pass two points positioned adjacent to each other ($Q_2$-$Q_3$, $Q_4$-$Q_5$, $Q_6$-$Q_7$, $Q_8$-$Q_1$) via the corner portion of the polygon forming rectangular blank line $BL_{pgo}$.

Figure 101:
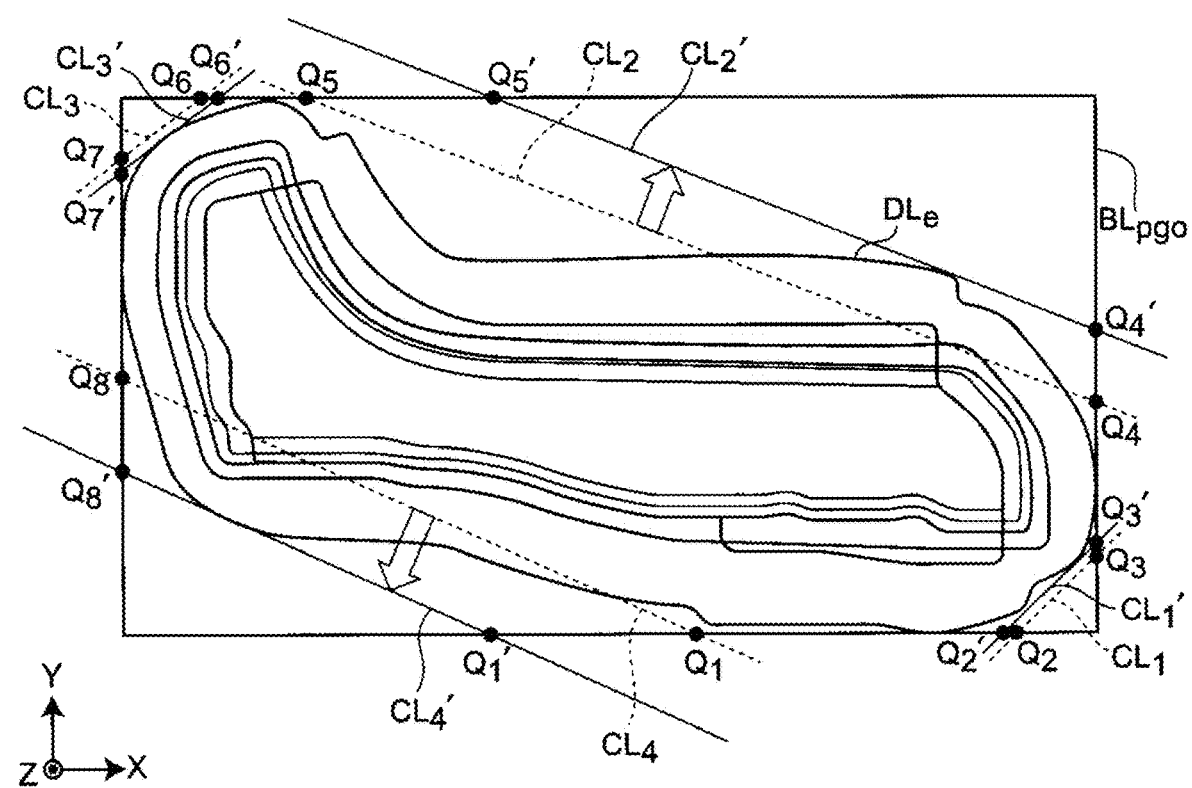
FIG. 101 is a drawing for describing a creation of a blank line of a second application sample (6).

Next, as illustrated in FIG. 101, each of the cutting lines $CL_1$ to $CL_4$ is moved in parallel up to contacting the polygon forming outline $OL_{b1}$, an positions of the intersecting points $Q_1'$ to $Q_8'$ of the cutting lines $CL_1'$ to $CL_4'$ to be moved in parallel and the polygon forming rectangular blank line $BL_{pgo}$ are calculated.

Next, as illustrated in FIG. 101, FIG. 106, the blank line $BL_{pg}$ of the polygon type whose apexes are points $Q_1'$, $Q_2'$, $Q_3'$, $Q_4'$, $Q_5'$, $Q_6'$, $Q_7'$, $Q_8'$ is obtained by cutting off each corner portion of the polygon forming rectangular blank line $BL_{pgo}$ at the cutting lines $CL1'$ to $CL_4'$.

Accordingly, the blank line of a polygon type $BL_{pg}$ may be created automatically.

(5) Holder Load Setting Method by System for Automatically Creating Press Die Shape A holder load setting method by the system for automatically creating a press die shape 1 will be described.

At first, the total holder load of the press forming condition of the referencing part is read from the part processing method data storing portion 12C (Step S201).

Next, a holder load of the draw bead portion of the referencing part is calculated based on the draw bead maximum load and the total draw bead length in the draw bead information of the referencing part read from the part processing method data storing portion 12C (Step S202). The holder load of the draw bead portion may be calculated by the product of the draw bead maximum load and the total draw bead length. The draw bead maximum load may be calculated by the draw bead shape type and the cross-sectional shape parameter thereof. However, since the calculation method thereof is well-known, further description is omitted.

Next the total draw bead length is calculated based on the draw bead information of the product (Step S203).

Next, a holder load of the draw bead portion of the product S is calculated based on the draw bead maximum load and the total draw bead length in the draw bead information of the referencing part (Step S204). Based on the consideration such that the maximum load of the draw bead is the same between the product S and the referencing part, a holder load of the draw bead portion may be calculated by the product of the maximum load of the draw bead of the referencing part and the total draw bead length of the product.

Finally, a total holder load of the product S is calculated based on the calculated holder load of the draw bead portion of the product S (Step S205). The total holder load is the sum of the holder load of the draw bead portion and the holder load at the blank holder H excluding the draw bead portion. Further, based on the consideration such that the holder load at the blank holder excluding the draw bead portion of the product S and the referencing part is the same, the holder load at the blank holder excluding the draw bead portion of the product S may be calculated by deducting the holder load of the draw bead portion from the total holder load of the referencing part.

Accordingly, the total holder load of the product S may have been calculated automatically.

(6) Feature of System for Automatically Creating Press Die Shape

According to the system 1 for automatically creating a press die shape of the embodiment, if the part processing method data storing portion 12C stores data relating to a pressing method and a product shape in advance, by determining a part which is similar to the product S as the referencing part, press die shapes corresponding to various pressing methods and product shapes may be created automatically with using the part processing method data DT200 relating to the press forming of the ordinary parts effectively.

According to the system for automatically creating a press die shape 1 of the embodiment, by using data relating to ordinary press forming of parts with various kinds of knowhow for a press die design, an appropriate pressing method and an appropriate press die shape type may be selected, not relying on the experience of a press die design of an engineer or degrees of the experience of CAD operation, and a press die shape corresponding to the selected pressing method and the selected press die shape type may be created in a short time.

Further, according to the system 1 for automatically creating a press die shape of the embodiment, since the ceiling plate portion T, the vertical wall portion W or the flange portion Fl may be identified by the feature shape identifying portion 320, a press die shape corresponding to the feature shape of the product S may be created automatically.

Further, according to the system 1 for automatically creating a press die shape of the embodiment, even in any case such that a press die shape type is the product extension type or the blank holder and addendum surface creation type, a press die shape such as a die D, a punch Pn, a blank holder H and a pad Pd may be created automatically.

Further, according to the system 1 for automatically creating a press die shape of the embodiment, since after preliminarily determining a pressing direction, the feature shape of the product 2 is identified and the pressing direction is adjusted based on the identified feature shape, a more appropriate pressing direction corresponding to the feature shape of the actual product S may be set.

Further, according to the system 1 for automatically creating a press die shape of the embodiment, since a draw bead shape type and a cross-sectional shape parameter of the draw bead portion of the referencing part corresponding to each of the created draw bead arrangement lines is set, the draw bead may be created with using the ordinary part data effectively.

Further, according to the system 1 for automatically creating a press die shape of the embodiment, since the created press die shape data DT301 of the product S may be registered as a part processing method data DT200 of a new product, the part processing method data DT200 may be increased.

Further, according to the system 1 for automatically creating a press die shape of the embodiment, since a press forming simulation of the product S is performed with using the created press die shape data, a result of the simulation may also be obtained.

Further, according to the system 1 for automatically creating a press die shape of the embodiment, since a blank line BL of the product S is created based on the pressing method and the blank line type of the referencing part, the blank line BL may be created with using the data of the ordinary parts efficiently.

The present invention is not limited to the exemplified embodiments, and it is clear that various improvements or design change will be possible as far as not deviating from the gist of the present invention.

While a press die of so called single round type is described In the embodiment, it is not limited thereto, and for example, a press die of a sequential type, a transfer type, a robot type or the like may also be applied.

INDUSTRIAL APPLICABILITY

As mentioned above, according to the present invention, since press die shapes corresponding to various pressing methods and product shapes may be created automatically with using the part processing method data relating to the press forming of the ordinary parts effectively, it may suitably be applied to the industrial filed for manufacturing the panel part such as ones for forming a body part of the car.

DESCRIPTION OF REFERENCE NUMBERS

1 System for Automatically Creating Press die shape
12C Part processing method data Storing Portion (Part processing method data Storing Device)
320 Feature shape Identifying Portion (Feature shape Identifying Device)
330 Pressing Direction Setting Portion (Pressing Direction Setting Device)
350 Pressing Method Determining Portion (Pressing Method Determining Device)
360 Press die shape Creating Portion (Press die shape Creation Device)
400 Blank Model Data Creating Portion (Blank Model Data Creation Device)
600 Holder Load Setting Portion (Holder Load Setting Device)
700 Press Forming Simulation Portion (Simulation Device)
S29 Draw bead Setting Step (Draw bead Setting Device)
S83 Press die Outline Creation Step (Press die Outline Creation Device)
S86 Blank holder Surface Creation Step (Blank holder Surface Creation Device)
S87 Punch Opening Line Creation Step (Punch Opening Line Creation Device)
S89 Pad Dividing Line Creation Step (Pad Dividing Line Creation Device)
S92 Feature point Extracting Step (Feature point Extracting Device)
S93 Two Dimensional Punch Opening Line Creation Step (Two Dimensional Punch Opening Line Creation Device)

S94 Addendum Shape Creation Step (Addendum Shape Creation Device)
S95 Three Dimensional Punch Opening Line Creation Step (Three Dimensional Punch Opening Line Creation Device)

The invention claimed is:

1. A system for automatically creating a press die shape including a product shape data obtaining device to obtain a product shape data of a product, and for automatically creating press die shape data of a press die for press forming the product using the product shape data obtained by the product shape data obtaining device, the system comprising:
   a memory to store, for each of a plurality of parts, data relating to a shape of a part of the plurality of parts, a pressing method for press forming the part, a pressing direction setting and a press die shape type; and
   at least one processor configured to
      obtain data from the memory, relating to the pressing method, the pressing direction setting and the press die shape type of a part, selected from the data stored in the memory for the plurality of parts,
      create the press die shape data relating to a shape of a product portion and a peripheral portion of the product portion in the press die based on the product shape data of the product, and the pressing method, the pressing direction setting and the press die shape type of the part, obtained by the at least one processor,
      calculate a main curvature of each element of a Computer Aided Design (CAD) surface that configures the product shape data,
      identify a fillet portion of the product based on the main curvature calculated, and
      identify a top plate portion, a vertical wall portion or a flange portion based on a positional relationship with the fillet portion identified,
   wherein the at least one processor is further configured to create the press die shape data based on the top plate portion, the vertical wall portion, or the flange portion identified, and
   wherein, upon the press die shape type of the part being a product extension type, the at least one processor is configured to
      create a press die outline by extending a product shape outline of the product to a normal direction thereof by a predetermined distance,
      determine an area surrounded by a fillet portion, an extended portion of the area surrounded by the fillet portion being created by extending a fillet portion adjacent to the flange portion and the press die outline as a blank holder surface,
      determine, upon the press die having a blank holder used in the pressing method, a border line between the blank holder surface and the fillet portion and the extended portion of the area surrounded by the fillet portion as a punch opening line dividing into the blank holder and the punch, and
      extend, upon the press die having a pad being used in the pressing method, the top plate portion up to the press die outline, and
      determining an outer periphery line of a portion, including the top plate portion and the extended portion, as a pad dividing line dividing into the pad and the press die.

2. The system for automatically creating the press die shape of claim 1, wherein the at least one processor is further configured to
   register the press die shape data of the product as a new part processing method data of a new part.

3. A simulation system for press forming the press die shape of claim 1, wherein the at least one processor is configured to perform a press forming simulation of the product using the press die shape data.

4. The simulation system for press forming of claim 3, wherein the memory is further configured to store data relating to a blank line type for determining a blank line from the part, and
   the at least one processor is further configured to create the blank line of the product based on the pressing method and the blank line type of the part.

5. The simulation system for press forming of claim 3, wherein the at least one processor is further configured to
   read a total holder load of the part from the memory, calculate a draw bead portion holder load applied to the draw bead portion of the part, and calculate and set a total holder load of the product based on the draw bead portion holder load.

6. A system for automatically creating a press die shape, including a product shape data obtaining device to obtain a product shape data of a product, and for automatically creating press die shape data of a press die for press forming the product using the product shape data obtained by the product shape data obtaining device, the system comprising:
   a memory to store, for each of a plurality of parts, data relating to a shape of a part of the plurality of parts, a pressing method for press forming the part, a pressing direction setting and a press die shape type; and
   at least one processor configured to
      obtain data from the memory, relating to the pressing method, the pressing direction setting and the press die shape type of the part, selected from the data stored in the memory for the plurality of parts,
      create the press die shape data relating to a shape of a product portion and a peripheral portion of the product portion in the press die based on the product shape data of the product, and the pressing method, the pressing direction setting and the press die shape type of the part, obtained by the at least one processor,
      calculate a main curvature of each element of a Computer Aided Design (CAD) surface that configures the product shape data,
      identify a fillet portion of the product based on the main curvature calculated, and
      identify a top plate portion, a vertical wall portion or a flange portion based on a positional relationship with the fillet portion identified,
   wherein, upon the press die shape type of the part being a blank holder and addendum surface creation type, an addendum shape parameter of the part is stored in the memory, and the at least one processor is configured to obtain the addendum shape parameter, and
   wherein the
   the at least one processor is configured to
      create a blank holder surface based on a part processing method of the part of the product,
      extract feature points, being apexes of corners having a bending angle of a threshold angle or less on a product shape outline based on the product shape data,
      create a two dimensional punch opening line which is a spline closed curved line passing points outwardly offset from the extracted feature points by a distance, determine an addendum cross-sectional plane position using the feature points for allocating an addendum cross-sectional plane, create an addendum cross-sectional shape by referring to an addendum cross-sectional shape parameter with respect to each addendum cross-sectional plane position set from the addendum shape parameter of the part obtained, map, upon the press die having the blank holder being used in the pressing method, the two dimensional punch opening line over the blank holder surface in the pressing direction, create a three dimensional punch opening line which divides into the blank holder and the punch, and determine, upon the press die having a pad being used in the pressing method, an outer periphery line of a surface of the top plate as a pad dividing line which divides into the pad and the press die.

7. The system for automatically creating the press die shape of claim 6, wherein the at least one processor is further configured to judge whether or not a pressing direction determining type is automatic type, based on the data relating to the pressing direction setting of the parts obtained, refer, upon the pressing direction determining type not being judged to be an automatic type, to the pressing direction setting, as a pressing direction of the press die of the product, and create, upon the pressing direction determining type being judged to be an automatic type, a mesh model from the product shape data obtained, calculate an average normal direction of all elements which configure the mesh model, preliminarily determine the average normal direction as a pressing direction of the press die of the product, identify a feature shape of the product based on the pressing direction preliminarily determined, and determine a pressing direction of the press die of the product based on the identified feature shape.

8. The system for automatically creating the press die shape of claim 6, wherein the at least one processor is further configured to store draw bead arrangement position information of each draw bead portion of the press die, and a draw bead shape type, and a cross-sectional shape parameter, allocate a draw bead arrangement line in the periphery portion of the press die shape created from the obtained product shape data, and set the draw bead shape type and the cross-sectional shape parameter to each of the allocated draw bead arrangement line by referring to a corresponding draw bead designation.

9. The system for automatically creating the press die shape of claim 6, wherein the at least one processor is further configured to judge whether or not a pressing direction determining type is automatic type, based on the data relating to the pressing direction setting of the parts obtained, refer, upon the pressing direction determining type not being judged to be an automatic type, to the pressing direction setting as a pressing direction of the press die of the product, and create, upon the pressing direction determining type being judged to be an automatic type, a mesh model from the product shape data obtained, calculate an average normal direction of all elements which configure the mesh model, preliminarily determine the average normal direction as a pressing direction of the press die of the product, identify a feature shape of the product based on the pressing direction preliminarily determined, and determine a pressing direction of the press die of the product based on the identified feature shape.

10. The system for automatically creating the press die shape of claim 6, wherein the at least one processor is further configured to store draw bead arrangement position information of each draw bead portion of the press die, and a draw bead shape type, and a cross-sectional shape parameter, allocate a draw bead arrangement line in the periphery portion of the press die shape created from the obtained product shape data, and set the draw bead shape type and the cross-sectional shape parameter to each of the allocated draw bead arrangement line by referring to a corresponding draw bead designation of the part processing method of the part.

11. The system for automatically creating the press die shape of claim 6, wherein the at least one processor is further configured to register the press die shape data of the product as a new part processing method data of a new part.

12. A simulation system for press forming the press die shape of claim 6, wherein the at least one processor is configured to perform a press forming simulation of the product using the press die shape data.

13. The simulation system for press forming of claim 12, wherein the memory is further configured to store data relating to a blank line type for determining a blank line from the part, and the at least one processor is further configured to create the blank line of the product based on the pressing method and the blank line type of the part.

14. The simulation system for press forming of claim 12, wherein the at least one processor is further configured to read a total holder load of the part from the memory, calculate a draw bead portion holder load applied to the draw bead portion of the part, and calculate and set a total holder load of the product based on the draw bead portion holder load.

* * * * *